US012669717B2

(12) United States Patent
Tomizawa

(10) Patent No.: US 12,669,717 B2
(45) Date of Patent: Jun. 30, 2026

(54) DISPLAY DEVICE

(71) Applicant: Magnolia White Corporation, Tokyo (JP)

(72) Inventor: Kazunari Tomizawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 19/097,282

(22) Filed: Apr. 1, 2025

(65) Prior Publication Data

US 2025/0306394 A1     Oct. 2, 2025

(30) Foreign Application Priority Data

Apr. 2, 2024     (JP) ................................. 2024-059785

(51) Int. Cl.

| *G02B 30/33* | (2020.01) |
| *G02F 1/13357* | (2006.01) |
| *G06F 3/01* | (2006.01) |
| *G09G 3/00* | (2006.01) |
| *G09G 3/36* | (2006.01) |

(52) U.S. Cl.
CPC ....... *G02B 30/33* (2020.01); *G02F 1/133602* (2013.01); *G06F 3/013* (2013.01); *G09G 3/001* (2013.01); *G09G 3/36* (2013.01); *G09G 2320/028* (2013.01); *G09G 2320/068* (2013.01); *G09G 2354/00* (2013.01)

(58) Field of Classification Search
CPC ... G02B 30/33; G02F 1/133602; G06F 3/013; G09G 3/001; G09G 3/36; G09G 2320/028; G09G 2320/068; G09G 2354/00
See application file for complete search history.

(56) References Cited

U.S. PATENT DOCUMENTS

| 2006/0098281 A1 | 5/2006 | Fukushima et al. | |
| 2009/0213147 A1* | 8/2009 | Sagardoyburu | G09G 3/3426 345/690 |
| 2010/0277657 A1 | 11/2010 | Fukushima et al. | |
| 2023/0215357 A1* | 7/2023 | Hong | H10K 59/879 345/174 |
| 2023/0260433 A1* | 8/2023 | Tomizawa | G02B 6/0035 345/204 |

FOREIGN PATENT DOCUMENTS

JP          3865762 B2     1/2007

* cited by examiner

*Primary Examiner* — Andrew Sasinowski
(74) *Attorney, Agent, or Firm* — K&L Gates LLP

(57) ABSTRACT

According to an aspect, a display device includes: a liquid crystal display panel provided with a plurality of pixels; and a light source provided with a plurality of light emission points and configured to emit light to the pixels of the liquid crystal display panel. A ratio of a pitch between the pixels arranged in a first direction to a pitch between the light emission points arranged in the first direction is 1:4n or 1:6n, wherein n is a natural number. A width of each light emission point in the first direction is larger than a width of each pixel in the first direction.

4 Claims, 43 Drawing Sheets

DISPLAY DEVICE

CROSS-REFERENCE TO RELATED APPLICATION

This application claims the benefit of priority from Japanese Patent Application No. 2024-059785 filed on Apr. 2, 2024, the entire contents of which are incorporated herein by reference.

BACKGROUND

1. Technical Field

What is disclosed herein relates to a display device.

2. Description of the Related Art

As disclosed in Japanese Patent No. 3865762, a display device capable of performing display output of individual images to a plurality of viewpoints by using an image separation body such as a parallax barrier is known.

A conventional image separation band is provided in correspondence with the position of a viewpoint expected in advance. Thus, at a viewpoint displaced from the position expected in advance, display quality degradation occurs even if the positional displacement is small enough that an image can still be visually recognized. For example, only an image with insufficient brightness can be visually recognized, unlike an image visually recognizable at the viewpoint expected in advance. Due to this problem, there has been desired a mechanism that can reduce display quality degradation even when viewpoint positional displacement occurs.

For the foregoing reasons there is a need for a display device that can further reduce display quality degradation due to viewpoint positional displacement.

SUMMARY

According to an aspect, a display device includes: a liquid crystal display panel provided with a plurality of pixels; and a light source provided with a plurality of light emission points and configured to emit light to the pixels of the liquid crystal display panel. A ratio of a pitch between the pixels arranged in a first direction to a pitch between the light emission points arranged in the first direction is 1:4n or 1:6n, wherein n is a natural number. A width of each light emission point in the first direction is larger than a width of each pixel in the first direction.

BRIEF DESCRIPTION OF THE DRAWINGS

FIG. 6 is a schematic diagram illustrating Examples A and B of the relative angle relation between a human face and the display device including the display panel;

FIG. 11 is a schematic diagram illustrating an example of pixel arrangement control in a case where the relative angle is 90 degrees (°);

FIG. 12 is a schematic diagram illustrating an example of the relation between the relative angle and the feasibility of individual images output to a plurality of viewpoints in a case where disposition control described above with reference to FIGS. 10 and 11 is reflected;

FIG. 17 is a schematic diagram illustrating an overview of drive control of the pixel PixU in accordance with the intersection position of the ray line of light from a light emission point to a viewpoint and the pixel PixU;

FIG. 18 is a diagram illustrating an example of display output to which sub-pixel control described above with reference to FIG. 17 is applied;

FIG. 23 is a schematic view illustrating the positional relation between a light emission point, a pixel, and a viewpoint in a case where the width of one light emission point in the X direction is a width SSx1a;

FIG. 24 is a schematic view illustrating the positional relation between a light emission point, a pixel, and a viewpoint in a case where the width of one light emission point in the X direction is the width SSx1a;

FIG. 25 is a schematic view illustrating an example of the relation between the display panel and two viewpoints and the angle of view at each of viewpoints E1 and E2;

FIG. 28 is a schematic view illustrating an example of the relation between the angle of view and the path of light in a case where the width of each light emission point in the X direction is a width SSx3;

FIG. 30 is a schematic view illustrating the positional relation between a light emission point, a pixel, and a viewpoint in a case where the width of one light emission point in the Y direction is a width SSy1a;

FIG. 32 is a schematic view illustrating an example of the relation between the angle of view and the path of light in a case where the width of each light emission point in the Y direction is a width SSy2;

FIG. 34 is a schematic view illustrating the positional relation between a light emission point, a pixel, and a viewpoint in a case where the width of one light emission point in the Y direction is the width SSy1a;

FIG. 38 is a schematic view illustrating the positional relation between a light emission point, a pixel, and a viewpoint in a case where the width of one light emission point in the X direction is the width SSx1a;

FIG. 40 is a schematic view illustrating an example of the relation between the angle of view and the path of light in a case where the width of each light emission point in the X direction is the width SSx2;

FIG. 43 is a schematic view illustrating an example of an arrangement and a size of the light emission points at a plan view point.

DETAILED DESCRIPTION

An embodiment of the present disclosure is described below with reference to the drawings. What is disclosed herein is only an example, and any modifications that can be easily conceived by those skilled in the art while maintaining the main purpose of the disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

Figure 1:
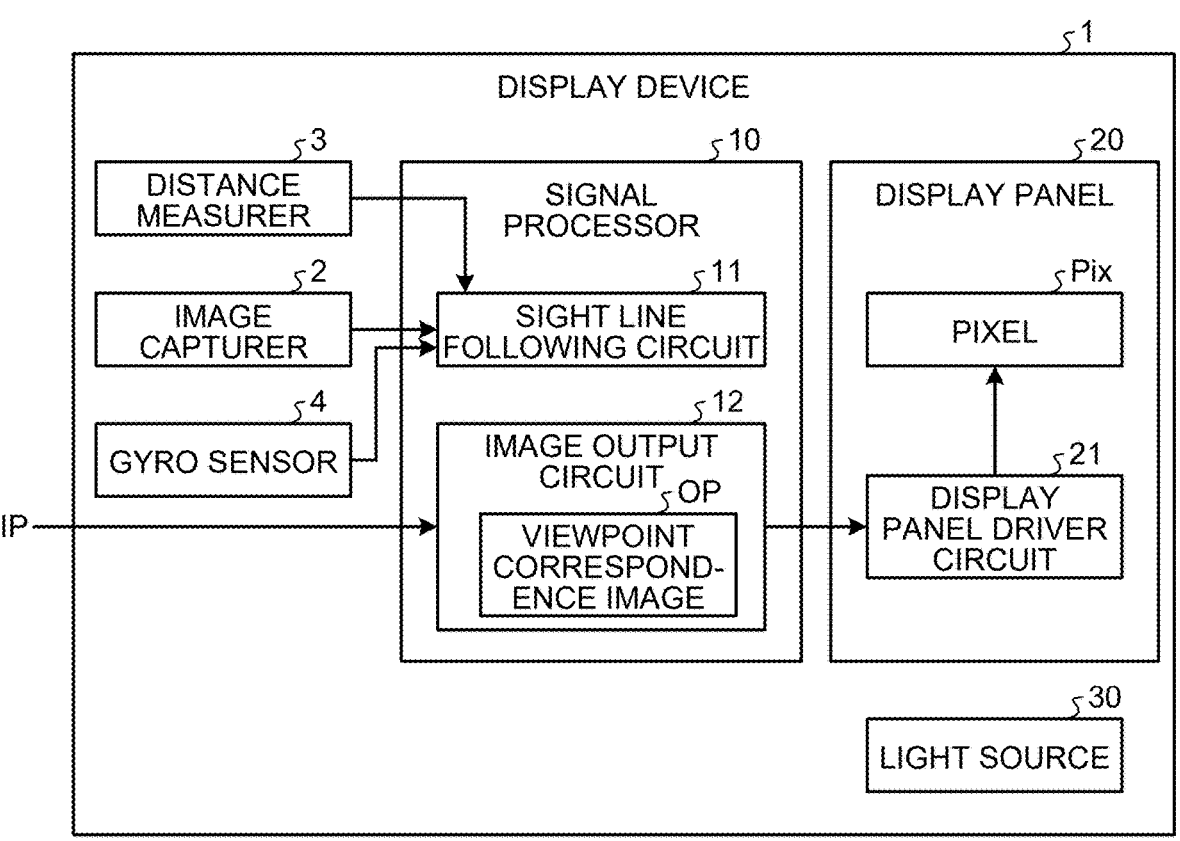
FIG. 1 is a block diagram illustrating a main configuration of a display device.

FIG. 1 is a block diagram illustrating a main configuration of a display device 1. The display device 1 includes an image capturer 2, a distance measurer 3, a signal processor 10, a display panel 20, and a light source 30. The display device 1 is an information processing device (information processing terminal device) such as a smartphone, which has an image capturing function of the image capturer 2, a distance measurement function of the distance measurer 3, and an image display output function of the signal processor 10, the display panel 20, and the light source 30.

The image capturer 2 captures images. Specifically, the image capturer 2 includes an image capturing element such as a complementary metal oxide semiconductor (CMOS) image sensor. The image capturer 2 generates image data based on an electric signal output from the image capturing element.

The distance measurer 3 measures the distance between the display device 1 and a target to be image-captured that the image capturer 2 faces. Specifically, the distance measurer 3 includes a light emitter and a light sensor constituting a time-of-flight (ToF) sensor, for example. The distance measurer 3 including such a ToF sensor performs distance measurement based on the time difference between a light emission timing at which the light emitter emits light and a sensing timing at which a laser beam emitted by the light emitter is sensed by the light sensor after reflection by the target to be image-captured. A specific mechanism with which the distance measurer 3 performs distance measurement is not limited to the above-described configuration, but may be a mechanism using an auto focus (AF) function of a camera, such as what is called a contrast AF. In such a mechanism, the AF function is used to set, as a distance measured by the distance measurer 3, a distance identified by the AF function of the image capturer 2 to be a distance at which an image is focused. In an embodiment, the image capturer 2 and the distance measurer 3 cooperatively function as an acquirer that acquires information indicating the positions of two viewpoints (a first viewpoint E1 (right eye) and a second viewpoint E2 (left eye) to be described later) of a user facing the display panel 20.

The image capturer 2 is provided with the assumption of capturing an image of the user viewing an image display surface of the display panel 20. The distance measurer 3 is provided with the assumption of measuring the distance between the image display surface of the display panel 20 and the user viewing the image display surface. Specifically, the image capturer 2 and the distance measurer 3 are disposed on, for example, a side closer to one surface of a housing of the display device 1 where the image display surface of the display panel 20 is exposed.

The signal processor 10 includes a sight line following circuit 11 and an image output circuit 12. The sight line following circuit 11 acquires information related to the position of the user's viewpoint relative to the display panel 20 based on outputs from the image capturer 2 and the distance measurer 3. The information related to the viewpoint position will be described later in detail.

The image output circuit 12 outputs image data corresponding to the viewpoint position to the display panel 20 based on the information related to the viewpoint position acquired by the sight line following circuit 11. The image data output from the image output circuit 12 is, for example, image data based on an image signal IP input to the display device 1 from external information processing but may be image data stored in advance in a storage device included in the display device 1. The image output circuit 12 generates a viewpoint correspondence image OP from the image data based on the image signal IP or the image data stored in advance in the storage device included in the display device 1 and outputs, to the display panel 20, image data corresponding to the viewpoint position acquired by the sight line following circuit 11, in the viewpoint correspondence image OP.

Figure 2:
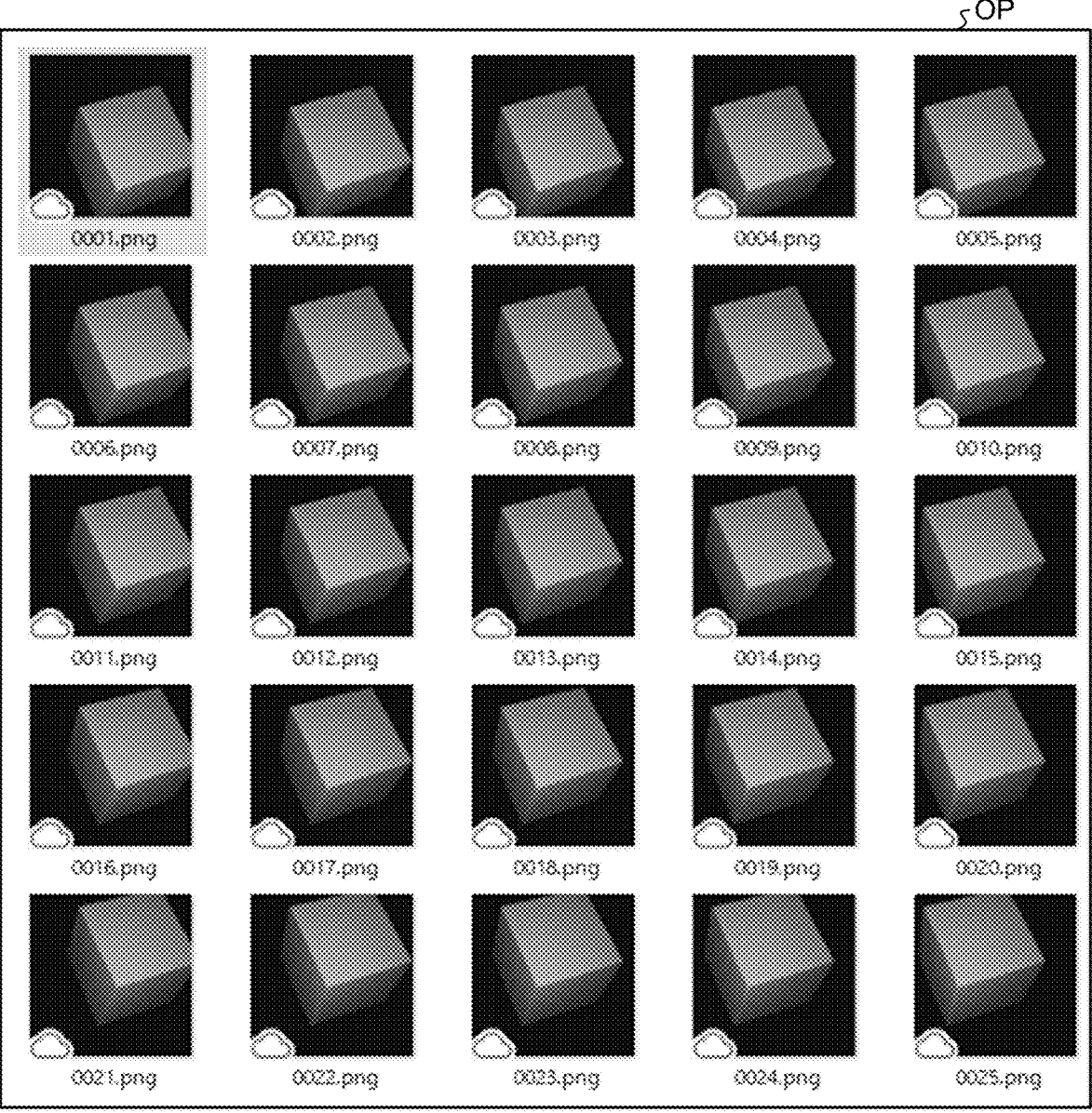
FIG. 2 illustrates an example of viewpoint correspondence images.

FIG. 2 illustrates an example of the viewpoint correspondence image OP. As illustrated in FIG. 2, the viewpoint correspondence image OP includes a plurality of pieces of image data. The pieces of image data included in the viewpoint correspondence image OP correspond to different viewpoints (more specifically, viewpoints corresponding to one eye of a viewer), respectively. In FIG. 2, file names of sequential numbers "0001" to "0025" exemplarily indicate 25 pieces of data in the Portable Network Graphics (PNG) format, but the file names, the format, and the number of images included in the viewpoint correspondence image OP are not limited thereto and may be changed as appropriate. The image output circuit 12 outputs, to the display panel 20, image data corresponding to the viewpoint position acquired by the sight line following circuit 11 in the viewpoint correspondence image OP including a plurality of images as exemplarily illustrated in FIG. 2.

As illustrated in FIG. 1, the display panel 20 includes a display panel driver circuit 21. The display panel driver circuit 21 includes a circuit such as a display driver integrated circuit (DDIC), which performs various kinds of processing related to image display output of the display panel 20. The display panel driver circuit 21 drives a plurality of pixels Pix included in the display panel 20 in accordance with the image data output from the image output circuit 12.

Figure 3:
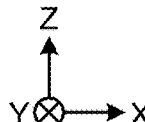
FIG. 3 is a schematic diagram illustrating a multilayered structure included in a display panel.

FIG. 3 is a schematic diagram illustrating a multilayered structure included in the display panel 20. As illustrated in FIG. 3, the display panel 20 includes a first substrate 22 and a second substrate 23. The first substrate 22 and the second substrate 23 are light-transmitting substrates such as glass substrates. The first substrate 22 and the second substrate 23 are stacked with a liquid crystal layer interposed therebetween. The liquid crystal layer is sealed between the first substrate 22 and the second substrate 23. The display panel 20 is what is called a liquid crystal display panel.

Hereinafter, a direction in which the first substrate 22 and the second substrate 23 face each other is referred to as a Z direction. One of two directions orthogonal to the Z direction is referred to as an X direction, and the other is referred to as a Y direction. The X and Y directions are orthogonal to each other.

A multilayered structure is formed on a surface of the first substrate 22 on the second substrate 23 side. The multilayered structure is made of a plurality of layers including, for example, a first electrode layer in which a plurality of pixel electrodes are formed, a second electrode layer in which a common electrode provided with a reference potential for the pixels Pix is formed, a circuit formation layer in which a switching element for individually transmitting a signal to each pixel electrode, wiring coupled to the switching element, and the like are formed, and insulating layers insulating these layers from each other. The pixel electrodes are individually provided for sub pixels included in the pixels Pix. When driven under control by the display panel driver circuit 21, the pixels Pix are controlled so that the alignment direction of liquid crystal molecules overlapping the position of each pixel electrode at a plan view point becomes a direction in accordance with the potential difference between the common electrode and the pixel electrode. The plan view point is a viewpoint at which a plane (X-Y plane) orthogonal to the Z direction is viewed from the front.

Figure 16:
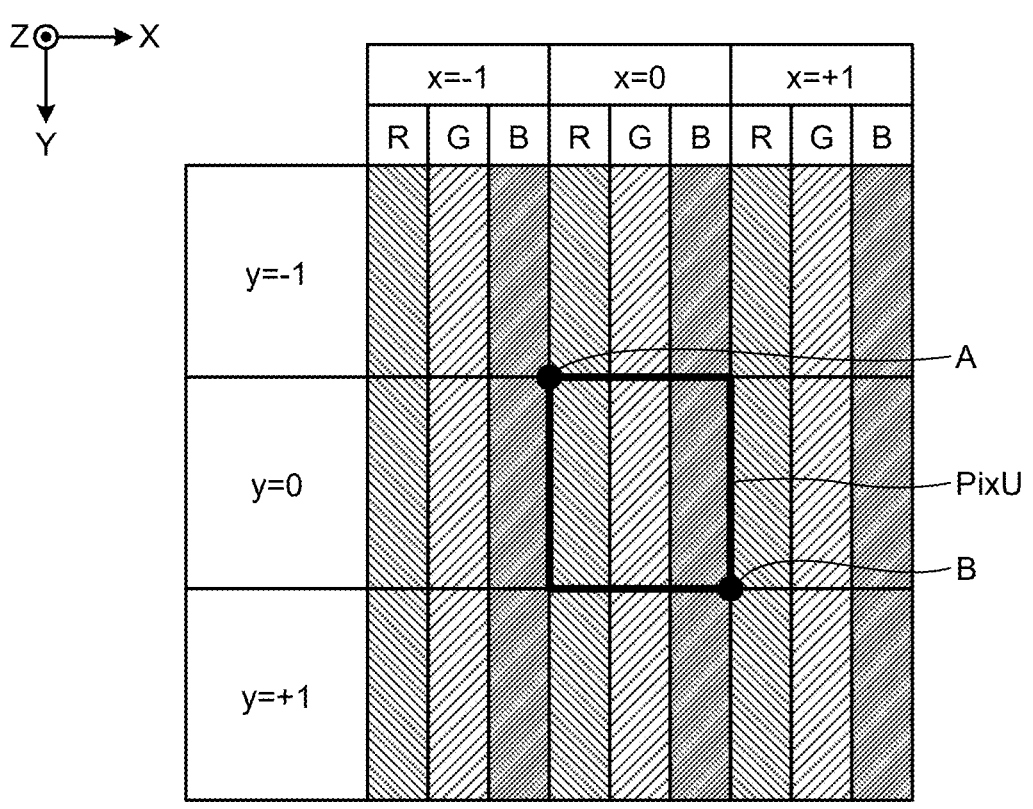
FIG. 16 is a diagram illustrating a coordinate system with respect to a pixel PixU.

As illustrated in FIG. 16 to be described later or the like, each pixel Pix includes a plurality of sub pixels. For example, each pixel Pix includes a sub pixel provided with a color filter that transmits light in red (R), a sub pixel provided with a color filter that transmits light in green (G), and a sub pixel provided with a color filter that transmits light in blue (B). It is not essential that each pixel Pix includes all of these sub pixels, but for example, one of two pixels Pix adjacent to each other may include sub pixels in some colors among sub pixels in a plurality of colors, and the other pixel Pix may include sub pixels in the other colors. Some or all pixels Pix may include sub pixels provided with color filters that transmit light in colors different from the colors exemplarily described above. A sub pixel provided with a colorless filter or no color filter may further be provided, where light from this sub pixel is perceived as, for example, white (W). When the pixel Pix includes the above-described three sub pixels, the shape of the pixel Pix is preferably a square (with equal lengths in the X and Y directions), but may be a rectangular shape in which either sides in the X direction or sides in the Y direction are longer than the other sides.

For example, the color filters individually provided for the sub pixels included in each pixel Pix, and a black matrix that functions as a partition between the color filters for respective sub pixels, are provided in the second substrate 23. The common electrode may be provided in the second substrate 23 instead of the first substrate 22.

A pixel pitch PP illustrated in FIG. 3 is the width of one second pixel Pix2 in the X direction. Although first pixels Pix1 and second pixels Pix2 are distinctly illustrated in FIG. 3, the first pixels Pix1 and the second pixels Pix2 are pixels Pix with the same configuration and have no configuration difference therebetween. Thus, the width of each pixel Pix in the X direction is the pixel pitch PP. Precisely, the pixel pitch PP in the X-direction is the distance between the X-directional center point of one side of the black matrix surrounding one pixel Pix and the X-directional center point of the other side thereof, wherein the one side is positioned on one end side of the one pixel Pix in the X direction, and the other side is positioned on the other end side of the one pixel Pix in the X direction. Alternatively, the pixel pitch may be the center-to-center distance between the sub pixels in the same color in respective pixels adjacent to each other when viewed in the X direction.

The display panel 20 faces the light source 30 with a polarization layer 24 and a spacer 40 interposed therebetween. The polarization layer 24 is provided on the first substrate 22 side (display panel back surface side) in the display panel 20. The spacer 40 is a light-transmitting member having a plate shape and disposed to face the first substrate 22 with the polarization layer 24 interposed therebetween, and is, for example, glass. A bonding layer 42 is interposed between the spacer 40 and the polarization layer 24. The bonding layer 42 bonds the polarization layer 24 and the spacer 40 together. In a case where a support member that holds the interval between the light source 30 and the polarization layer 24 can be provided, a configuration in which a space layer is provided between them may be employed.

The light source 30 includes a planar light source 31, light emission points 32, and a light-shielding member 33 as illustrated in, for example, FIG. 3. The planar light source 31 is a planar light source that emits light from at least a surface on the display panel 20 side. With an exemplary specific configuration, the planar light source 31 includes, for example, a light guiding plate facing the display panel 20 in the Z direction, and a light source element (for example, light emitting diode (LED)) configured to emit light to the light guiding plate in a direction orthogonal to the Z direction. Disposition of the planar light source 31 illustrated in FIG. 3 indicates disposition of the light guiding plate, and illustration of the light source element is omitted. The light emission points 32 are holes provided through the light-shielding member 33. The light-shielding member 33 covers a surface of the planar light source 31 on the spacer 40 side except for places where the light emission points 32 are formed. A bonding layer 43 is interposed between the light-shielding member 33 and the spacer 40. The bonding layer 43 bonds the polarization layer 24 and the spacer 40 together. The bonding layers 42 and 43 are light-transmitting functional films having double-sided adhesive properties, such as optical clear adhesive (OCA). The light source 30 emits light generated by the planar light source 31 to the display panel 20 through the light emission points 32.

A light emission point pitch SpP illustrated in FIG. 3 is the interval between the X-directional center lines of respective light emission points 32 adjacent to each other in the X direction. The light emission point pitch SpP is 4n times or 6n times the pixel pitch PP. The number n is a natural number. The number n is, for example, 1, but may be equal to or larger than 2. FIG. 3 exemplarily illustrates a case where the light emission point pitch SpP is four times the pixel pitch PP.

As described above, the image output circuit 12 outputs, to the display panel 20, image data out of the viewpoint correspondence image OP corresponding to the viewpoint position acquired by the sight line following circuit 11. Hereinafter, unless otherwise stated, an image means an image displayed and output by the display panel 20 in accordance with the image data output from the image output circuit 12. The display panel 20 performs display output corresponding to the image data. Thus, the display panel 20 displays an image corresponding to the viewpoint position acquired by the sight line following circuit 11. FIG. 3 schematically illustrates the display panel 20 performing display output of images individually corresponding to the first viewpoint E1 and the second viewpoint E2. The first pixels Pix1 are pixels Pix controlled to perform display output of an image corresponding to the first viewpoint E1. The second pixels Pix2 are pixels Pix controlled to perform display output of an image corresponding to the second viewpoint E2.

The first viewpoint E1 corresponds to the right eye of the user. The second viewpoint E2 corresponds to the left eye of the user. A middle point CP is the middle point on a straight line between the first viewpoint E1 and the second viewpoint E2. The position of the middle point CP typically corresponds to the position of the nose of the user in the arrangement direction of the first viewpoint E1 and the second viewpoint E2. FIG. 3 illustrates a case where the arrangement direction of the first viewpoint E1 and the second viewpoint E2 is the X direction. When the distance between the first viewpoint E1 and the middle point CP in the X direction and the distance between the second viewpoint E2 and the middle point CP in the X direction are a distance D1 and the distance between the first viewpoint E1 and the second viewpoint E2 in the X direction is a distance D2, the distance D2 is two times the distance D1.

Coordinates representing the position of the middle point CP with respect to a predetermined origin of the display panel 20 can be expressed as (pos_x, pos_y, pos_h). The symbol "pos_x" represents the coordinate of the middle point CP in the X direction. The symbol "pox_y" represents the coordinate of the middle point CP in the Y direction. The symbol "pox_h" represents the position of the middle point CP in the Z direction. The coordinates in the X and Y directions of the predetermined origin of the display panel 20 may correspond to, for example, the position of one of the four apexes of a display region that has a quadrilateral shape at the plan view point and in which the pixels Pix are disposed on the display panel 20. Alternatively, the origin may be the center of this display region of the display panel 20. The position of the predetermined origin of the display panel 20 in the Z direction may correspond to a position on a center line of the pixels Pix (for example, the first pixels Pix1 and the second pixels Pix2 illustrated in FIG. 3) in the Z direction. Specifically, the center line of the pixels Pix in the Z direction is the center line of the liquid crystal layer sealed between the first substrate 22 and the second substrate 23 in the Z direction, and is preferably set at, for example, the height position of d/2 where the symbol "d" represents a cell gap of the display panel 20. The position of the predetermined origin of the display panel 20 is not limited thereto but may be an arbitrary position. Hereinafter, unless otherwise stated, the term "origin" means the predetermined origin of the display panel 20.

The sight line following circuit 11 identifies the positions of the two eyes (right and left eyes) of the user, who is included in an image captured by the image capturer 2, in the captured image. The identification is performed based on, for example, pattern matching but not limited thereto, and may be performed based on, for example, image identification using machine learning or the like. Information indicating the relation between a position in an image capturing area of the captured image and its X-directional and Y-directional coordinates is held by the signal processor 10 in advance and prepared to be able to be referred by the sight line following circuit 11. The sight line following circuit 11 regards the middle point between the right and left eyes in the image captured by the image capturer 2 as the middle point CP and identifies the X-directional and Y-directional coordinates of the middle point CP. Such a method of identifying the position of the middle point CP is merely exemplary, and the present disclosure is not limited thereto, and the method may be changed as appropriate. For example, the sight line following circuit 11 may identify the middle point CP based on the positional relation between the position of the nose of the user and the positions of the two eyes (right and left eyes) of the user included in the image captured by the image capturer 2. The sight line following circuit 11 acquires a distance value measured by the distance measurer 3 as the value of pos_h. The sight line following circuit 11 regards the middle point between the right and left eyes in the image captured by the image capturer 2 as the middle point CP and sets the position of the middle point CP in the Z direction as pos_h. In this manner, the sight line following circuit 11 derives information related to the viewpoint position.

Light emitted from each light emission point 32 reaches the first viewpoint E1 and the second viewpoint E2. The first pixel Pix1 is positioned on a ray line L1 of light reaching the first viewpoint E1 from each light emission point 32. The second pixel Pix2 is positioned on a ray line L2 of light reaching the second viewpoint E2 from each light emission point 32. An image output by the first pixels Pix1 is different from an image output by the second pixels Pix2. The image output by the first pixels Pix1 is an image corresponding to the position of the first viewpoint E1. The image output by the second pixels Pix2 is an image corresponding to the position of the second viewpoint E2. More specifically, for example, the image of 0014.png in FIG. 2 is employed as an image for the right-eye viewpoint, the image of 0012.png is employed as an image for the left-eye viewpoint, and these images are combined by the signal processor and displayed as one image (stereoscopic display image). More specifically, on condition that the stereoscopic display image, the image 0014.png, and the image 0012.png have the same number of pixels, when, for example, a left-eye image, a left-eye image, a right-eye image, and a right-eye image need to be sequentially displayed at the pixels (n, m+1) (which means the (m+1)-th pixel on the n-th row; the same is applied to the rest of this paragraph), (n, m+2), (n, m+3), and (n, m+4) on a pixel row of the stereoscopic display image, pixel signals corresponding to (n, m+1) and (n, m+2) of the left-eye image 0012.png are used for pixels (signals) corresponding to (n, m+1) and (n, m+2) of the stereoscopic display image. Similarly, pixel signals corresponding to (n, m+3) and (n, m+4) of the right-eye image 0014.png are used for pixels (signals) corresponding to (n, m+3) and (n, m+4) of the stereoscopic display image. Depending on the relation between the user's viewpoint position and each light source (light emission point 32), some pixels Pix do not need to display an image. In such a case, an image (for example, black image) with the lowest luminance is displayed by such pixels Pix. The image output circuit 12 outputs image data including image data corresponding to a plurality of viewpoints (for example, the first viewpoint E1 and the second viewpoint E2) to the display panel 20, to perform such image display output.

The distance between the center line of a pixel Pix in the Z direction and the middle point CP in the Z direction can be expressed as a distance Ph. The magnitude of the distance Ph corresponds to the magnitude of the value of pos_h described above. The distance between the center line of the pixel Pix in the Z direction and the emission start point of light from a light emission point 32 in the Z direction can be expressed as a distance Th. The distance Th is significantly small as compared to the distance Ph. In view of this point, the center line of the pixel Pix in the Z direction may be defined on the same plane as the pixel electrode or may be defined on the same flat plate shape as the back or front surface of the second substrate 23 or the front surface of a cover glass provided on the display panel 20. In the embodiment, the position in the Z direction of the emission start point of light from the light emission point 32 is on the boundary line between the light-shielding member 33 and the bonding layer 43.

Figure 4:
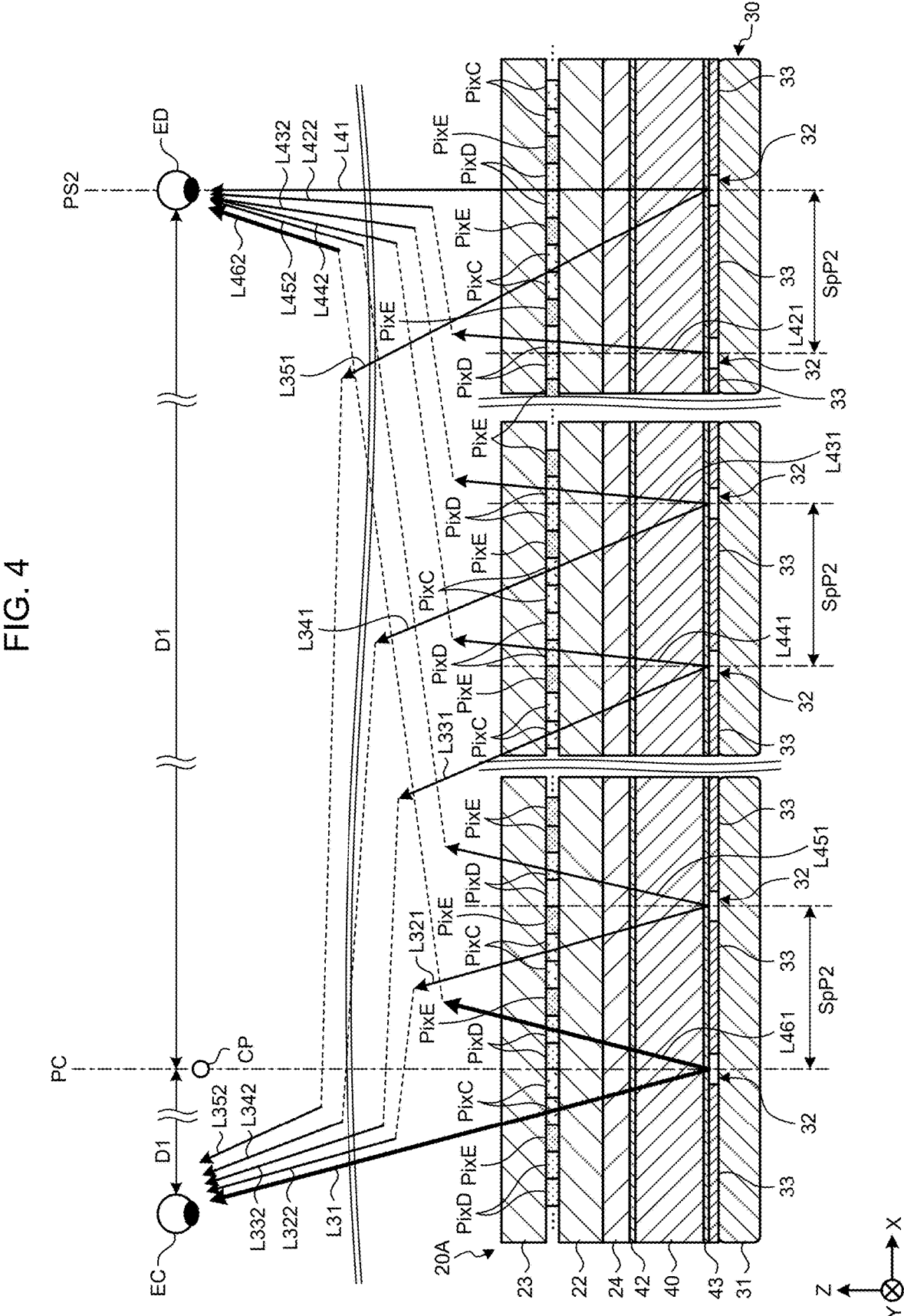
FIG. 4 is a sectional view illustrating an example in which the light emission point pitch is six times the pixel pitch.

The following describes, with reference to FIG. 4, the relation between the light emission point pitch (for example, light emission point pitch SpP or light emission point pitch SpP2) between light emission points 32 adjacent to each other in the X direction and the pitch (pixel pitch PP) between pixels Pix arranged in the X direction and the relation between the light emission point pitch and light emitted from each light emission point 32 to each of a plurality of viewpoints. FIG. 4 is a sectional view illustrating a section of a display panel 20A along a plane (X-Z plane) orthogonal to the Y direction, like the display panel 20 in FIG. 3. The display panel 20 illustrated in FIG. 1 may be the display panel 20A illustrated in FIG. 4 and subsequent diagrams.

FIG. 4 is a sectional view illustrating an example in which the light emission point pitch SpP2 is six times the pixel pitch PP unlike the light emission point pitch SpP illustrated in FIG. 3. In FIG. 4 and other diagrams referred in description of the embodiment, a ray line L(m)1 and a ray line L(m)2 coupled to each other through a dashed line constitute one ray line of light in reality. For example, a ray line L321 is part of the ray line L(m)1 in the case of m=32, and represents the ray line of light just having emitted from one light emission point 32. A ray line L322 is part of the ray line L(m)2 in the case of m=32 and indicates a state in which the ray line is reaching a first viewpoint EC. The same manner of illustration applies in the subsequent diagrams, and this should be understood as a way of illustrating the relation between the display panel 20 and each viewpoint in one diagram since the distance therebetween is significantly large as compared to the pixel pitch PP or the like. In FIG. 4, m is a natural number of 32 to 35 or a natural number of 42 to 45. The ray line of light in a case where m is a natural number of 32 to 35 and a ray line L31 are each the ray line of light reaching the first viewpoint EC through a first pixel PixC. The ray line of light in a case where m is a natural number of 42 to 45 and a ray line L41 are each the ray line of light reaching a second viewpoint ED through a second pixel PixD. In FIG. 4, a line extending in the Z direction and passing through the second viewpoint ED is illustrated as a dashed and single-dotted line PS2.

The first viewpoint EC is one of the first viewpoint E1 and the second viewpoint E2 (refer to FIG. 3). The second viewpoint ED is the other of the first viewpoint E1 and the second viewpoint E2. In a case where the first viewpoint EC is the first viewpoint E1, the first pixels PixC are the first pixels Pix1 (refer to FIG. 3). In a case where the second viewpoint ED is the second viewpoint E2, the second pixels PixD are the second pixels Pix2 (refer to FIG. 3).

As illustrated in FIG. 4, the display panel 20A has a configuration in which six pixels Pix are arranged in the light emission point pitch SpP2, which is the interval between the X-directional center lines of two light emission points 32 adjacent to each other in the X direction. The X-directional positions of the X-directional center lines of the two light emission points 32 each overlap the X-directional position of the boundary line between two pixels Pix adjacent to each other in the X direction at the plan view point.

For example, as illustrated in FIG. 4, two of the six pixels Pix are controlled as the first pixels PixC. Another two of the six pixels Pix are controlled as the second pixels PixD. The other pixels Pix corresponding to none of the first pixels PixC and the second pixels PixD among the six pixels Pix are referred to as third pixels PixE. The third pixels PixE are pixels Pix with the lowest light transmission degree (for example, black display).

As illustrated with the ray line L41, the ray line of light reaching the second viewpoint ED through a second pixel PixD at a position facing the second viewpoint ED in the Z direction extends in the Z direction. In other words, the ray line of light from a light emission point 32 facing the second viewpoint ED in the Z direction extends in the Z direction. In FIG. 4, a line extending in the Z direction and passing through the second viewpoint ED is illustrated as the dashed and single-dotted line PS2. As illustrated with ray lines L42, L43, L44, L45, and L46, the ray line of light reaching the second viewpoint ED from a light emission point 32 at a position separated in the X direction from a reference light emission point 32 that emits light along the ray line L41 has a larger tilt angle in the Z direction as the distance from the light emission point 32 in the X direction is larger. Among the plurality of pixels Pix, pixels Pix to be controlled as second pixels PixD are determined based on such a ray line of light. With a similar approach, as indicated with the relation between the ray lines L31, L32, L33, L34, L35, and L36 and the first pixels PixC, among the plurality of pixels Pix, pixels Pix to be controlled as the first pixels PixC are determined based on the ray line of light emitted from the light emission point 32 and reaching the first viewpoint EC.

However, in some places, it is not necessarily appropriate to dispose pixels Pix to be controlled as the second pixels PixD at equal intervals in the X direction depending on the difference between the tilt angles of the ray lines L42, L43, L44, L45, and L46 with respect to the Z direction. With a similar approach, in some places, it is not necessarily appropriate to dispose pixels Pix to be controlled as the first pixels PixC at equal intervals in the X direction. The third pixels PixE may be disposed as appropriate in correspondence with such disposition control of the first pixels PixC and the second pixels PixD, or the degree of light transmission may be controlled for each sub pixel as described later with reference to FIG. 17 and other diagrams. With such disposition control, the probability of crosstalk occurrence can be more reliably reduced.

In FIG. 4, the middle point CP is positioned on a dashed and single-dotted line PC overlapping the center line of one light emission point 32 in the X direction, but the position of the middle point CP overlapping the center line of the light emission point 32 in the X direction is not essential. The correspondence relation between the following: light from each light emission point 32; the positional relation between a first viewpoint EC and a second viewpoint ED in accordance with the position of the middle point CP; and control of the pixels Pix as first pixels PixC and second pixels PixD, is the same as described above with reference to FIG. 4 irrespective of the position of the middle point CP.

Figure 5:
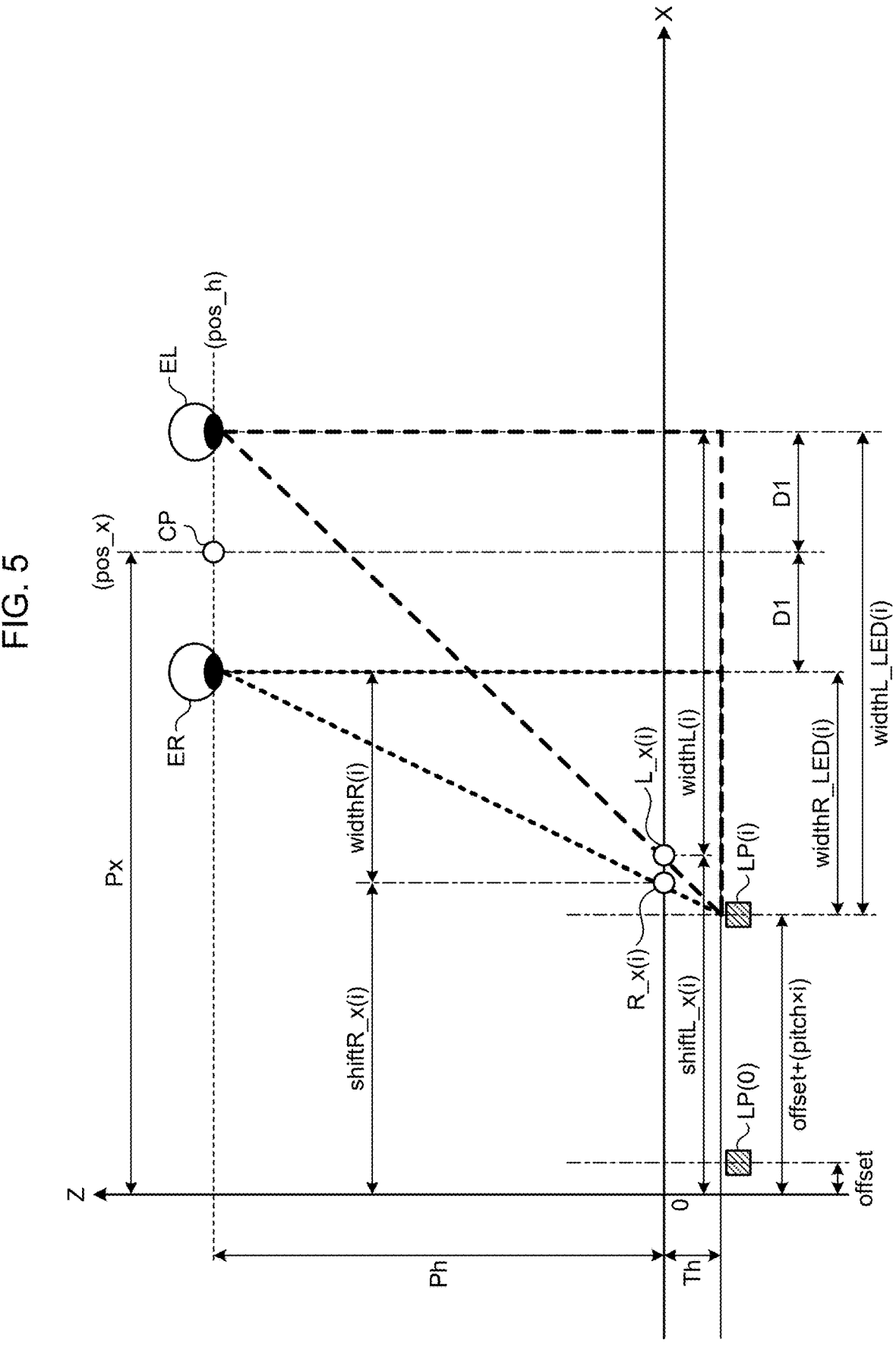
FIG. 5 is a diagram illustrating various parameters related to determination of the X-directional coordinate of a pixel positioned on the ray line extending from a light emission point, which is the (i+1)-th light emission point counted from the origin in an X direction, to a viewpoint.

The following describes the fundamental concept of drive control of pixels Pix in accordance with the relative positional relation between a viewpoint and the emission start point of a light with reference to FIG. 5.

FIG. 5 is a diagram illustrating various parameters related to determination of the X-directional coordinates R_x(i) or L_x(i) of a pixel Pix positioned on the ray line extending from a light emission point LP(i), which is the (i+1)-th light emission point counted from the origin in the X direction, to the corresponding one of viewpoints ER and EL.

The light emission point LP(0) illustrated in FIG. 5 indicates the emission start point of light from a light emission point (for example, light emission point 32) disposed at a position (first position) closest to the origin in the X direction. The light emission point LP(i) indicates the emission start point of light from a light emission point disposed at the (i+1)-th closest position to the origin in the X direction. For example, in a case of i=1, the light emission point LP(1) indicates the emission start point of light from a light emission point disposed at the closest position next to the light emission point LP(0) to the origin in the X direction, which means that the light emission point LP(1) indicates the secondary closest position. Thus, "i" is an integer equal to or larger than zero.

In FIG. 5, the distance between the origin and the light emission point LP(0) in the X direction is denoted by "offset". The distance between the origin and the light emission point LP(i) in the X direction can be expressed as "offset+(pitch×i)". The magnitude of the value "pitch" corresponds to the magnitude of the light emission point pitch SpP or the magnitude of the light emission point pitch SpP2 described above. The values "offset" and "offset+(pitch×i)" are determined in advance in accordance with the design of the display device 1 and are parameters referrable in calculation related to determination of the X-directional coordinates R_x(i) and L_x(i).

The magnitude of the distance Ph described above with reference to FIG. 3 and illustrated in FIG. 5 corresponds to the magnitude of the value of pos_h. The magnitude of a distance Px illustrated in FIG. 5 corresponds to the magnitude of the value of pos_x. The distance between each of the light emission point LP(0) and the light emission point LP(i) and the origin in the Z direction is the distance Th described above. The values of pos_h and pos_x can be acquired by the image capturer 2 and the distance measurer 3.

Hereinafter, the distance between the origin and the coordinate R_x(i) in the X direction is denoted by shiftR_x (i). The distance between the coordinate R_x(i) and the viewpoint ER in the X direction is denoted by widthR(i). The distance between the light emission point LP(i) and the viewpoint ER in the X direction is denoted by widthR_LED (i). The viewpoint ER is the right-eye viewpoint of the user and is one of the first viewpoint E1 or EC and the second viewpoint E2 or ED.

The distance between the origin and the coordinate L_x(i) in the X direction is denoted by shiftL_x(i). The distance between the coordinate L_x(i) and the viewpoint EL in the X direction is denoted by widthL(i). The distance between the light emission point LP(i) and the viewpoint EL in the X direction is denoted by widthL_LED(i). The viewpoint EL is the left-eye viewpoint of the user and is the other of the first viewpoint E1 or EC and the second viewpoint E2 or ED.

The distance widthR_LED(i) can be expressed by Expression (1) below. In Expression (1) and other expressions, D1 is a value representing the magnitude of the distance D1 described above with reference to FIG. 3 and illustrated in FIG. 5. The value representing the magnitude of the distance D1 may be a predetermined value based on a typical user's average value. In the embodiment, the distance D1 is, for example, 31.25 millimeters (mm) but the present disclosure is not limited thereto, and the value may be changed as appropriate.

$$\text{widthR\_LED}(i) = \text{pos\_x} - D1 - \{\text{"offset"} + (\text{"pitch"} \times i)\} \qquad (1)$$

The distance widthR(i) can be expressed by Expression (2) below. In Expression (2) and other expressions, Th is a value representing the magnitude of the distance Th. The distance Th is determined in advance in accordance with the design of the display device 1. The concept for determining the distance Th in designing will be described later.

$$widthR(i) = \text{widthR\_LED}(i) \times \text{pos\_h}/(\text{pos\_h} + Th) \qquad (2)$$

The distance shiftR_x(i) can be expressed by Expression (3) below.

$$\text{shiftR\_x}(i) = \text{pos\_x} - D1 - widthR(i) \qquad (3)$$

The coordinate R_x(i) can be expressed by Expression (4) below. In Expression (4) and other expressions, PP is a value representing the magnitude of the pixel pitch PP. The pixel pitch PP is determined in advance in accordance with the design of the display device 1. In Expression (4) and other expressions, into) provides an integer value obtained by truncating the decimal portion of a value in the parentheses.

$$R\_x(i) = \text{int}\left(\text{shiftR\_x}(i)/PP\right) \qquad (4)$$

The distance widthL_LED(i) can be expressed by Expression (5) below.

$$\text{widthL\_LED}(i) = \text{pos\_x} + D1 - \{\text{"offset"} + (\text{"pitch"} \times i)\} \qquad (5)$$

The distance widthL(i) can be expressed by Expression (6) below.

$$widthL(i) = \text{widthL\_LED}(i) \times \text{pos\_h}/(pos)\_h + Th) \qquad (6)$$

The distance shiftL_x(i) can be expressed by Expression (7) below.

$$\text{shiftL\_x}(i) = \text{pos\_x} + D1 - widthL(i) \qquad (7)$$

14

The coordinate L_x(i) can be expressed by Expression (8) below.

$$L\_x(i) = \text{int}\left(\text{shiftL\_x}(i)/PP\right) \qquad (8)$$

The display output control in accordance with the positions of the first viewpoint E1 or EC and the second viewpoint E2 or ED, which is described above with reference to FIGS. 3 and 4 can be achieved by setting a pixel Pix in disposition corresponding to R_x(i) as the first pixels Pix1 or PixC and setting a pixel Pix in disposition corresponding to L_x(i) as the second pixels Pix2 or PixD.

Figure 6:
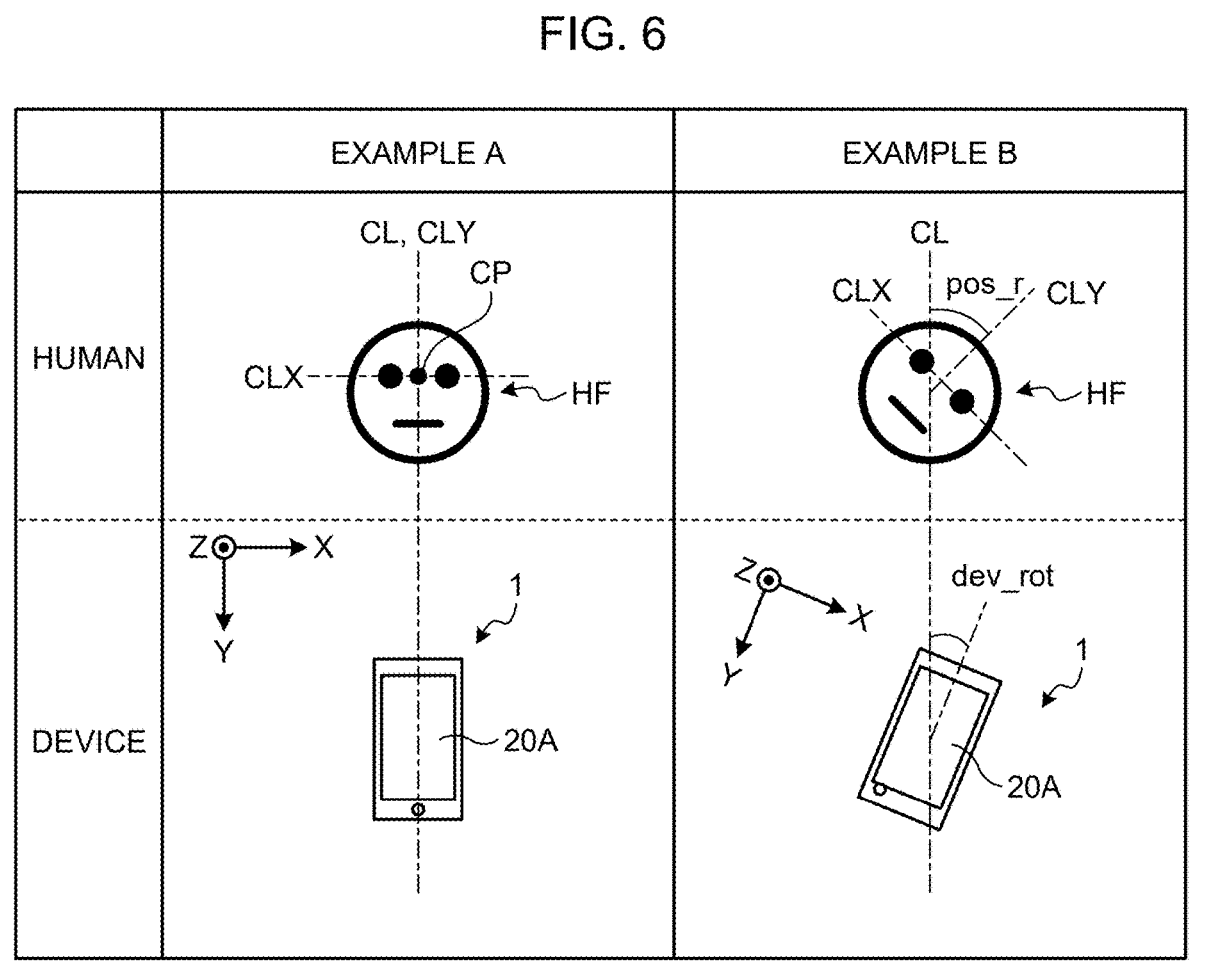
Figure 7:
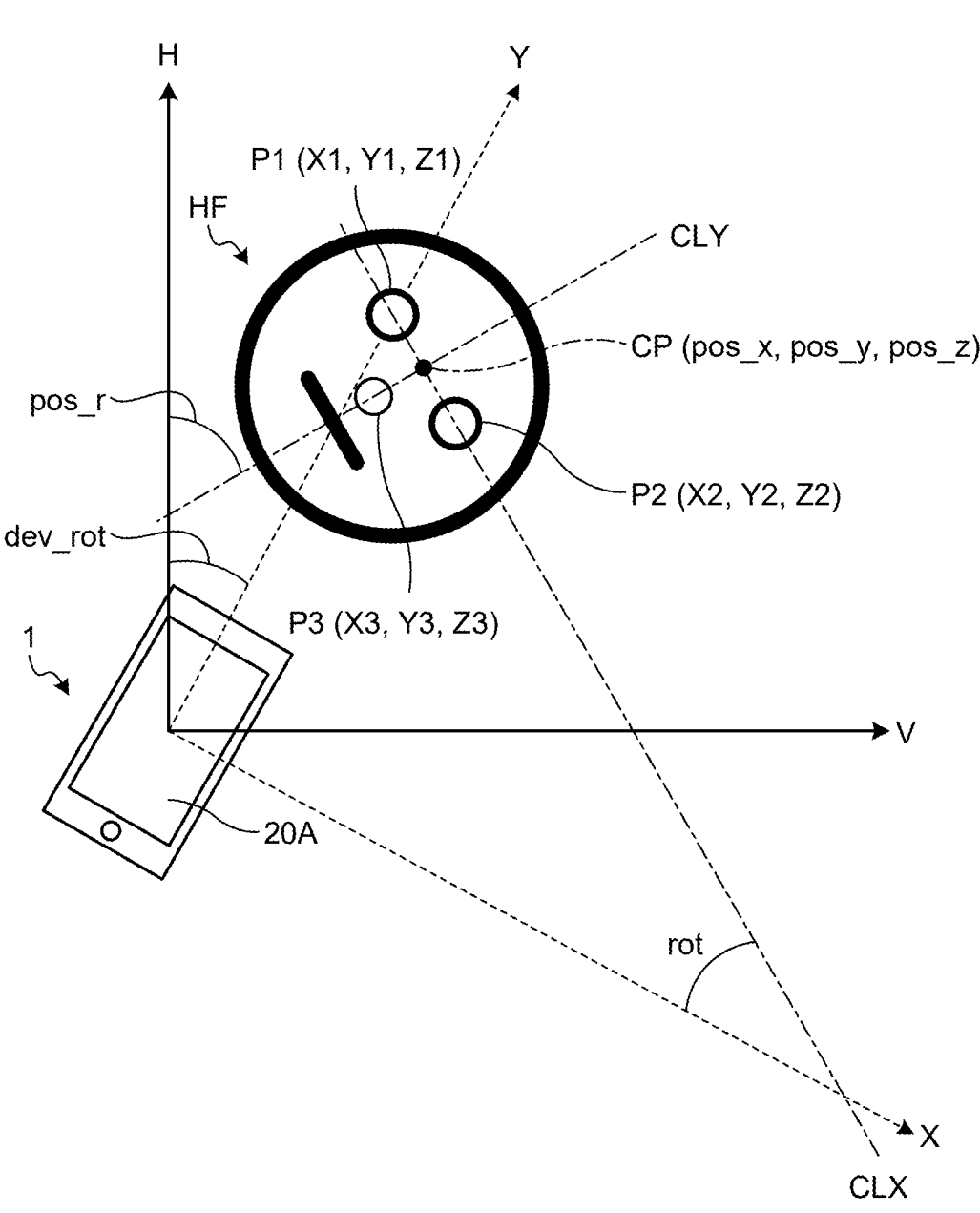
FIG. 7 is a schematic diagram illustrating an example of the angle difference between the face and the display panel with respect to a vertical line and a horizontal line.

The following describes the relative relation between the arrangement direction of the two eyes of a human and X and Y directions corresponding to disposition of pixels Pix of the display panel 20A with reference to FIGS. 6 and 7.

FIG. 6 is a schematic diagram illustrating Examples A and B of the relative angle relation between a human face HF and the display device 1 including the display panel 20A. The Y direction is assumed to be the longitudinal direction of the quadrilateral shape of the display panel 20A illustrated in FIG. 6 and other diagrams.

In Example A illustrated in FIG. 6, a reference line CLX extending in the arrangement direction of the two eyes of the face HF and passing through the middle point CP is parallel to the X direction of the display panel 20A. Both a midline CLY (refer to "Example B" and FIG. 7) of the face HF and a line bisecting the display panel 20A in the X direction overlap a straight line CL. The Y direction and the straight line CL are parallel to each other. In the case of Example A, as in description with reference to FIGS. 3 and 4, the arrangement direction of the first viewpoint E1 or EC and the second viewpoint E2 or ED aligns with the X direction. Thus, in Example A, the display output control based on description with reference to FIGS. 3 and 4 can be directly applied.

However, in Example B illustrated in FIG. 6, both the midline CLY of the face HF and the line bisecting the display panel 20A in the X direction do not overlap the straight line CL. An angle pos_r of the face HF with respect to the straight line CL and an angle dev_rot of the display panel 20A with respect to the straight line CL are different from each other. The angle pos_r is an angle formed by the midline CLY and the straight line CL. The angle dev_rot is an angle formed by the Y direction and the straight line CL.

In Example A, it can be considered that the angle pos_r and the angle dev_rot are both 0 degrees (°).

FIG. 7 is a schematic diagram illustrating an example of the angle difference between the face HF and the display panel 20A with reference to a vertical line H and a horizontal line V. The vertical line H aligns with the direction of gravity of the Earth. The horizontal line V aligns with a plane orthogonal to the vertical line H. The vertical line H illustrated in FIG. 7 corresponds to the straight line CL in FIG. 6.

The face HF illustrated in FIG. 7 includes points P1, P2, and P3. The point P1 represents the position of the first viewpoint E1 or EC. The point P2 represents the position of the second viewpoint E2 or ED. The point P3 represents a predetermined position (for example, the nose position) overlapping the midline of the face HF.

Coordinates representing the positions of the points P1, P2, and P3 are acquired based on image data captured by the image capturer 2 and the distance measurer 3.

As a specific example, the sight line following circuit 11 can identify the X-directional and Y-directional coordinates of the positions of the two eyes and nose of the human face HF by using image processing technologies with OpenCV. The sight line following circuit 11 performs processing of deriving the reference line CLX passing through the points P1 and P2. The sight line following circuit 11 also performs processing of deriving the midline CLY as a straight line orthogonal to the reference line CLX and passing through the point P3. The sight line following circuit 11 determines the middle point between the points P1 and P2 to be the middle point CP and derives the coordinates (pos_x, pos_y, pos_z) of the middle point CP from the coordinates (X1, Y1, Z1) of the point P1 and the coordinates (X2, Y2, Z2) of the point P2. Generally, the middle point CP overlaps the intersection point of the reference line CLX and the midline CLY. The Z-directional coordinates (Z1, Z2, Z3) of the points P1, P2, and P3 are measured by the distance measurer 3. The Z-directional coordinate (pos_z) of the middle point CP is regarded as the distance Ph.

The sight line following circuit 11 acquires information (tilt information) indicating the tilt direction of the display panel 20A with respect to the vertical line H and the horizontal line V from a gyro sensor 4 included in the display device 1. The sight line following circuit 11 derives the angle dev_rot based on the tilt information. The sight line following circuit 11 identifies the orientations of the X and Y directions of the display panel 20A with respect to the vertical line H and the horizontal line V based on the relation between the vertical line H, the horizontal line V, and the angle dev_rot.

The sight line following circuit 11 derives a relative angle rot formed between the reference line CLX and the X direction. In the following description, when the relative angle rot is a positive number, it is meant that the midline CLY of the face HF forms an angle in the clockwise direction with respect to the Y direction of the display panel 20A. When the relative angle rot is a negative number, it is meant that the midline CLY of the face HF forms an angle in the anticlockwise direction with respect to the Y direction of the display panel 20A. The relative angle rot can be expressed in the range of −180 degrees (°) to 180 degrees (°), for example. The angle pos_r is the summed value of the angle dev_rot and the relative angle rot.

The image output circuit 12 performs various kinds of processing related to display output control to display the viewpoint correspondence image OP on the display panel 20A by referring to information indicating the coordinates (pos_x, pos_y, pos_z) of the middle point CP and information indicating the relative angle rot (or the angle pos_r and the angle dev_rot) among various kinds of information derived and identified by the sight line following circuit 11. The details thereof will be described below.

Depending on the relative angle rot, individual image output to a plurality of viewpoints cannot be achieved by applying the control of pixels Pix along the X direction to the first pixels Pix1 or PixC and the second pixels Pix2 or PixD, which is described above with reference to FIGS. 3 and 4. The following describes the relation between the relative angle rot and the feasibility of stereoscopic viewing.

Figure 8:
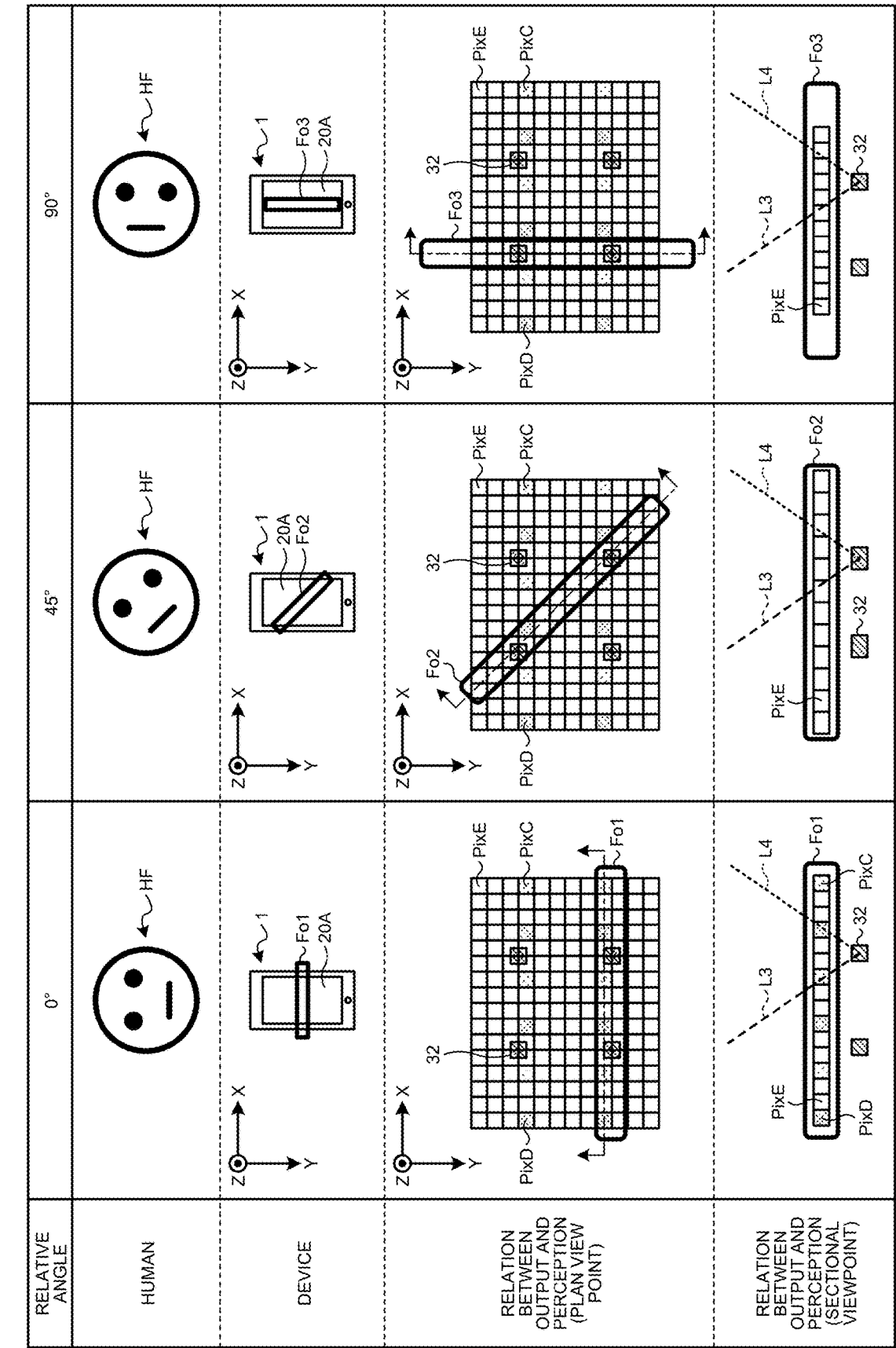
FIG. 8 is a schematic diagram illustrating an example of the relation between the relative angle and the feasibility of individual image output to a plurality of viewpoints by applying control of pixels Pix along the X direction to first pixels PixC and second pixels PixD, which is described above with reference to FIGS. 3 and 4.

FIG. 8 is a schematic diagram illustrating an example of the relation between the relative angle rot and the feasibility of individual image output to a plurality of viewpoints by applying the control of pixels Pix along the X direction to the first pixels PixC and the second pixels PixD, which is described above with reference to FIGS. 3 and 4.

In FIG. 8, the "human" row schematically indicates the orientation of the human face HF relative to the display panel 20A illustrated in the "device" row. In the "device" row, the area of the human's line of sight to the display panel 20A of the display device 1 is indicated as any of areas Fo1, Fo2, and Fo3. The "relation between output and perception (plan view point)" row schematically indicates the relation between light emission points 32 and pixels Pix at part of the display panel 20A including any of the areas Fo1, Fo2, and Fo3 illustrated in the "device" row. The "relation between output and perception (sectional viewpoint)" row indicates a section at a position illustrated with a dashed and single-dotted line and arrows in the "relation between output and perception (plan view point)" row.

As schematically illustrated with the area Fo1 in the "relation between output and perception (sectional viewpoint)" row, when the relative angle rot is 0 degrees (°), light L3 having passed through the first pixels PixC reaches the first viewpoint EC and light L4 having passed through the second pixels PixD reaches the second viewpoint ED by applying the control of pixels Pix along the X direction to the first pixels PixC and the second pixels PixD, which is described above with reference to FIGS. 3 and 4. Thus, when the relative angle rot is 0 degrees (°), it is possible to achieve individual image output to a plurality of viewpoints by applying the control of pixels Pix along the X direction to the first pixels PixC and the second pixels PixD, which is described above with reference to FIGS. 3 and 4.

As schematically illustrated with the area Fo2 in the "relation between output and perception (sectional viewpoint)" row, when the relative angle rot is 45 degrees (°), the ray line of light between each first pixel PixC and the first viewpoint EC and the ray line of light between each second pixel PixD and the second viewpoint ED do not hold by simply applying the control of pixels Pix along the X direction to the first pixels PixC and the second pixels PixD, which is described above with reference to FIGS. 3 and 4. Thus, when the relative angle rot is 45 degrees (°), it is difficult to achieve individual image output to a plurality of viewpoints by simply applying the control of pixels Pix along the X direction to the first pixels PixC and the second pixels PixD, which is described above with reference to FIGS. 3 and 4. As schematically illustrated with the area Fo3 in the "relation between output and perception (sectional viewpoint)" row, the same as when the relative angle rot is 45 degrees (°) is applied to the case when the relative angle rot is 90 degrees (°).

Figure 9:
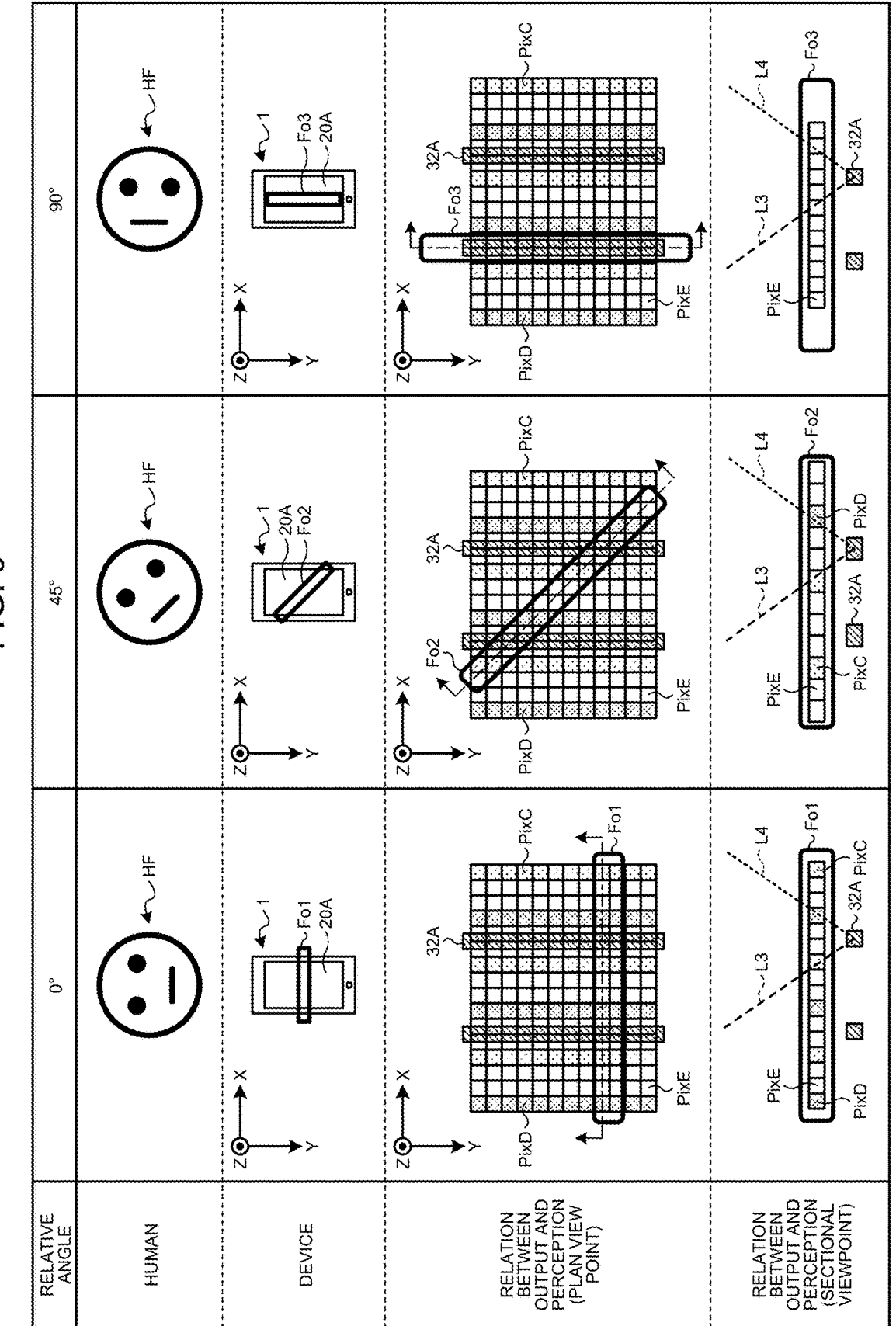
FIG. 9 is a schematic diagram illustrating another example of the relation between the relative angle and the feasibility of individual image output to a plurality of viewpoints by applying control of pixels Pix along the X direction to the first pixels PixC and the second pixels PixD, which is described above with reference to FIGS. 3 and 4.

FIG. 9 is a schematic diagram illustrating another example of the relation between the relative angle rot and the feasibility of individual image output to a plurality of viewpoints by applying the control of pixels Pix along the X direction to the first pixels PixC and the second pixels PixD, which is described above with reference to FIGS. 3 and 4. In the configuration illustrated in FIG. 9, linear light sources 32A are provided in place of the light emission points 32 described above with reference to FIG. 8. The light emission points 32 illustrated in FIG. 8 are holes or light-emitting elements that function as what is called point light sources. The linear light sources 32A illustrated in FIG. 9 are slits or light-emitting elements that function as linear light sources extending in the Y direction.

Even in a case where the linear light sources 32A are employed in place of the light emission points 32, it is possible to achieve individual image output to a plurality of viewpoints by applying the control of pixels Pix along the X direction to the first pixels PixC and the second pixels PixD, which is described above with reference to FIGS. 3 and 4, when the relative angle rot is 0 degrees (°). When the relative angle rot is 45 degrees (°) in a case where the linear light sources 32A are employed in place of the light emission points 32, it is possible to achieve individual image output to a plurality of viewpoints by applying the control of pixels Pix along the X direction to the first pixels PixC and the second pixels PixD, which is described above with reference to FIGS. 3 and 4, as illustrated in the "45°" column in FIG. 9, but it is unreliable. When the relative angle rot is 90 degrees (°), it is difficult, irrespective of whether the light emission points 32 or the linear light sources 32A are employed, to achieve individual image output to a plurality of viewpoints by simply applying the control of pixels Pix along the X direction to the first pixels PixC and the second pixels PixD, which is described above with reference to FIGS. 3 and 4.

As described above with reference to FIGS. 8 and 9, depending on the relative angle rot, it may be difficult to achieve individual image output to a plurality of viewpoints by simply applying the control of pixels Pix along the X direction to the first pixels Pix1 or PixC and the second pixels Pix2 or PixD, which is described above with reference to FIGS. 3 and 4. Thus, in the embodiment, processing (relative angle correspondence processing) for more appropriately controlling disposition of the first pixels Pix1 or PixC and the second pixels Pix2 or PixD in accordance with the relative angle rot is performed. The following describes an overview of this processing with reference to FIGS. 10 to 12.

Figure 10:
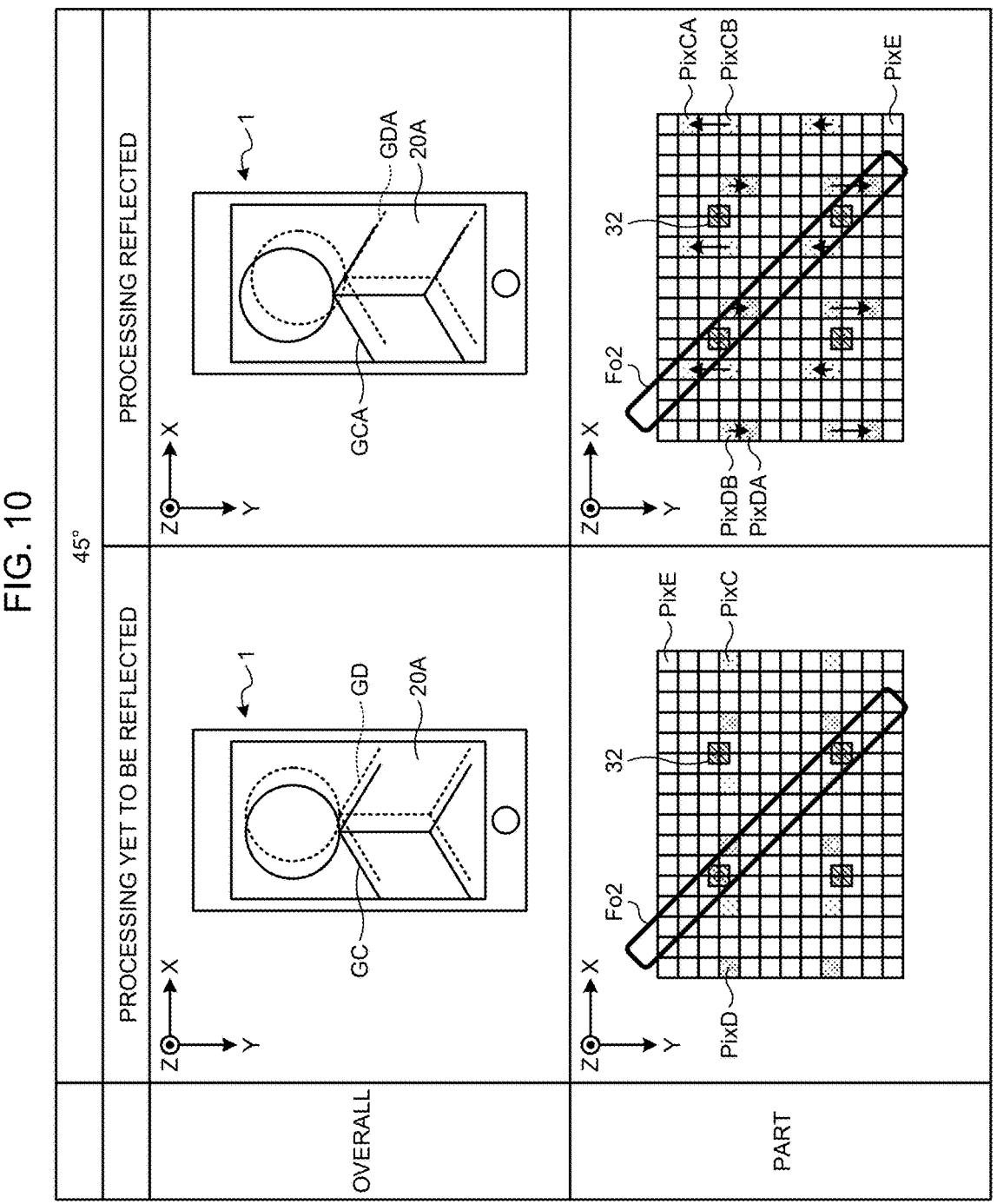
FIG. 10 is a schematic diagram illustrating an example of pixel arrangement control in a case where the relative angle is 45 degrees (°)
Figure 11:
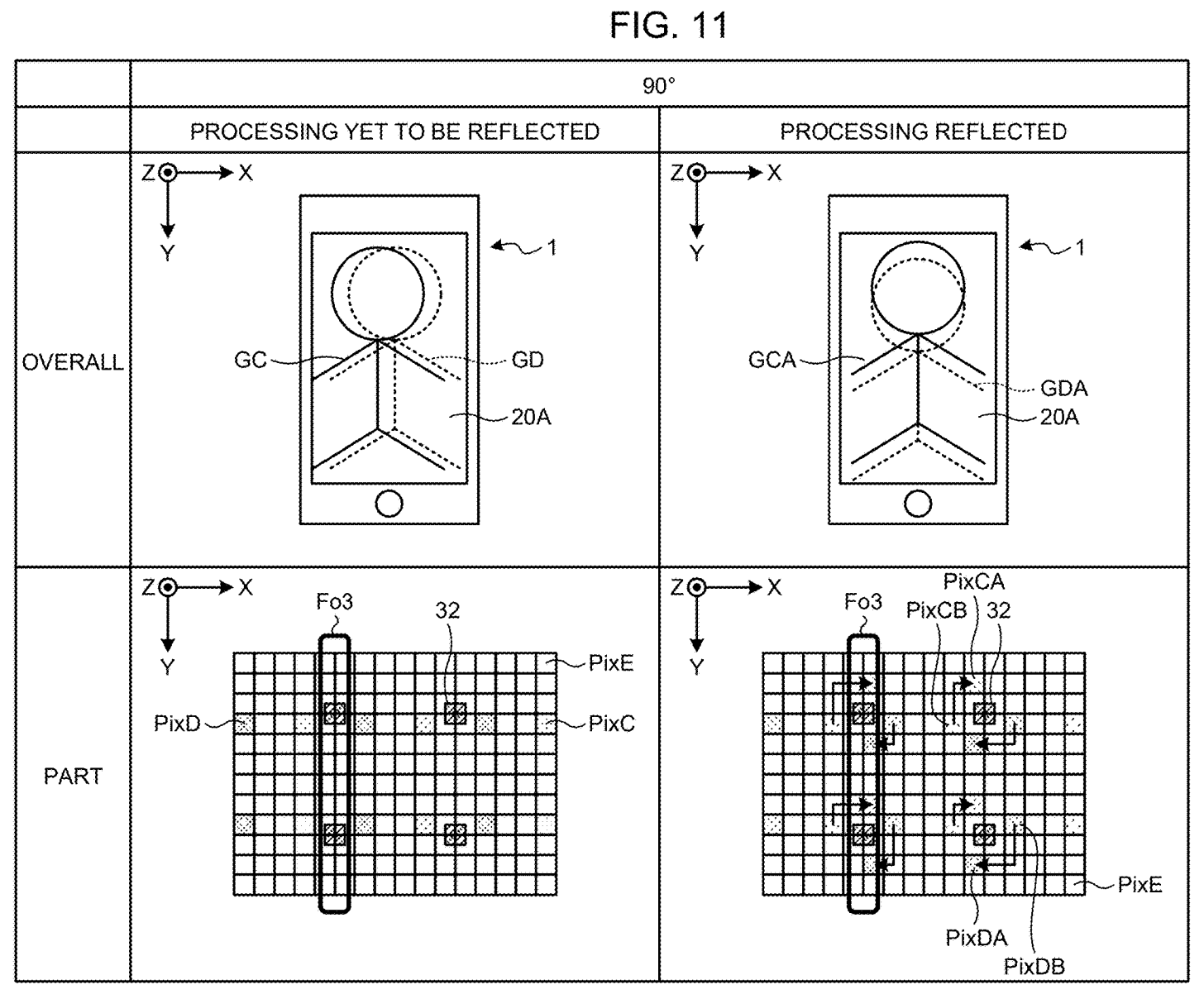

FIG. 10 is a schematic diagram illustrating an example of pixel arrangement control when the relative angle rot is 45 degrees (°). FIG. 11 is a schematic diagram illustrating an example of pixel arrangement control when the relative angle rot is 90 degrees (°). The disposition control of the first pixels PixC and the second pixels PixD in the "processing yet to be reflected" column in FIGS. 10 and 11 is the same as in the "45°" column in FIG. 8. In the embodiment, pixel disposition control in accordance with the relative angle rot is performed as illustrated in the "processing reflected" column.

In FIGS. 10 and 11, pixels corresponding to the first pixels PixC in a case where the control of pixels Pix along the X direction is applied to the first pixels Pix1 or PixC and the second pixels Pix2 or PixD, which is described above with reference to FIGS. 3 and 4, are referred to as first pixels PixCB, and pixels corresponding to the second pixels PixD in this case are referred to as first pixels PixDB. Pixels corresponding to the first pixels PixC, which are determined by the relative angle correspondence processing applied in the embodiment, are referred to as first pixels PixCA, and pixels corresponding to the second pixels PixD thus determined are referred to as second pixels PixDA.

For example, it is assumed that when the control of pixels Pix along the X direction is reflected to the first pixels Pix1 or PixC and the second pixels Pix2 or PixD, which is described above with reference to FIGS. 3 and 4, a first image GC and a second image GD are output to be arranged in the X direction in the display panel 20A as illustrated in the "overall" row of the "processing yet to be reflected" column in FIGS. 10 and 11. The first image GC is an image perceived with light passing through the first pixels PixC. The second image GD is an image perceived with light passing through the second pixels PixD. When the relative angle rot is assumed to be 0 degrees (°), stereoscopic viewing holds with the first image GC and the second image GD illustrated in the "overall" row of the "processing yet to be reflected" column. When the relative angle rot is 45 degrees (°) or 90 degrees (°), it is difficult to establish stereoscopic viewing with the first image GC and the second image GD illustrated in the "overall" row of the "processing yet to be reflected" column.

Thus, as illustrated in the "overall" row of the "processing reflected" column in FIGS. 10 and 11, pixel disposition control in accordance with the relative angle rot is performed so that a first image GCA and a second image GDA correspond to the arrangement direction of the two eyes of the face HF in the display panel 20A. The first image GCA is an image viewed with light passing through the first pixels PixCA. The second image GDA is an image viewed with light passing through the second pixels PixDA. As indicated by comparison between the first image GC and the first image GCA and comparison between the second image GD and the second image GDA, the first image GCA is the same image as the first image GC. The second image GDA is the same image as the second image GD. However, the relative position angle relation between the first image GCA and the second image GDA is different from the relative position angle relation between the first image GC and the second image GD. The relative position angle relation between the first image GCA and the second image GDA is displaced to correspond to the arrangement direction of the two eyes of the face HF in accordance with the relative angle rot. Processing related to disposition control of the first pixels PixCA and the second pixels PixDA is performed so that such a relative position angle relation between the first image GCA and the second image GDA is established.

Figure 12:
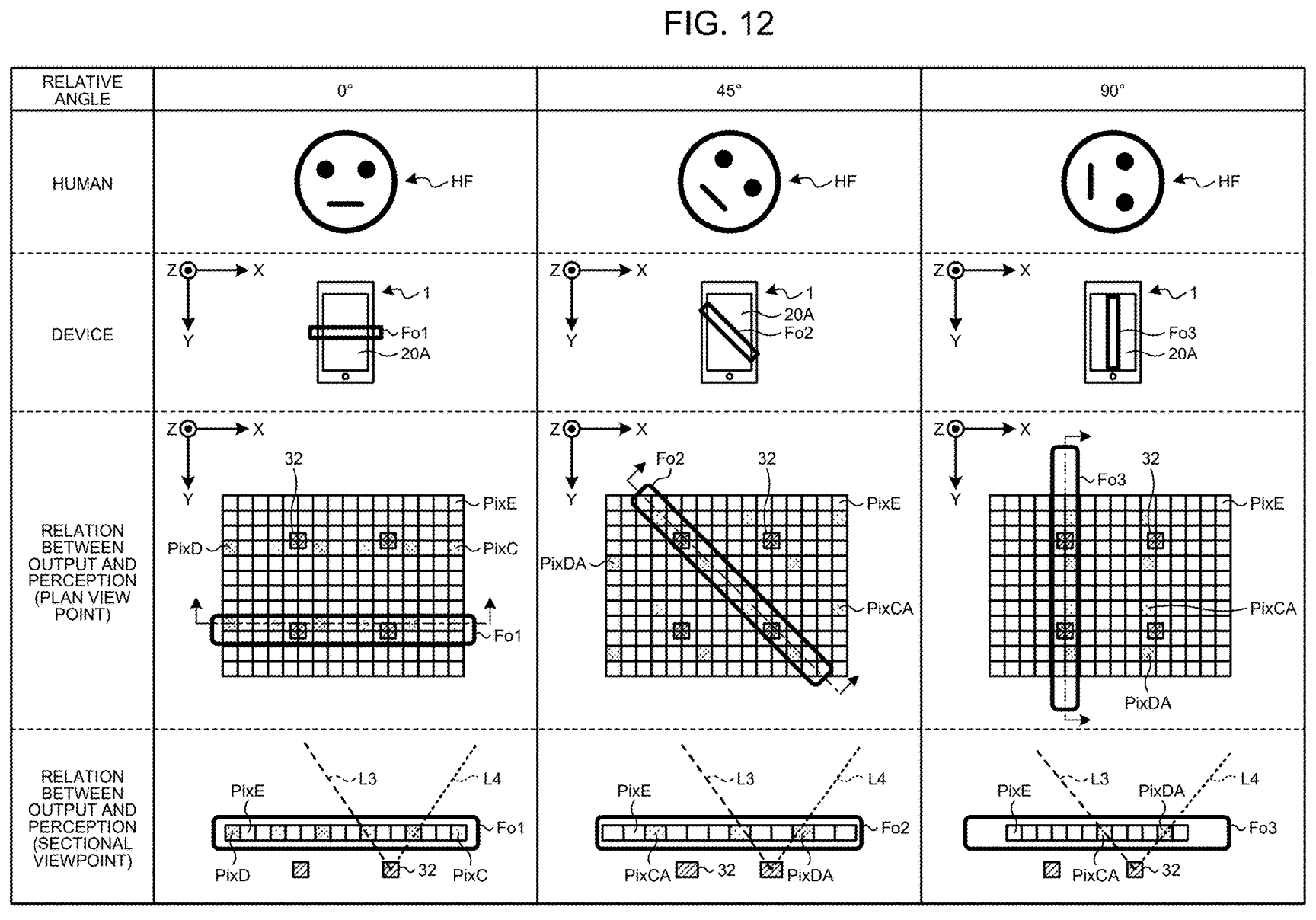

FIG. 12 is a schematic diagram illustrating an example of the relation between the relative angle rot and the feasibility of individual images output to a plurality of viewpoints in a case where the disposition control described above with reference to FIGS. 10 and 11 is reflected. As illustrated in the "45°" column and the "90°" column in FIG. 12, light L3 having passed through the first pixels PixCA reaches the first viewpoint EC and light L4 having passed through the second pixels PixDA reaches the second viewpoint ED when the disposition control described above with reference to FIGS. 10 and 11 is reflected. Thus, it is possible to achieve individual image output to a plurality of viewpoints through the disposition control described above with reference to FIGS. 10 and 11.

The description with reference to FIGS. 10 to 12 is made with an example in which the relative angle rot is 45 degrees (°) or 90 degrees (°), but in the embodiment, disposition of the first pixels PixCA and the second pixels PixDA relative to light emission points LP such as the light emission points 32 or the linear light sources 32A can be controlled to correspond to the arrangement direction of the two eyes of the face HF, irrespective of the value of the relative angle rot. Thus, in the embodiment, it is possible to achieve individual image output to a plurality of viewpoints irrespective of the relative angle rot by applying the control of pixels Pix along the X direction to the first pixels PixC and the second pixels PixD, which is described above with reference to FIGS. 3 and 4.

The following describes more specific processing contents related to the disposition control described above with reference to FIGS. 10 to 12.

Figure 13:
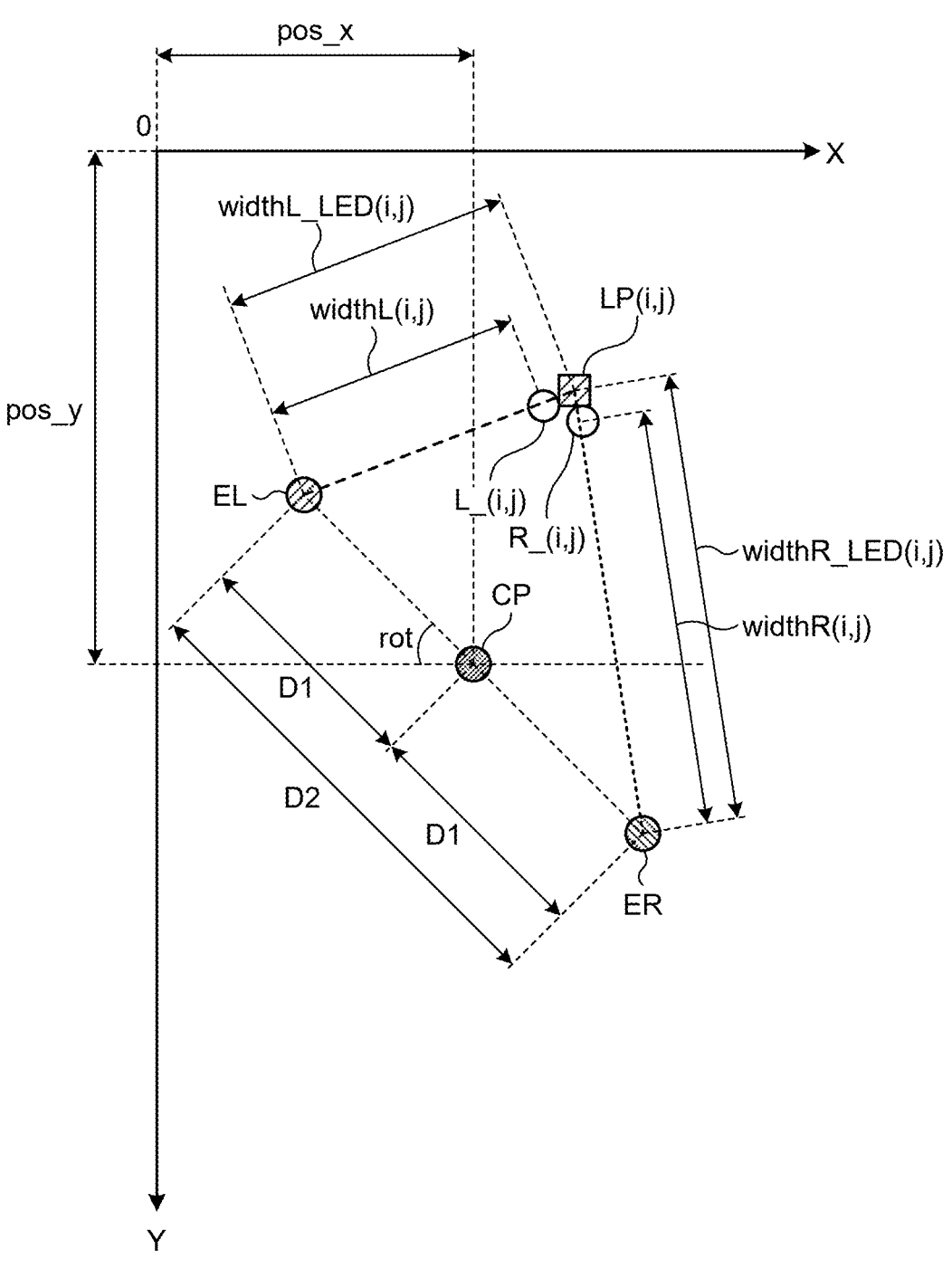
FIG. 13 is a diagram illustrating various parameters related to derivation of coordinates R_(i, j) and coordinates L_(i, j) based on the positional relation between a light emission point positioned at coordinates LP(i, j) and a viewpoint.

FIG. 13 is a diagram illustrating various parameters related to derivation of the coordinates $R\_(i, j)$ and the coordinates $L\_(i, j)$ based on the positional relation between a light emission point LP positioned at the coordinates LP(i, j) and the viewpoints ER and EL.

As described above, the distance between the origin and the light emission point LP(i) in the X direction can be expressed as "offset+(pitch×1)". Hereinafter, LEDx(i) in expressions means "LEDx(i)=offset+(pitch×i)". In a case where the light emission points LP are disposed in a matrix having a row-column configuration in the X and Y directions, the coordinates of each light emission point LP include not only information of the X-directional coordinate (i) described above but also information of the Y-directional coordinate (j). The light emission point LP(j) represents the emission start point of light from a light emission point (for example, light emission point 32) disposed at the (j+1)-th closest position to the origin in the Y direction. Thus, the number j is an integer equal to or larger than zero. The light emission point LP(0) and the light emission point LP(i) in FIG. 5 are also the light emission point LP(0) or the light emission point LP(j) in FIG. 14. Thus, in a case where the light emission points LP are disposed in a matrix having a row-column configuration in the X and Y directions, the coordinates LP(i, j) of each light emission point LP include information indicating the X-directional and Y-directional coordinates.

When the distance between the origin and the light emission point LP(i, 0) in the Y direction is represented by "offset_Y", the distance between the origin and the light emission point LP(j) in the Y direction can be expressed as "offset_Y+(pitch_Y×j)". Hereinafter, LEDy(j) in expressions means "LEDy(j)=offset_Y+(pitch_Y×j)". The magnitude of the value of pitch_Y corresponds to the interval between the Y-directional center lines of two light emission points LP adjacent to each other in the Y direction. The values "offset_Y" and "offset_Y+(pitch_Y×j)" are determined in advance in accordance with the design of the display device 1 and are parameters referrable in calculation related to determination of the Y-directional coordinate Y(j).

The coordinates of the viewpoint ER are denoted by (PosR_x, PosR_y). The symbol "PosR_x" represents the X-directional coordinate of the viewpoint ER. The symbol "PosR_y" represents the Y-directional coordinate of the viewpoint ER. The coordinate PosR_x can be expressed by Expression (9) below. The coordinate PosR_y can be expressed by Expression (10) below. In Expression (10) and Expressions (14) and (23) to be described later, the symbol "sin" represents sine. In Expression (9) and Expressions (13) and (24) to be described later, the symbol "cos" represents cosine. In each expression, the symbol "rot" represents the value of the relative angle rot.

$$PosR\_x = pos\_x + D1 \times \cos(rot/180) \qquad (9)$$

$$PosR\_y = pos\_y + D1 \times \sin(rot/180) \qquad (10)$$

The length of the ray line of light between the center of the light emission point LP positioned at the coordinates LP(i, j) and the viewpoint ER is referred to as a length widthR_LED. The length between the coordinates R_(i, j) positioned on the ray line of light between the center of the light emission point LP positioned at the coordinates LP(i, j) and the viewpoint ER where pixels Pix are positioned in the Z direction and the viewpoint ER on the ray line of light is referred to as a length widthR. The ratio between the length widthR and the length widthR_LED can be expressed by Expression (11) below. The position pos_h in Expression (11) and Expression (15) to be described later is derived by the distance measurer 3 as described above. The symbol "th" in Expression (11) and Expression (15) to be described later is predetermined as a designing matter. The length widthR_LED can be expressed as Expression (12).

$$widthR: widthR\_LED = pos\_h: (pos\_h + th) \qquad (11)$$

$$widthR\_LED = \left\{ (LEDx - PosR\_x)^2 + (LEDy - PosR\_y)^2 \right\}^{1/2} \qquad (12)$$

The coordinates of the viewpoint EL are denoted by (PosL_x, PosL_y). The symbol "PosL_x" represents the X-directional coordinate of the viewpoint EL. The symbol "PosL_y" represents the Y-directional coordinate of the viewpoint EL. The coordinate PosL_x can be expressed by Expression (13) below. The coordinate PosR_y can be expressed by Expression (14) below.

$$PosL\_x = pos\_x - D1 \times \cos(rot/180) \qquad (13)$$

$$PosL\_y = pos\_y - D1 \times \sin(rot/180) \qquad (14)$$

The length of the ray line of light between the center of the light emission point LP positioned at the coordinates LP(i, j) and the viewpoint EL is referred to as a length widthL_LED. The length between the coordinates L_(i, j) positioned on the ray line of light between the center of the light emission point LP positioned at the coordinates LP(i, j) and the viewpoint EL where pixels Pix are positioned in the Z direction and the viewpoint EL on the ray line of light is referred to as a length widthL. The ratio between the length widthL and the length widthL_LED can be expressed by Expression (15) below. The length widthL_LED can be expressed as Expression (16).

$$widthL: widthL\_LED = pos\_h: (pos\_h + th) \qquad (15)$$

$$widthL\_LED = \left( (LEDx - PosL\_x)^2 + (LEDy - PosL\_y)^2 \right)^{1/2} \qquad (16)$$

Figure 14:
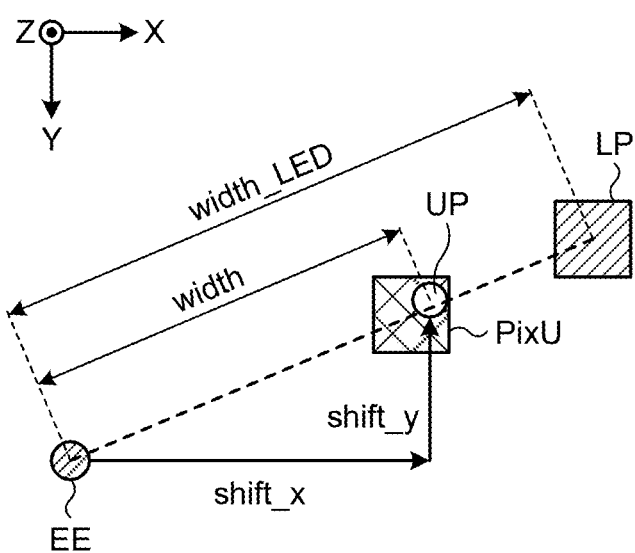
FIG. 14 is a schematic diagram illustrating the relation between a length "width" and a pixel PixU transmitting light from the light emission point positioned at the coordinates LP(i, j) to a viewpoint.

FIG. 14 is a schematic diagram illustrating the relation between a length "width" and a pixel PixU. The pixel PixU is a pixel Pix transmitting light from the light emission point LP positioned at the coordinates LP(i, j) to a viewpoint EE. Hereinafter, the pixel PixU means a pixel Pix through which light (light beam) from the light emission point LP to the viewpoint EE passes, and encompasses a pass-through point UP to be described later. The length "width" is the length widthR or the length widthL. The length width LED illustrated in FIG. 14 is the length widthR_LED in a case where the length "width" is the length widthR. The length width LED is widthL_LED in a case where the length "width" is the length widthL. The viewpoint EE illustrated in FIG. 14 is the viewpoint ER in a case where the length "width" is the length widthR. The viewpoint EE is the viewpoint EL in a case where the length "width" is the length widthL. The pass-through point UP illustrated in FIG. 14 is R (i, j) in a case where the length "width" is the length widthR. The pass-through point UP is L_(i, j) in a case where the length "width" is the length widthL.

Coordinates at which the pixel PixU is positioned in a case where the length "width" is the length widthR are denoted by (shiftR_x, shiftR_y). The symbol "shiftR_x" represents the X-directional coordinate of the pixel PixU in such a case. The symbol "shiftR_y" represents the Y-directional coordinate of the pixel PixU in such a case. The coordinate shiftR_x can be expressed by Expression (17) below. The coordinate shiftR_y can be expressed by Expression (18) below.

$$shiftR\_x = PosR\_x + (LEDx - PosR\_x) \times widthR/widthR\_LED \quad (17)$$

$$shiftR\_y = PosR\_y + (LEDy - PosR\_y) \times widthR/widthR\_LED \quad (18)$$

Coordinates at which the pixel PixU is positioned in a case where the length "width" is the length widthL are denoted by (shiftL_x, shiftL_y). The symbol "shiftL_x" represents the X-directional coordinate of the pixel PixU in such a case. The symbol "shiftL_y" represents the Y-directional coordinate of the pixel PixU in such a case. The coordinate shiftL_x can be expressed by Expression (19) below. The coordinate shiftL_y can be expressed by Expression (20) below.

$$shiftL\_x = PosL\_x + (LEDx - PosL\_x) \times widthL/widthL\_LED \quad (19)$$

$$shiftL\_y = PosL\_y + (LEDy - PosL\_y) \times widthL/widthL\_LED \quad (20)$$

As indicated with the positional relation between the pass-through point UP and the pixel PixU in FIG. 14, the pass-through point UP does not necessarily pass through the center of the pixel PixU.

Figure 15:
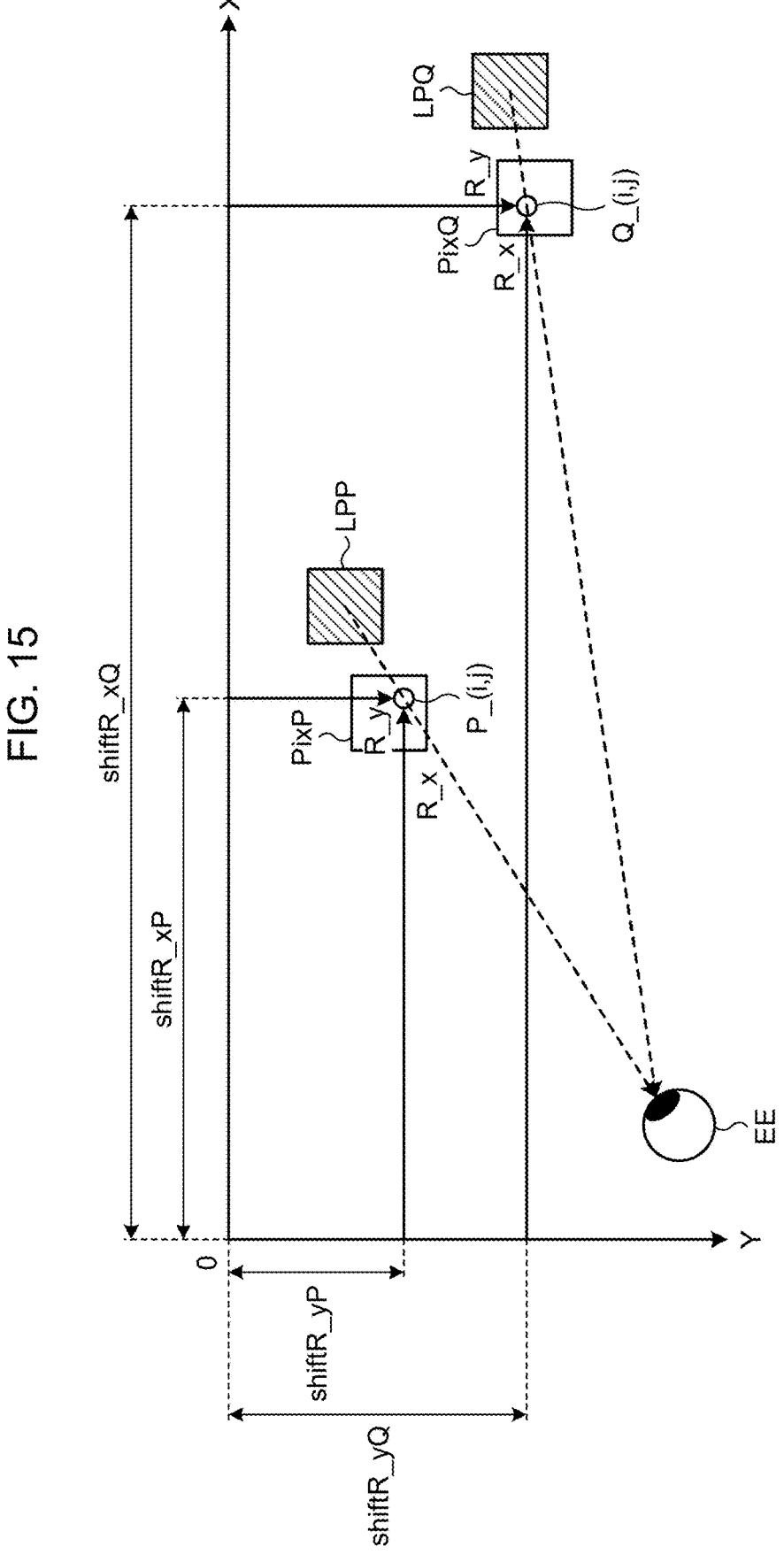
FIG. 15 is a schematic diagram illustrating an example of the difference between the position of a pass-through point P_(i, j) at a pixel positioned on the ray line of light from a light emission point LPP to a viewpoint and the position of a pass-through point Q_(i, j) at a pixel positioned on the ray line of light from a light emission point LPQ to the viewpoint.

FIG. 15 is a schematic diagram illustrating an example of the difference between the position of a pass-through point P_(i, j) in a pixel PixP positioned on the ray line of light from a light emission point LPP to the viewpoint EE and the position of a pass-through point Q_(i, j) in a pixel PixQ positioned on the ray line of light from a light emission point LPQ to the viewpoint EE. The pass-through point P_(i, j) and the pass-through point Q_(i, j) are different pass-through points UP. The light emission points LPP and LPQ are any of a plurality of light emission points LP for the viewpoint EE, and the position of the light emission point LPP and the position of the light emission point LPQ are different from each other. The pass-through points P_(i, j) and Q_(i, j) are pass-through points UP. Specifically, a symbol "shiftr_xP" represents the X-directional coordinate of the pass-through point P_(i, j). A symbol "shiftr_yP" represents the Y-directional coordinate of the pass-through point P_(i, j). A symbol "shiftQ_xP" represents the X-directional coordinate of the pass-through point Q_(i, j). A symbol "shiftQ_yP" represents the Y-directional coordinate of the pass-through point Q_(i, j).

As exemplarily illustrated in FIG. 15, the pass-through point P_(i, j) is positioned near the lower-right corner of the pixel PixP. The pass-through point Q_(i, j) is positioned near the upper-left corner of the pixel PixQ. In this manner, the position of each pass-through point UP in the pixel PixU is variable in accordance with the positional relation between the light emission point LP and the viewpoint EE.

In the embodiment, drive control of each pixel Pix is performed in accordance with the positional relation between each pass-through point UP and the pixel PixU, in other words, the intersection position between the pixel Pix and the ray line of light from each light emission point LP to the viewpoint EE. Specifically, the image output circuit 12 calculates a determination variable R_x based on Expression (21) below from the X coordinate of one pass-through point UP (shiftR_x, shiftR_y). The image output circuit 12 also calculates a determination variable R_y based on Expression

(22) below from the Y coordinate of the one pass-through point UP. Various calculations (for example, Expressions (9) to (20) described above) that serve as the basis for Expressions (21) and (22) are performed by the image output circuit 12 based on (pos_x, pos_y, pos_h) and the relative angle rot derived by the sight line following circuit 11 and the fundamental concept based on Expressions (1) to (8) described above with reference to FIG. 5.

$$R\_x = shiftR\_x/PP - \text{int}\,(shiftR\_x/PP) \quad (21)$$

$$R\_y = shiftR\_y/PP - \text{int}\,(shiftR\_y/PP) \quad (22)$$

These determination coefficients indicate the pass-through point UP in the pixel PixU. More specifically, the determination coefficients indicate the position of the pass-through point UP in the pixel PixU when viewed from an end part (for example, upper-left corner A of a pixel illustrated in FIG. 16) closest to the origin set on the display surface. Further more specifically, in the case of R_x=0 and R_y=0, the pass-through point UP is positioned at the corner A. In the case of R_x=½ and R_y=½, the pass-through point UP is positioned at the center of the pixel PixU. In the case of R_x=1 and R_y=1, the pass-through point UP is positioned at an opposing corner B to the corner A.

Figure 17:
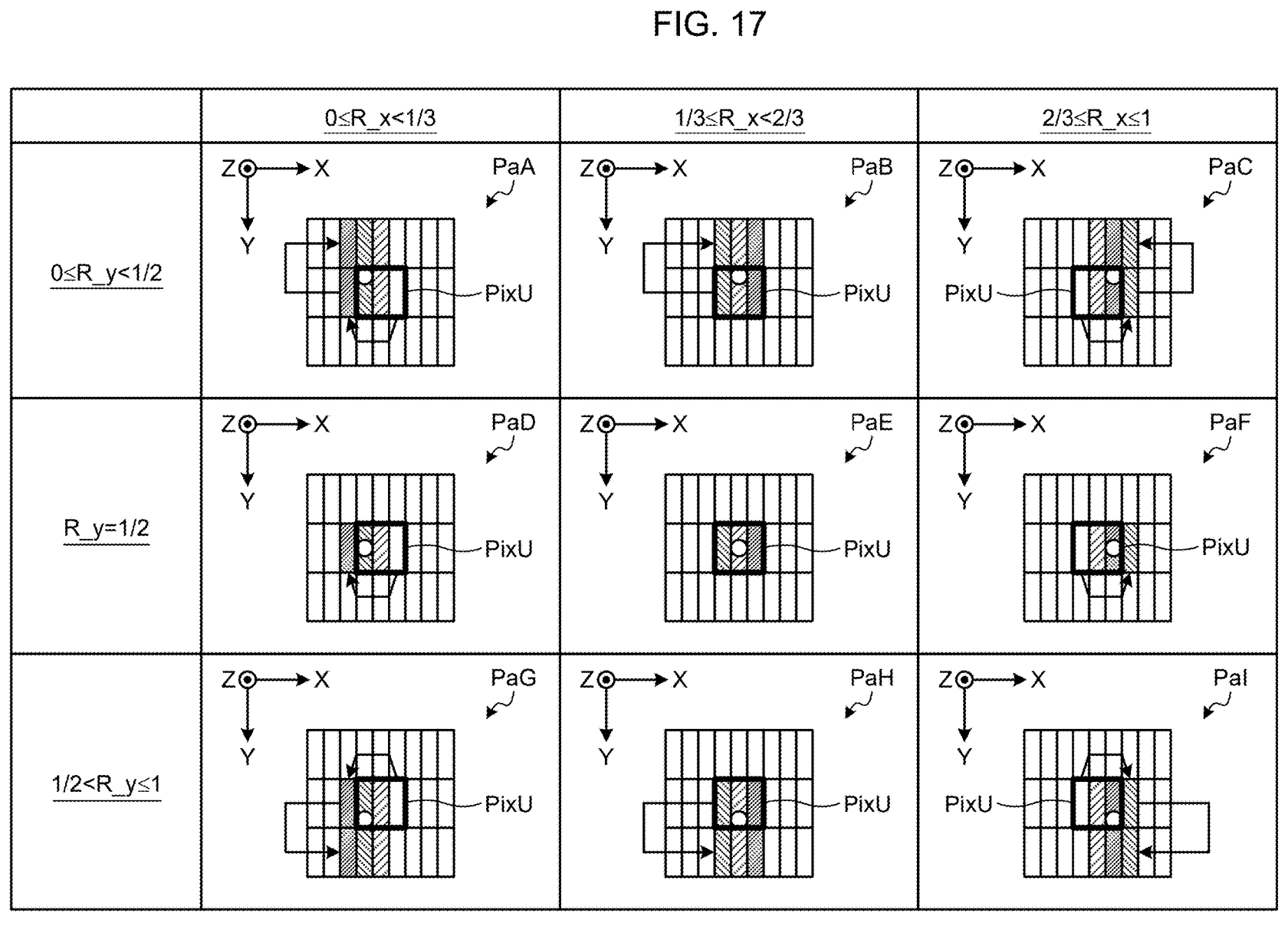

FIG. 16 is a diagram illustrating a coordinate system with respect to the pixel PixU. FIG. 17 is a schematic diagram illustrating an overview of drive control of the pixel PixU in accordance with the intersection position of the ray line of light from the light emission point LP to the viewpoint EE and the pixel PixU. The image output circuit 12 applies sub-pixel control corresponding to the determination variables R_x and R_y as sub-pixel control related to the pixel PixU corresponding to the pass-through point UP at the coordinates (shiftR_x, shiftR_y) for which the determination variables R_x and R_y are calculated by Expressions (21) and (22) described above. Specifically, as illustrated in FIG. 17, the image output circuit 12 applies control corresponding to a pixel signal allocated to the pixel PixU to at least one of each sub pixel included in the pixel PixU and each sub pixel included in a pixel Pix adjacent the pixel PixU in correspondence with a combination of the value of the determination variable R_x and the value of the determination variable R_y.

In the following description with reference to FIGS. 16 and 17, one end side in the X direction means the left side in the drawing. The other end side in the X direction means the right side in the drawing. One end side in the Y direction means the upper side in the drawing. The other end side in the Y direction means the lower side in the drawing.

In description of the embodiment, it is assumed that as illustrated in FIG. 16, one pixel Pix includes a first sub pixel R, a second sub pixel G, and a third sub pixel B, which are arranged from the one end side in the X direction toward the other end side in the order of the first sub pixel R, the second sub pixel G, and the third sub pixel B. One pixel Pix including one first sub pixel R, one second sub pixel G, and one third sub pixel B is, for example, substantially square as a whole. Each of the first sub pixel R, the second sub pixel G, and the third sub pixel B has a quadrilateral shape with a longitudinal direction in the Y direction. A plurality of pixels Pix are disposed in a matrix having a row-column configuration in the X and Y directions.

In description of sub-pixel control patterns PaA, PaB, PaC, PaD, PaE, PaF, PaG, PaH, and PaI with reference to FIG. 17, control target sub pixels are described by referring to the coordinate system illustrated in FIG. 16. The coordinate system of x and y coordinates illustrated in FIG. 16 is a relative coordinate system with respect to the pixel PixU and does not directly correspond to the above-described value (i, j).

In FIG. 16, the pixel PixU is positioned at the coordinates of x=0 and y=0. Such coordinates of the pixel PixU are denoted by (x, y)=(0, 0). The x coordinate of a pixel Pix adjacent to the pixel PixU and positioned on the one end side in the X direction is x=−1. The term "adjacent" here means being adjacent to the pixel PixU in any of the X direction, the Y direction, and an oblique direction relative to the pixel PixU. The oblique direction means a direction intersecting both the X and Y directions and orthogonal to the Z direction. The x coordinate of a pixel Pix adjacent to the pixel PixU and positioned on the other end side in the X direction is x=1. The y coordinate of a pixel Pix adjacent to the pixel PixU and positioned on the one end side in the Y direction is y=−1. The y coordinate of a pixel Pix adjacent to the pixel PixU and positioned on the other end side in the Y direction is y=1. For example, a pixel Pix at (x, y)=(−1, −1) is a pixel Pix adjacent to the pixel PixU and positioned on the one end side in the X direction and the one end side in the Y direction relative to the pixel PixU.

In the case of 0≤R_x<⅓ and 0≤R_y<½, the pass-through point UP is positioned closer to the one end side in the X direction and closer to the one end side in the Y direction in the pixel PixU. More specifically, the pass-through point UP is positioned in a sub pixel (first sub pixel R) on one end side in the pixel PixU and positioned in the upper half in the sub pixel. In this case, the image output circuit 12 applies the control pattern PaA. In the control pattern PaA, the third sub pixel B at (x, y)=(−1, −1), the first sub pixel R and the second sub pixel G at (x, y)=(0, −1), the third sub pixel B at (x, y)=(−1, 0), and the first sub pixel R and the second sub pixel G of the pixel PixU are application targets of control corresponding to a pixel signal. Specifically, among a red (R) gradation value, a green (G) gradation value, and a blue (B) gradation value indicated by an RGB pixel signal provided to the pixel PixU, pixel control corresponding to the blue (B) gradation value is dispersively applied to the third sub pixel B at (x, y)=(−1, −1) and the third sub pixel B at (x, y)=(−1, 0). Pixel control corresponding to the red (R) gradation value and the green (G) gradation value are dispersively applied to the first sub pixel R and the second sub pixel G at (x, y)=(0, −1) and the first sub pixel R and the second sub pixel G of the pixel PixU. Gradation value dispersion in pixel control will be described later in detail. Through this control, the pass-through point UP is positioned at a central part of all sub pixels turned on for the pass-through point UP.

In the case of ⅓≤R_x<⅔ and 0≤R_y<½, the pass-through point UP is positioned at or near the middle position between the one end side and the other end side in the X direction and closer to the one end side in the Y direction in the pixel PixU. More specifically, the pass-through point UP is positioned in the middle sub pixel (second sub pixel G) in the pixel PixU and positioned in the upper half in the sub pixel. In this case, the image output circuit 12 applies the control pattern PaB. In the control pattern PaB, the first sub pixel R, the second sub pixel G, and the third sub pixel B at (x, y)=(0, −1) and the first sub pixel R, the second sub pixel G, and the third sub pixel B of the pixel PixU are application targets of control corresponding to a pixel signal. Specifically, pixel control corresponding to a red (R) gradation value, a green (G) gradation value, and a blue (B) gradation value indicated by an RGB pixel signal provided to the pixel PixU is dispersively applied to the first sub pixel R, the second sub pixel G, and the third sub pixel B at (x, y)=(0, −1) and the first sub pixel R, the second sub pixel G, and the third sub pixel B of the pixel PixU. Through this control, the pass-through point UP is positioned at a central part of all sub pixels turned on for the pass-through point UP.

In the case of ⅔≤R_x≤1 and 0≤R_y<½, the pass-through point UP is positioned closer to the other end side in the X direction and closer to the one end side in the Y direction in the pixel PixU. More specifically, the pass-through point UP is positioned in a sub pixel (third sub pixel B) on the other end side in the pixel PixU and positioned in the upper half in the sub pixel. In this case, the image output circuit 12 applies the control pattern PaC. In the control pattern PaC, the second sub pixel G and the third sub pixel B at (x, y)=(0, −1), the first sub pixel R at (x, y)=(1, −1), the second sub pixel G and the third sub pixel B of the pixel PixU, and the first sub pixel R at (x, y)=(1, 0) are application targets of control corresponding to a pixel signal. Specifically, among a red (R) gradation value, a green (G) gradation value, and a blue (B) gradation value indicated by an RGB pixel signal provided to the pixel PixU, pixel control corresponding to the red (R) gradation value is dispersively applied to the first sub pixel R at (x, y)=(1, −1) and the first sub pixel R at (x, y)=(1, 0). Pixel control corresponding to the green (G) gradation value and the blue (B) gradation value is dispersively applied to the second sub pixel G and the third sub pixel B at (x, y)=(0, −1) and the second sub pixel G and the third sub pixel B of the pixel PixU. Through this control, the pass-through point UP is positioned at a central part of all sub pixels turned on for the pass-through point UP.

In the case of 0≤R_x<⅓ and R_y=½, the pass-through point UP is positioned closer to the one end side in the X direction and at the middle position between the one end side and the other end side in the Y direction in the pixel PixU. More specifically, the pass-through point UP is positioned in a sub pixel (first sub pixel R) on one end side in the pixel PixU and positioned at or near the center in the up-down direction (Y direction) in the sub pixel. In this case, the image output circuit 12 applies the control pattern PaD. In the control pattern PaD, the third sub pixel B at (x, y)=(−1, 0) and the first sub pixel R and the second sub pixel G of the pixel PixU are application targets of control corresponding to a pixel signal. Specifically, among a red (R) gradation value, a green (G) gradation value, and a blue (B) gradation value indicated by an RGB pixel signal provided to the pixel PixU, pixel control corresponding to the blue (B) gradation value is applied to the third sub pixel B at (x, y)=(−1, 0). Pixel control corresponding to the red (R) gradation value and the green (G) gradation value is applied to the first sub pixel R and the second sub pixel G of the pixel PixU. Through this control, the pass-through point UP is positioned at a central part of all sub pixels turned on for the pass-through point UP.

In the case of ⅓≤R_x<⅔ and R_y=½, the pass-through point UP is positioned at or near the middle position between the one end side and the other end side in the X direction and at the middle position between the one end side and the other end side in the Y direction in the pixel PixU. More specifically, the pass-through point UP is positioned in the middle sub pixel (second sub pixel G) in the pixel PixU and positioned at or near the center in the up-down direction (Y direction) in the sub pixel. In this case, the image output circuit 12 applies the control pattern PaE. In the control pattern PaE, the first sub pixel R, the second sub pixel G, and the third sub pixel B of the pixel PixU are application targets of control corresponding to a pixel signal. Specifically, pixel control corresponding to a red (R) gradation value, a green (G) gradation value, and a blue (B) gradation value indicated by an RGB pixel signal provided to the pixel PixU is applied to the first sub pixel R, the second sub pixel G, and the third sub pixel B of the pixel PixU. Through this control, the pass-through point UP is positioned at a central part of all sub pixels turned on for the pass-through point UP.

In the case of $\frac{2}{3} \le R\_x \le 1$ and $R\_y = \frac{1}{2}$, the pass-through point UP is positioned closer to the other end side in the X direction and at the middle position between the one end side and the other end side in the Y direction in the pixel PixU. More specifically, the pass-through point UP is positioned in a sub pixel (third sub pixel B) on the other end side in the pixel PixU and positioned at or near the center in the up-down direction (Y direction) in the sub pixel. In this case, the image output circuit 12 applies the control pattern PaF. In the control pattern PaF, the second sub pixel G and the third sub pixel B of the pixel PixU and the first sub pixel R at (x, y)=(1, 0) are application targets of control corresponding to a pixel signal. Specifically, among a red (R) gradation value, a green (G) gradation value, and a blue (B) gradation value indicated by an RGB pixel signal provided to the pixel PixU, pixel control corresponding to the red (R) gradation value is applied to the first sub pixel R at (x, y)=(1, 0). Pixel control corresponding to the green (G) gradation value and the blue (B) gradation value is applied to the second sub pixel G and the third sub pixel B of the pixel PixU. Through this control, the pass-through point UP is positioned at a central part of all sub pixels turned on for the pass-through point UP.

In the case of $0 \le R\_x < \frac{1}{3}$ and $\frac{1}{2} < R\_y \le 1$, the pass-through point UP is positioned closer to the one end side in the X direction and closer to the other end side in the Y direction in the pixel PixU. More specifically, the pass-through point UP is positioned in a sub pixel (first sub pixel R) on one end side in the pixel PixU and positioned in the lower half in the sub pixel. In this case, the image output circuit 12 applies the control pattern PaG. In the control pattern PaG, the third sub pixel B at (x, y)=(−1, 0), the first sub pixel R and the second sub pixel G of the pixel PixU, the third sub pixel B at (x, y)=(−1, 1), and the first sub pixel R and the second sub pixel G at (x, y)=(0, 1) are application targets of control corresponding to a pixel signal. Specifically, among a red (R) gradation value, a green (G) gradation value, and a blue (B) gradation value indicated by an RGB pixel signal provided to the pixel PixU, pixel control corresponding to the blue (B) gradation value is dispersively applied to the third sub pixel B at (x, y)=(−1, 0) and the third sub pixel B at (x, y)=(−1, 1). Pixel control corresponding to the red (R) gradation value and the green (G) gradation value is dispersively applied to the first sub pixel R and the second sub pixel G of the pixel PixU and the first sub pixel R and the second sub pixel G at (x, y)=(0, 1). Through this control, the pass-through point UP is positioned at a central part of all sub pixels turned on for the pass-through point UP.

In the case of $\frac{1}{3} \le R\_x < \frac{2}{3}$ and $\frac{1}{2} < R\_y \le 1$, the pass-through point UP is positioned at or near the middle position between the one end side and the other end side in the X direction and closer to the other end side in the Y direction in the pixel PixU. More specifically, the pass-through point UP is positioned in the middle sub pixel (second sub pixel G) in the pixel PixU and positioned in the lower half in the sub pixel. In this case, the image output circuit 12 applies the control pattern PaH. In the control pattern PaH, the first sub pixel R, the second sub pixel G, and the third sub pixel B of the pixel PixU and the first sub pixel R, the second sub pixel G, and the third sub pixel B at (x, y)=(0, 1) are application targets of control corresponding to a pixel signal. Specifically, pixel control corresponding to a red (R) gradation value, a green (G) gradation value, and a blue (B) gradation value indicated by an RGB pixel signal provided to the pixel PixU is dispersively applied to the first sub pixel R, the second sub pixel G, and the third sub pixel B of the pixel PixU and the first sub pixel R, the second sub pixel G, and the third sub pixel B at (x, y)=(0, 1). Through this control, the pass-through point UP is positioned at a central part of all sub pixels turned on for the pass-through point UP.

In the case of $\frac{2}{3} \le R\_x$ 1 and $\frac{1}{2} < R\_y \le 1$, the pass-through point UP is positioned closer to the other end in the X direction and closer to the other end side in the Y direction in the pixel PixU. More specifically, the pass-through point UP is positioned in a sub pixel (third sub pixel B) on the other end side in the pixel PixU and positioned in the lower half in the sub pixel. In this case, the image output circuit 12 applies the control pattern PaI. In the control pattern PaI, the second sub pixel G and the third sub pixel B of the pixel PixU, the first sub pixel R at (x, y)=(1, 0), the second sub pixel G and the third sub pixel B at (x, y)=(0, 1), and the first sub pixel R at (x, y)=(1, 1) are application targets of control corresponding to a pixel signal. Specifically, among a red (R) gradation value, a green (G) gradation value, and a blue (B) gradation value indicated by an RGB pixel signal provided to the pixel PixU, pixel control corresponding to the red (R) gradation value is dispersively applied to the first sub pixel R at (x, y)=(1, 0) and the first sub pixel R at (x, y)=(1, 1). Pixel control corresponding to the green (G) gradation value and the blue (B) gradation value is dispersively applied to the second sub pixel G and the third sub pixel B of the pixel PixU and the second sub pixel G and the third sub pixel B at (x, y)=(0, 1). Through this control, the pass-through point UP is positioned at a central part of all sub pixels turned on for the pass-through point UP.

The following describes details of gradation value dispersion in pixel control. The image output circuit 12 applies gradation value control corresponding to the value of R_y in the control patterns PaA, PaB, PaC, PaD, PaE, PaF, PaG, PaH, and PaI.

Specifically, in the control patterns PaA, PaB, and PaC, the first sub pixel R, the second sub pixel G, and the third sub pixel B are controlled so that the gradation values of the first sub pixel R, the second sub pixel G, and the third sub pixel B positioned at y=−1 (positioned on the upper row of the pixel PixU) become $(0.5 - R\_y) \times 100\%$ of red (R), green (G), and blue (B) gradation values indicated by a pixel signal to the pixel PixU. In the control patterns PaA, PaB, and PaC, the first sub pixel R, the second sub pixel G, and the third sub pixel B are controlled so that the gradation values of the first sub pixel R, the second sub pixel G, and the third sub pixel B positioned at y=0 become $(0.5 + R\_y) \times 100\%$ of red (R), green (G), and blue (B) gradation values indicated by a pixel signal to the pixel PixU. Specifically, in this control, allocation of gradation values to the upper-row pixel increases as the pass-through point UP approaches the upper-row pixel in the pixel PixU, but the allocation is at most half of the pixel PixU.

In the control patterns PaD, PaE, and PaF, the first sub pixel R, the second sub pixel G, and the third sub pixel B are controlled so that the gradation values of the first sub pixel R, the second sub pixel G, and the third sub pixel B positioned at y=0 become red (R), green (G), and blue (B) gradation values indicated by a pixel signal to the pixel PixU.

In the control patterns PaG, PaH, and PaI, the first sub pixel R, the second sub pixel G, and the third sub pixel B are controlled so that the gradation values of the first sub pixel R, the second sub pixel G, and the third sub pixel B positioned at y=0 become (1.5−R_y)×100% of red (R), green (G), and blue (B) gradation values indicated by a pixel signal to the pixel PixU. In the control patterns PaG, PaH, and PaI, the first sub pixel R, the second sub pixel G, and the third sub pixel B are controlled so that the gradation values of the first sub pixel R, the second sub pixel G, and the third sub pixel B positioned at y=1 become (−0.5+R_y)×100% of red (R), green (G), and blue (B) gradation values indicated by a pixel signal to the pixel PixU. Specifically, in this control, allocation of gradation values to the lower-row pixel increases as the pass-through point UP approaches the lower-row pixel in the pixel PixU, but the allocation is at most half of the pixel PixU.

Figure 18:
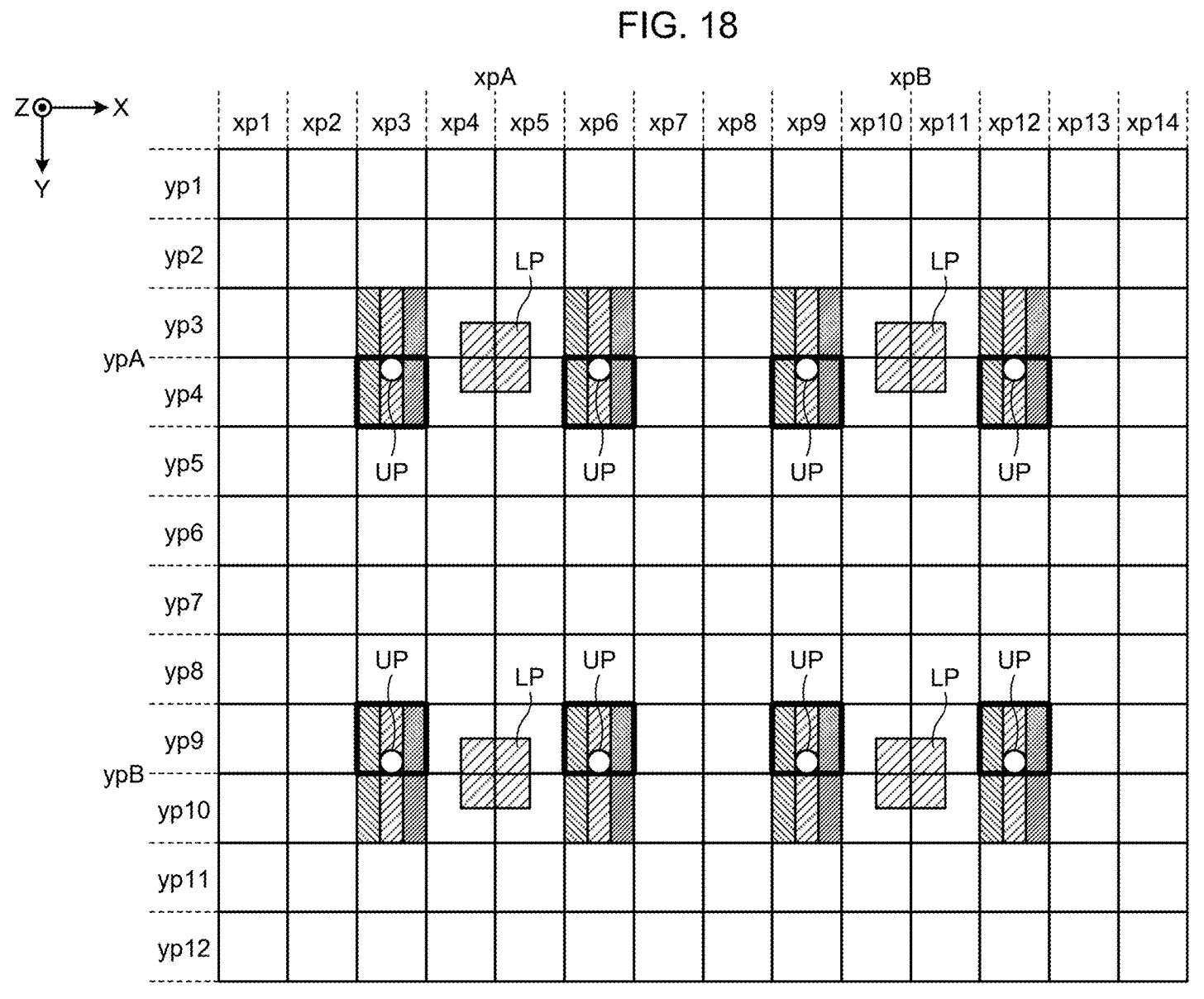
Figure 19:
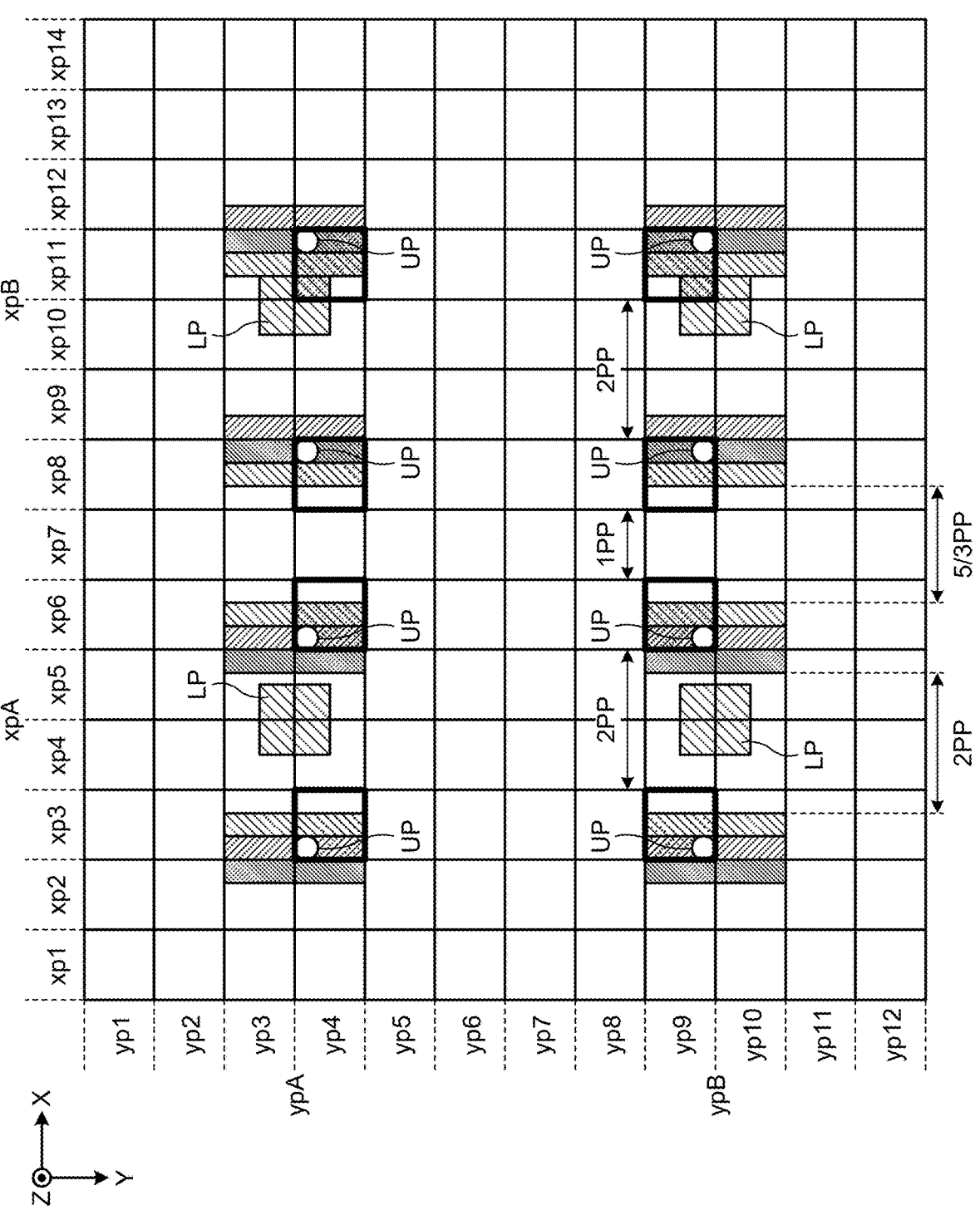
FIG. 19 is a diagram illustrating another example of display output to which sub-pixel control described above with reference to FIG. 17 is applied.

An application example of the control described above with reference to FIGS. 16 and 17 will be described below with reference to FIGS. 18 and 19. In the example illustrated in FIGS. 18 and 19, 14 pixels Pix are disposed in the X direction and 12 pixels Pix are disposed in the Y direction in a pixel region. The positions of pixels Pix in the pixel region are represented by combinations of xp coordinates xp1, xp2, . . . , xp14 and yp coordinates yp1, yp2, . . . , yp14. For example, the pixel Pix at (xp, yp)=(1, 1) means a pixel Pix at the X-directional position of xp1 and the Y-directional position of yp1. In FIGS. 18 and 19, the position of the pixel PixU is illustrated as a quadrilateral with a bold frame.

Figure 43:
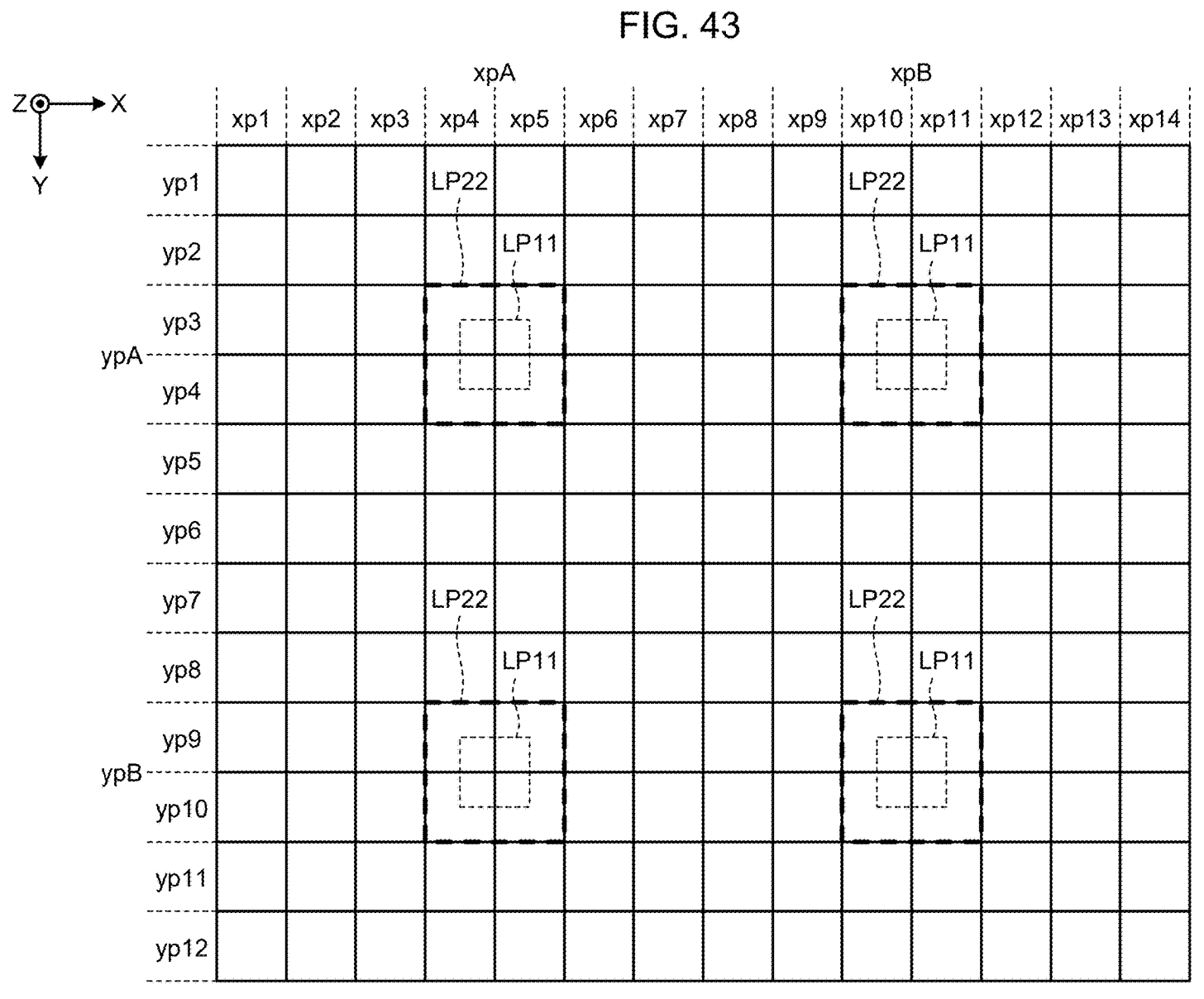

In FIGS. 18 and 19 and FIG. 43 to be described later, four light emission points LP are disposed at the plan view point. The boundary line between xp4 and xp5 is denoted by xpA. The boundary line between xp10 and xp11 is denoted by xpB. The boundary line between yp3 and yp4 is denoted by ypA. The boundary line between yp9 and yp10 is denoted by ypB. One of the four light emission points LP is positioned at the intersection position of xpA and ypA. Another one of the four light emission points LP is positioned at the intersection position of xpA and ypB. Another one of the four light emission points LP is positioned at the intersection position of xpB and ypA. The other one of the four light emission points LP is positioned at the intersection position of xpB and ypB.

FIG. 18 illustrates display control at a central part of a display screen when the middle point CP of the user's viewpoints is aligned with the center of the display screen. In FIG. 18, the sub-pixel control described above with reference to FIG. 17 is applied. In detailed description of FIG. 18, for the four light emission points, (xp, yp)=(3, 4), (9, 4), (3, 9), (9, 9) are derived as four left-eye pixels Pix enclosing the pass-through point UP based on the above-described calculation using the positional relation between the ray line of light from each light emission point to each viewpoint and the pixel matrix. For the four light emission points, (xp, yp)=(6, 4), (12, 4), (6, 9), (12, 9) are derived as four right-eye pixels Pix enclosing the pass-through point UP. In FIG. 18, the control pattern PaB is applied to four pixels Pix with the coordinates (xp, yp)=(3, 4), (6, 4), (9, 4), (12, 4) among the above-described pixels Pix. In FIG. 18, the control pattern PaH is applied to four pixels Pix with the coordinates (xp, yp)=(3, 9), (6, 9), (9, 9), (12, 9).

FIG. 19 illustrates display control at the right side of the display screen when the middle point CP of the user's viewpoints is aligned with the center of the display screen. In FIG. 19, the sub-pixel control described above with reference to FIG. 17 is applied. In detailed description of FIG. 19, for the four light emission points, (xp, yp)=(3, 4), (8, 4), (3, 9), (8, 9) are derived as four left-eye pixels Pix enclosing the pass-through point UP based on the above-described calculation using the positional relation between the ray line of light from each light emission point to each viewpoint and the pixel matrix. For the four light emission points, (xp, yp)=(6, 4), (11, 4), (6, 9), (11, 9) are derived as four right-eye pixels Pix enclosing the pass-through point UP. In FIG. 19, the positions of right-eye and left-eye pixels for light emission points positioned on the outer side on the display screen are all displaced toward the inner side by one pixel as compared to FIG. 18 described above. Thus, the position of the pass-through point in each pixel differs, and as a result, display control thereof changes. In FIG. 19, the control pattern PaA is applied to two pixels Pix with the coordinates (xp, yp)=(3, 4), (6, 4). The control pattern PaC is applied to two pixels Pix with the coordinates (xp, yp)=(8, 4), (11, 4). In FIG. 19, the control pattern PaG is applied to two pixels Pix with the coordinates (xp, yp)=(3, 9), (6, 9). In FIG. 19, the control pattern PaI is applied to two pixels Pix with the coordinates (xp, yp)=(8, 9), (11, 9).

Figure 20:
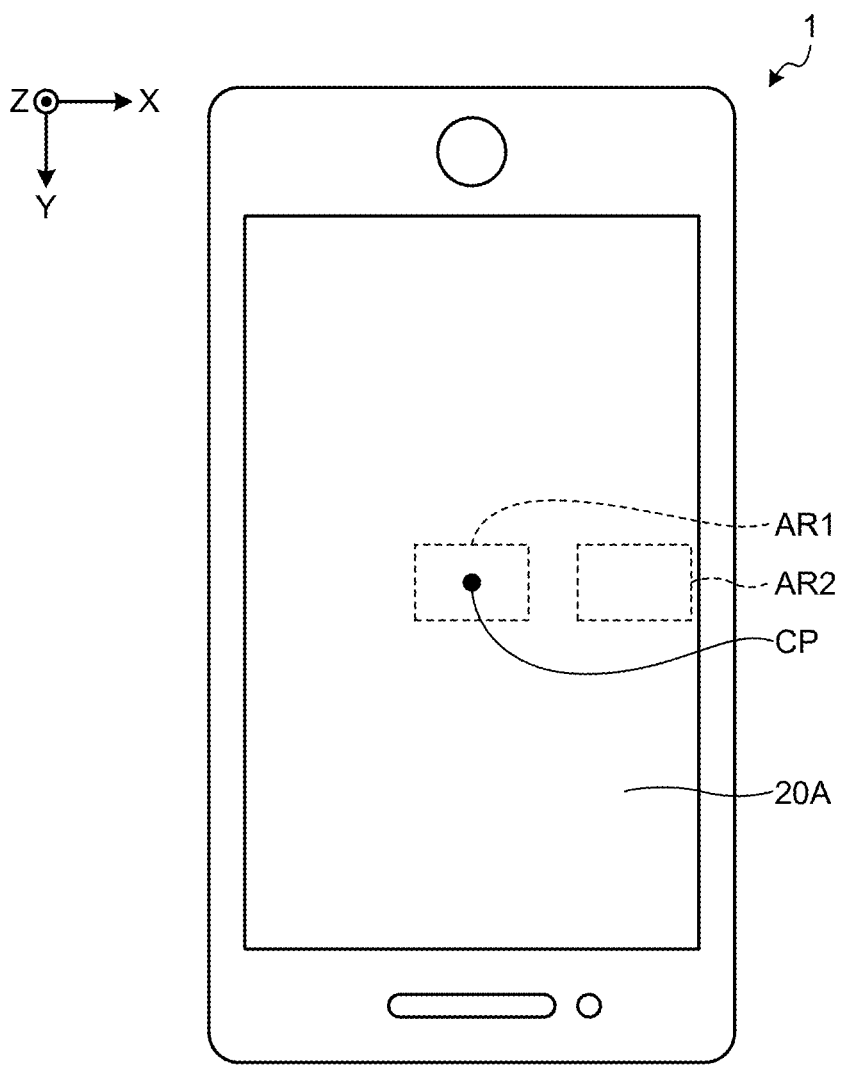
FIG. 20 is a diagram exemplarily illustrating partial regions in a display region of the display panel of the display device.

FIG. 20 is a diagram exemplarily illustrating partial regions AR1 and AR2 in the display region of the display panel 20A of the display device 1. The sub-pixel control described above with reference to FIG. 18 is applied, for example, at or near the middle point CP. For example, when the middle point CP overlaps the region AR1 of the display panel 20A at the plan view point, the sub-pixel control described above with reference to FIG. 18 is applied to the region AR1. The sub-pixel control described above with reference to FIG. 19 is applied, for example, at a position closer to the viewpoint ER in the X direction relative to the middle point CP or a position closer to the viewpoint EL in the X direction relative to the middle point CP. For example, when the middle point CP overlaps the region AR1 of the display panel 20A the plan view point, the sub-pixel control described above with reference to FIG. 19 is applied to the region AR2. As described above with reference to FIGS. 17 to 19, sub-pixel control in accordance with the position of the pass-through point UP in each pixel Pix is applied.

With the sub-pixel control in accordance with the position of the pass-through point UP in each pixel Pix, it is possible to perform image output with reduced variance in the interval between two pixels Pix adjacent to each other and enclosing the pass-through point UP.

For example, in the example illustrated in FIG. 19, the X-directional interval between a pixel Pix with the xp coordinate of 3 and a pixel Pix with the xp coordinate of 6 and the X-directional interval between a pixel Pix with the xp coordinate of 8 and a pixel Pix with the xp coordinate of 11, are equivalent to two pixels Pix. This is referred to as a first example. The X-directional interval between a pixel Pix with the xp coordinate of 6 and a pixel Pix with the xp coordinate of 8 is equivalent to one pixel Pix. This is referred to as a second example. In other words, the interval between two pixels Pix enclosing the pass-through point UP differs between the first example and the second example by the width of one pixel Pix.

However, the X-directional interval between (xp, yp)=(3, 4), (6, 4) to which the control pattern PaA is applied and (xp, yp)=(8, 4), (11, 4) to which the control pattern PaC is applied, is equivalent to 5/3 of the width of one pixel Pix. This is referred to as a third example. The X-directional interval between two pixels to which the control pattern PaA is applied and the X-directional interval between two pixels to which the control pattern PaC is applied, are equivalent to two pixels Pix. This is referred to as a fourth example. In other words, the difference is equivalent to one pixel Pix in the first and second examples, but the difference is equivalent to ⅓ of the width of one pixel Pix in the third and fourth examples to which the sub-pixel control described above with reference to FIG. 17 is applied. In this manner, by applying sub-pixel control in accordance with the position of the pass-through point UP in each pixel Pix, it is possible to more reliably reduce light transmitted through each pixel PixU and reaching a viewpoint different from an intended viewpoint. In other words, crosstalk can be reduced. If pixels PixU that transmit light to different viewpoints are only adjacent to each other or separated from each other by the width of one pixel Pix when no sub-pixel control in accordance with the position of the pass-through point UP in each pixel Pix is applied, the probability that light transmitted through each pixel PixU reaches a viewpoint different from an intended viewpoint is considerably high, but the probability can be lowered by applying sub-pixel control in accordance with the position of the pass-through point UP in each pixel Pix.

Examples with R_x and R_y calculated from Expressions (21) and (22) are described above for a case where the viewpoint EE is the viewpoint ER, but a similar approach can be applied for a case where the viewpoint EE is the viewpoint EL. Specifically, L_x and L_y calculated from Expressions (23) and (24) below are applied in place of R_x and R_y described above.

$$L\_x = \text{shiftL\_x}/pix - \text{int}\left(\text{shiftL\_x}/pix\right) \tag{23}$$

$$L\_y = \text{shiftL\_y}/pix - \text{int}\left(\text{shiftL\_y}/pix\right) \tag{24}$$

In a multiview, a positional displacement between a viewpoint and the display device 1 causes display quality degradation because display quality that could be otherwise achieved with the display device 1 for each viewpoint cannot be fully achieved. The positional displacement means a positional displacement of the user's viewpoint relative to the display device 1 with respect to the position of the viewpoint (for example, viewpoints E1 and E2) relative to the display device 1, which is identified based on information acquired by an acquirer (for example, the image capturer 2, the distance measurer 3, the gyro sensor 4, and the sight line following circuit 11) configured to acquire user's viewpoint information. Hereinafter, the term "positional displacement" refers to this positional displacement unless otherwise stated.

Ideally, the positional displacement is immediately corrected in accordance with update of information acquired by the above-described acquirer so that a state with no positional displacement can be achieved. However, there is a possibility that, for some reason, the user views an image in a state in which the positional displacement has temporarily occurred. Thus, a mechanism for reducing display quality degradation due to the positional displacement may be additionally provided. The following describes, with reference to FIGS. 21 to 28, a mechanism for reducing display quality degradation in an environment where the sub-pixel control described above with reference to FIG. 17 is applied. In each of FIGS. 21 to 24, 29, 30, 33, 34, 37, and 38, an example of the value of the relative angle rot is illustrated at an uppermost part of the diagram to more clearly indicate the relation between the relative angle rot and the drawing, and in addition, the orientation of the face HF for the relative angle rot of the example is indicated on the left side of the value.

Figure 21:
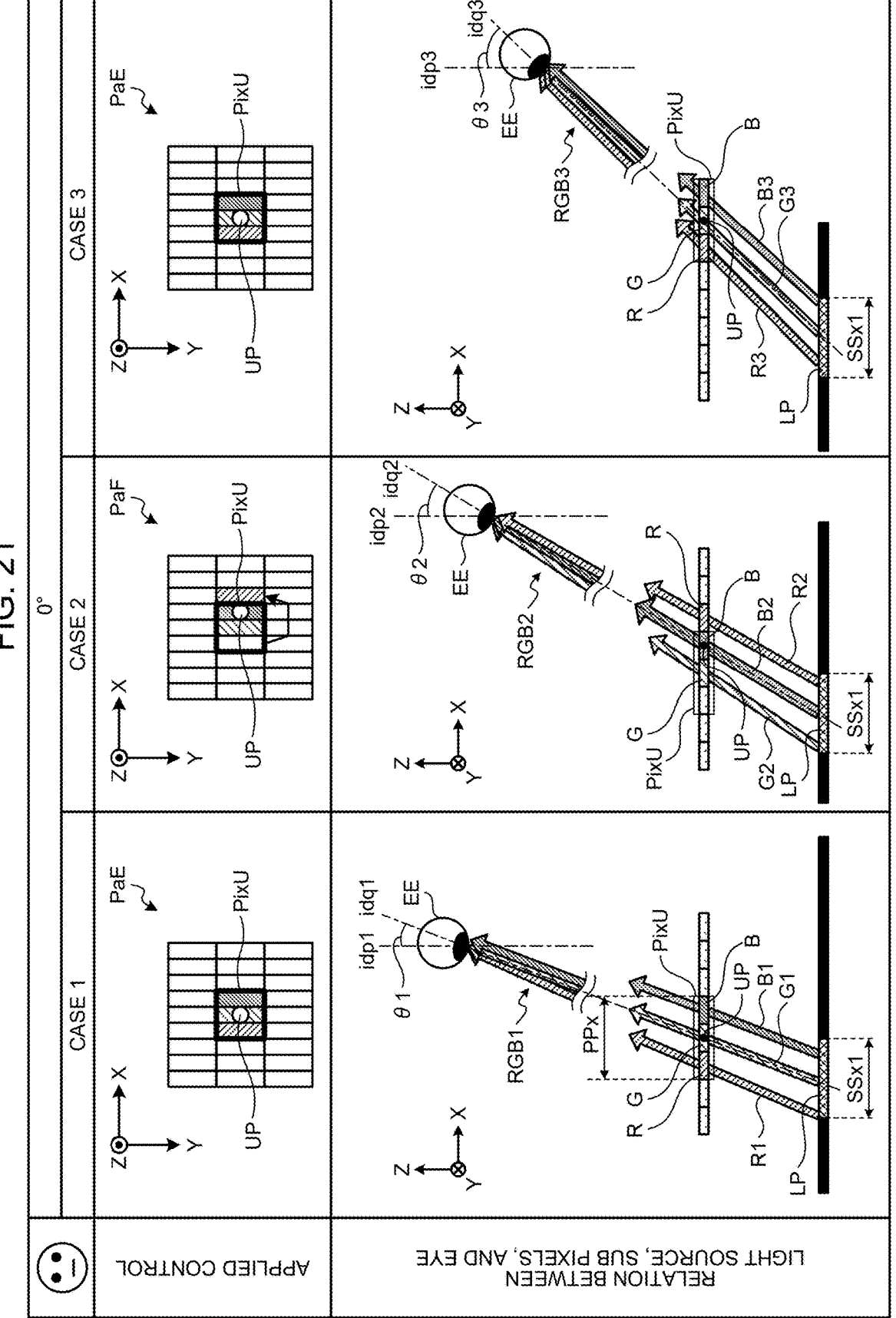
FIG. 21 is a schematic view illustrating the positional relation between a light emission point, a pixel, and a viewpoint when a viewpoint and the display device are substantially not positionally displaced relative to each other.

FIG. 21 is a schematic view illustrating the positional relation between a light emission point LP, a pixel PixU, and the viewpoint EE when the viewpoint EE and the display device 1 are substantially not positionally displaced relative to each other. The sub-pixel control described above with reference to FIG. 17 is performed in accordance with the relation between a pixel PixU corresponding to the position of the viewpoint EE and the pass-through point UP. Thus, it is possible to achieve display output with favorable display quality as long as no positional displacement with reference to the position of the viewpoint EE at a time point when a sub-pixel control pattern to be applied is determined occurs.

In FIG. 21, "Case 1", "Case 2", and "Case 3" are illustrated as specific examples. In "Case 1", as illustrated in the "applied control" row, the control pattern PaE is applied to a pixel PixU. In "Case 1", as illustrated in the "relation between light source, sub pixels, and eye" row, the second sub pixel G is on a ray line idq1 of light between the viewpoint EE and the light emission point LP, which is assumed at a time point when the control pattern PaE is applied. Hereinafter, the term "upper row" means the "applied control" row unless otherwise stated. The term "lower row" means the "relation between light source, sub pixels, and eye" row unless otherwise stated. The upper row illustrates sub-pixel control corresponding to the position of the viewpoint EE (assumed position) identified at a time point when a sub-pixel control pattern is determined. The lower row illustrates the actual positional relation between the light emission point LP, the pixel PixU, and the viewpoint EE at a time point when images are viewed at viewpoints.

In diagrams having the same table in FIG. 21, light passing through the first sub pixel R among light from the light emission point LP is illustrated as light Rq in the lower row of "Case q" (q is a natural number). For example, in the case of q=1, in other words, in the lower row of "Case 1", light passing through the first sub pixel R among light from the light emission point LP is denoted by reference sign R1. The following description with reference to the lower row is made based on this concept. In the lower row of "Case q", light passing through the second sub pixel G among light from the light emission point LP is indicated as light Gq. In the lower row of "Case q", light passing through the third sub pixel B among light from the light emission point LP is indicated as light Bq.

As illustrated in FIGS. 16 and 17, the pass-through point UP is in the second sub pixel G in the control pattern PaE. "Case 1" illustrated in FIG. 21 is a state in which no positional displacement occurs. In the lower row of Case 1, the X-directional position of the viewpoint EE in a state in which no positional displacement occurs is indicated as a position idp1. In such a state, as illustrated in the lower row of "Case 1", light from the light emission point LP can pass through each of the first sub pixel R, the second sub pixel G, and the third sub pixel B of the pixel PixU and reach the viewpoint EE. Specifically, in the lower row of "Case 1", light R1 passes through the first sub pixel R, light G1 passes through the second sub pixel G, light B1 passes through the third sub pixel B, and these light rays reach the viewpoint EE as light RGB1. In other words, light RGB1 in the lower row of "Case 1" includes light R1, light G1, and light B1.

In "Case 2" in FIG. 21, as illustrated in the upper row, the control pattern PaF is applied to a pixel PixU. In "Case 2", the third sub pixel B in on a ray line idq2 of light between the viewpoint EE and the light emission point LP, which is assumed at a time point when the control pattern PaF is applied. As illustrated in FIGS. 16 and 17, the pass-through point UP is in the third sub pixel B in the control pattern PaF. Thus, in "Case 2" as well, no positional displacement occurs, and light RGB2 including light G2, light B2, and light R2 can reach the viewpoint EE. A position idp2 in "Case 2" indicates the position of the viewpoint EE where no positional displacement occurs.

"Case 3" in FIG. 21 is substantially the same as "Case 1" except that the position of the viewpoint EE is changed from the position idp1 to a position idp3 and an angle θ3 of a ray line idq3 connecting the viewpoint EE and the light emission point LP with respect to the Z direction is different from an angle θ1 of the ray line idq1 with respect to the Z direction in "Case 1". Thus, in "Case 3" as well, no positional displacement occurs, and light RGB3 including light R3, light G3, and light B3 can reach the viewpoint EE.

Figure 22:
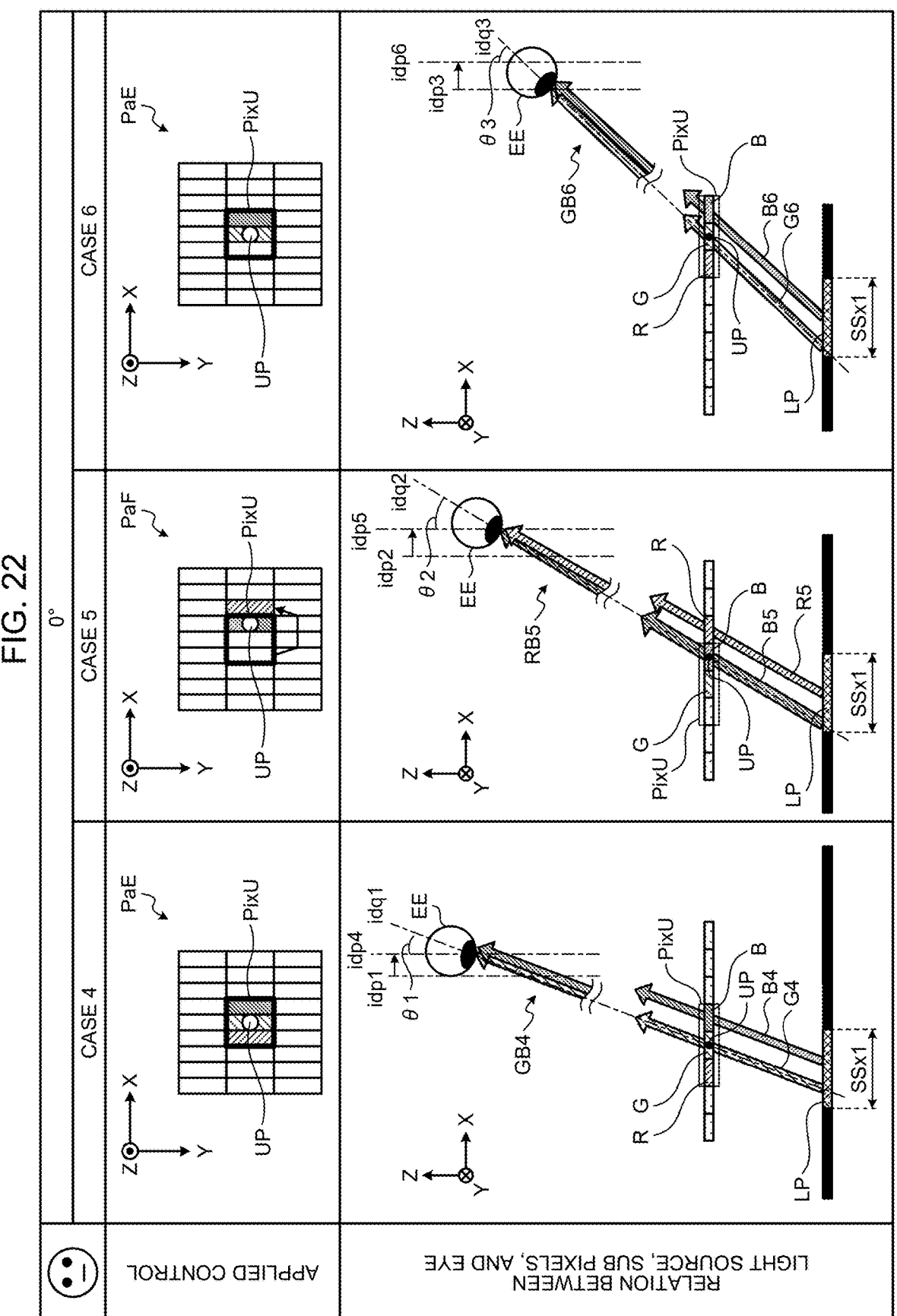
FIG. 22 is a schematic view illustrating the positional relation between a light emission point, a pixel, and a viewpoint when a viewpoint and the display device are substantially positionally displaced.

In FIG. 21 and FIG. 22 to be described later, a case where an X-directional width SS (refer to FIG. 3) of one light emission point LP is a width SSx1 is exemplarily illustrated. The width SSx1 is the X-directional width SS of the light emission point LP corresponding to the X-directional width of one pixel Pix (in other words, three sub pixels RGB). In other words, the width SSx1 is an X-directional design width of the light emission point LP, which is determined in advance based on an assumption that no positional displacement occurs and light from one light emission point LP passes through the display panel 20A with an X-directional width equivalent to one pixel Pix and with a center at the pass-through point UP and reaches the viewpoint EE. The design width is, for example, based on consideration of the distance Ph to be described later, but not limited thereto and may be changed as appropriate.

FIG. 22 is a schematic view illustrating the positional relation between a light emission point LP, a pixel PixU, and the viewpoint EE when the viewpoint EE and the display device 1 are substantially positionally displaced. In "Case 4" in FIG. 22, similarly to "Case 1" in FIG. 21, the control pattern PaE is applied to a pixel PixU. However, in "Case 4", unlike "Case 1", positional displacement occurs. As illustrated in the lower row of "Case 4", the positional displacement is such that the position of the viewpoint EE is displaced from the position idp1 to a position idp4. Due to the positional displacement, some of sub pixels that should be positioned on the ray line of light between the light emission point LP and the viewpoint EE are not positioned on the ray line of light. The lower row of "Case 4" illustrates an example in which the first sub pixel R is not positioned on the ray line of light. Due to the positional displacement, light reaching the viewpoint EE in "Case 4" is light GB4. Light GB4 includes light G4 and light B4 but does not include light passing through the first sub pixel R. Thus, in "Case 4", color unevenness occurs in which the red color component included in an image is not visually recognized or is weakened.

In "Case 5" in FIG. 22, similarly to "Case 2" in FIG. 21, the control pattern PaF is applied to a pixel PixU. However, in "Case 5", unlike "Case 2", positional displacement occurs. As illustrated in the lower row of "Case 5", the positional displacement is such that the position of the viewpoint EE is displaced from the position idp2 to a position idp5. Due to the positional displacement, in "Case 5", the second sub pixel G is not positioned on the ray line of light between the light emission point LP and the viewpoint EE. Thus, in "Case 5", light RB5 reaching the viewpoint EE includes light R5 and light B5 but does not include light passing through the second sub pixel G. Thus, in "Case 5", color unevenness occurs in which the green color component included in an image is not visually recognized or is weakened.

In "Case 6" in FIG. 22, similarly to "Case 3" in FIG. 21, the control pattern PaE is applied to a pixel PixU. However, in "Case 6", unlike "Case 3", positional displacement occurs. As illustrated in the lower row of "Case 6", the positional displacement is such that the position of the viewpoint EE is displaced from the position idp3 to a position idp6. Due to the positional displacement, in "Case 6", the first sub pixel R is not positioned on the ray line of light between the light emission point LP and the viewpoint EE. Thus, in "Case 6", light GB6 reaching the viewpoint EE includes light G6 and light B6 but does not include light passing through the first sub pixel R. Thus, in "Case 6", color unevenness occurs in which the red color component included in an image is not visually recognized or is weakened.

As described above with reference to FIG. 22, positional displacement in a case where the X-directional width SS (refer to FIG. 3) of one light emission point LP is the width SSx1 causes color unevenness. Thus, the X-directional width SS of one light emission point LP is set to be larger than the width SSx1 to reduce the color unevenness.

Figure 23:
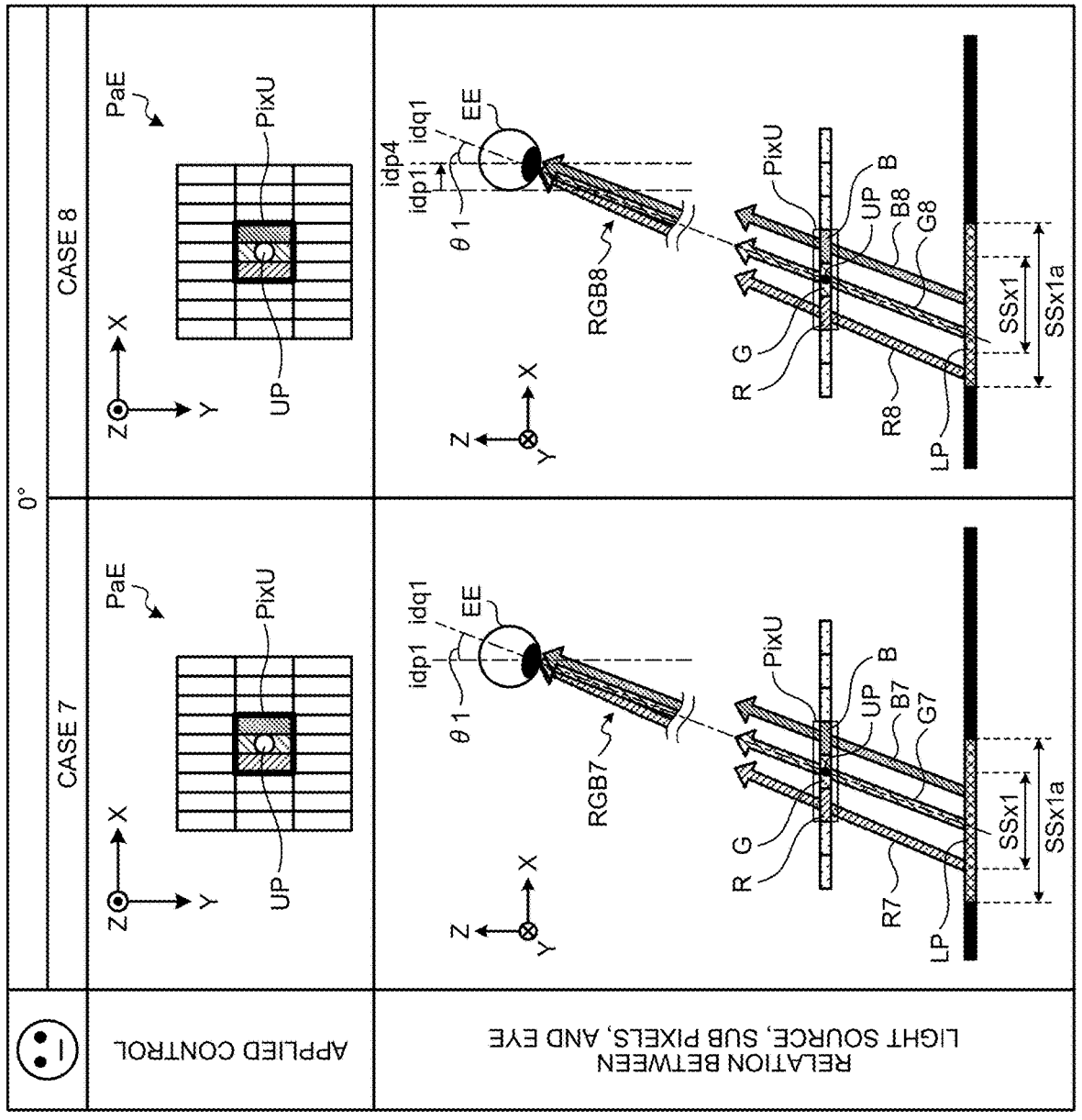
Figure 24:
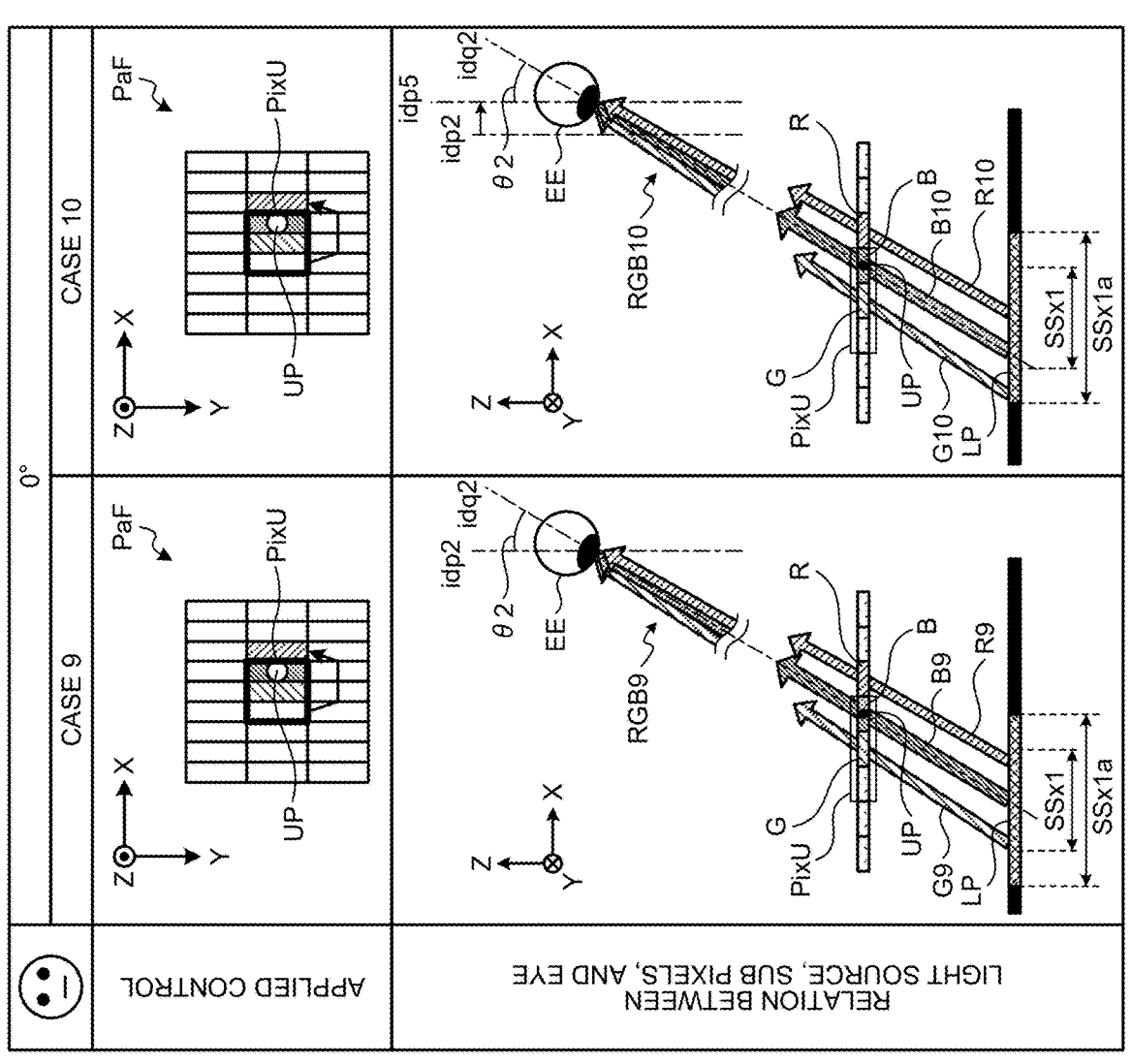

FIGS. 23 and 24 are schematic views illustrating the positional relation between a light emission point LP, a pixel PixU, and the viewpoint EE in a case where the X-directional width SS of one light emission point LP is a width SSx1a. "Case 7" illustrated in FIG. 23 corresponds to a case where the X-directional width SS of the light emission point LP in "Case 1" described above with reference to FIG. 21 is changed to the width SSx1a. "Case 8" corresponds to a case where the X-directional width SS of the light emission point LP in "Case 4" described above with reference to FIG. 22 is changed to the width SSx1a. "Case 9" illustrated in FIG. 24 corresponds to a case where the X-directional width SS of the light emission point LP in "Case 2" described above with reference to FIG. 21 is changed to the width SSx1a. "Case 10" corresponds to a case where the X-directional width SS of the light emission point LP in "Case 5" described above with reference to FIG. 22 is changed to the width SSx1a.

The width SSx1a is an X-directional design width of the light emission point LP, which is determined in advance based on an assumption that light from one light emission point LP passes through the display panel 20A with the X-directional width exceeding the width of one pixel Pix and with a center at the pass-through point UP and reaches the viewpoint EE. Specifically, the width SSx1a is larger than the width of one pixel Pix in the X direction. The X-directional width exceeding the width of one pixel Pix is equivalent to, for example, the width of five sub pixels arranged in the X direction. This configuration is based on a case where three sub pixels with equal widths are arranged in one pixel Pix, but is not limited thereto and may be changed as appropriate.

As illustrated in "Case 7" in FIG. 23, the same display output as in "Case 1" described above with reference to FIG. 21 can be performed even when the X-directional width SS of one light emission point LP is the width SSx1a. In other words, light RGB7 illustrated in the lower row of "Case 7" includes light R7, light G7, and light B7.

As illustrated in "Case 8" in FIG. 23, since the X-directional width SS of one light emission point LP is the width SSx1a, unlike "Case 4" described above with reference to FIG. 22, light passing through three sub pixels arranged in the X direction with a center at the pass-through point UP can reach the viewpoint EE from the light emission point LP even when positional displacement occurs. In other words, light RGB8 illustrated in the lower row of "Case 8" includes light R8, light G8, and light B8.

As illustrated in "Case 9" in FIG. 24, the same display output as in "Case 2" described above with reference to FIG. 21 can be performed even when the X-directional width SS of one light emission point LP is the width SSx1$a$. In other words, light RGB9 illustrated in the lower row of "Case 9" includes light R9, light G9, and light B9.

As illustrated in "Case 10" in FIG. 24, since the X-directional width SS of one light emission point LP is the width SSx1$a$, unlike "Case 5" described above with reference to FIG. 22, light passing through three sub pixels arranged in the X direction with a center at the pass-through point UP can reach the viewpoint EE from the light emission point LP even when positional displacement occurs. In other words, light RGB10 illustrated in the lower row of "Case 10" includes light R10, light G10, and light B10.

As described above with reference to FIGS. 23 and 24, it is possible to reduce display quality degradation due to positional displacement by setting the X-directional width SS of the light emission point LP to the X-directional width exceeding the width of one pixel Pix. In other words, the range of the angle of view in the X direction in which images can be viewed at favorable display quality from viewpoints, is determined in accordance with the X-directional width SS of the light emission point LP. The following describes an example of the relation between the X-directional width SS of the light emission point LP and the angle of view with reference to FIGS. 25 to 28.

Figure 25:
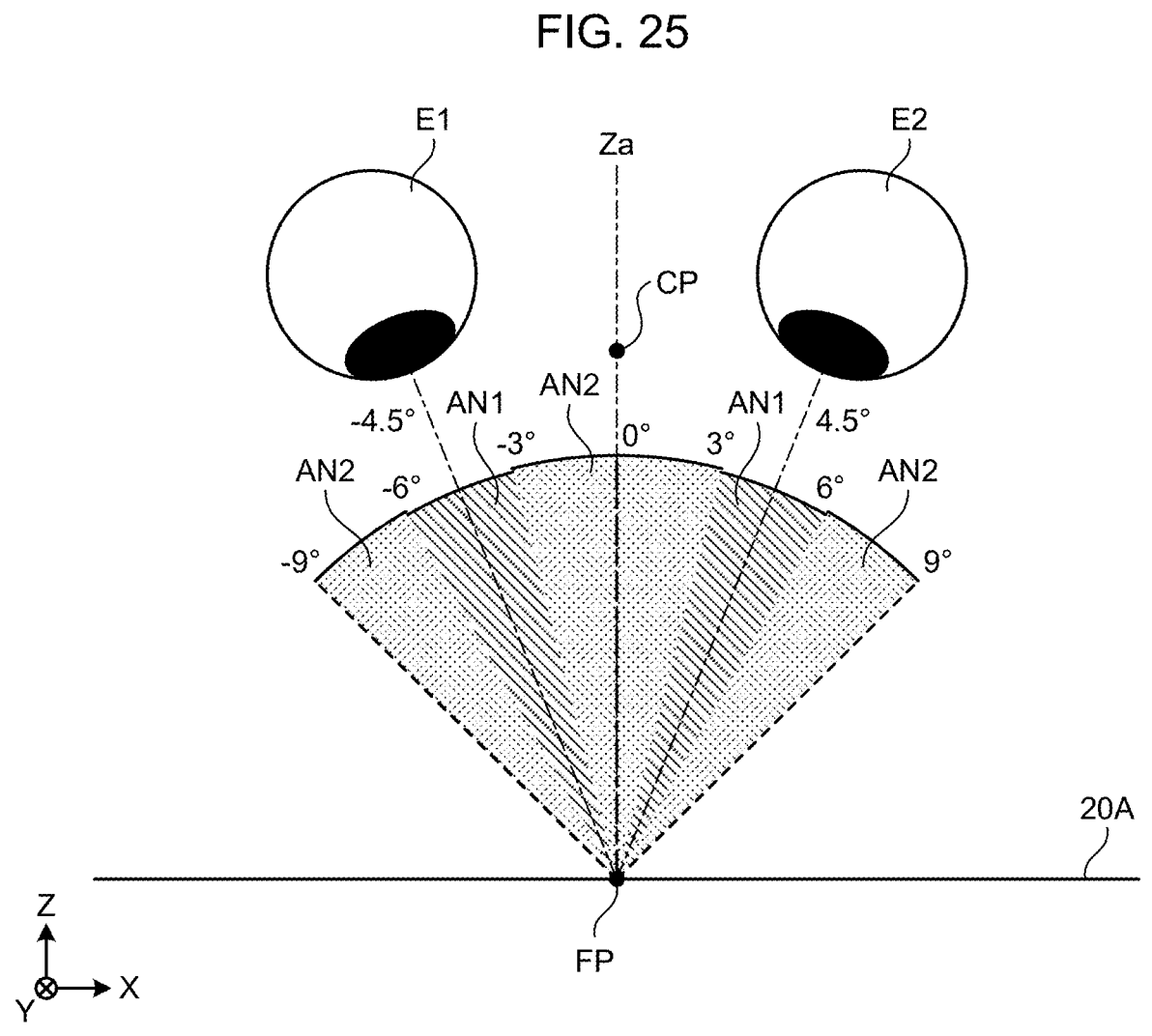

FIG. 25 is a schematic view illustrating an example of the relation between the display panel 20A and the two viewpoints E1 and E2 and the angle of view at each of the viewpoints E1 and E2. In FIG. 25 and FIG. 27 to be described later, the viewpoints E1 and E2 are symmetrically positioned in the X direction with respect to an axis line Za extending in the Z direction and passing through the middle point CP and a focus target FP. The focus target FP is a target to which the line of sight from the user extends toward the display panel 20A. The focus target FP illustrated in FIG. 25 is a schematic illustration from a macroscopic perspective, and focus targets FP1 and FP2 that are the focus target FP for the viewpoints E1 and E2, respectively, are located at rigorously different positions from a microscopic perspective in reality (refer to FIG. 26, for example). The viewpoint E1 side of the axis line Za is referred to as one side (negative (−) side) in the X direction. The viewpoint E2 side of the axis line Za is referred to as the other side (positive (+) side) in the X direction. In examples illustrated in FIGS. 25 and 27, the line of sight from the viewpoint E1 to the focus target FP is tilted by −4.5 degrees (°) relative to the axis line Za. The line of sight from the viewpoint E2 to the focus target FP is tilted by 4.5 degrees (°) relative to the axis line Za.

In the example illustrated in FIG. 25, a range AN1 of ±1.5 degrees (°) with respect to a line of sight as a center illustrated with a dashed and single-dotted line in the drawing is indicated as a range in which no color unevenness due to positional displacement occurs. A range AN2 of ±3 degrees (°) with respect to the range AN1 is indicated as a range in which color unevenness occurs but images for viewpoints can be visually recognized. Such ranges AN1 and AN2 correspond to, for example, a case where the X-directional width SS of the light emission point LP is a width SSx2 (refer to FIG. 26).

Figure 26:
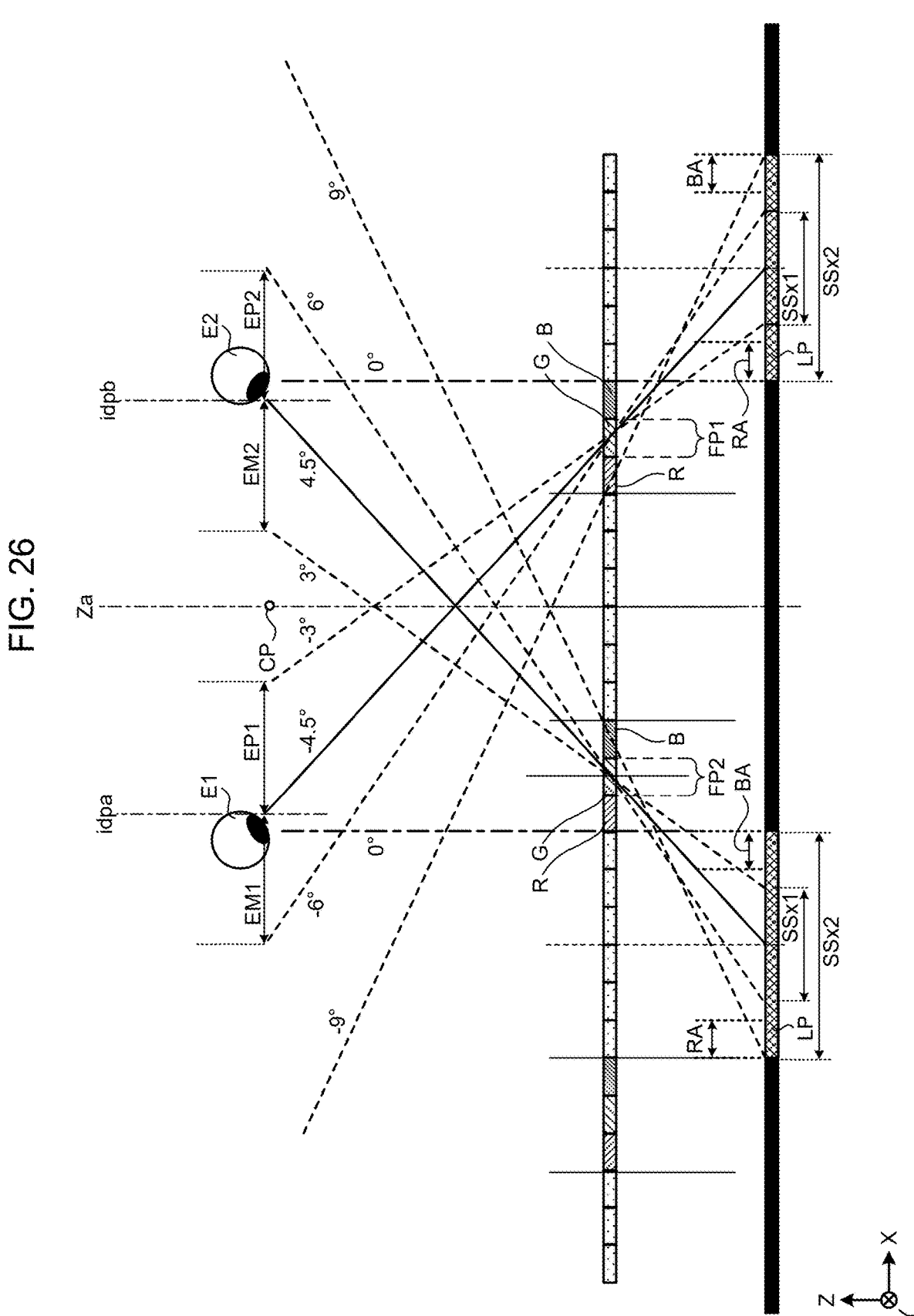
FIG. 26 is a schematic view illustrating an example of the relation between the angle of view and the path of light in a case where the width of each light emission point in the X direction is a width SSx2.
Figure 27:
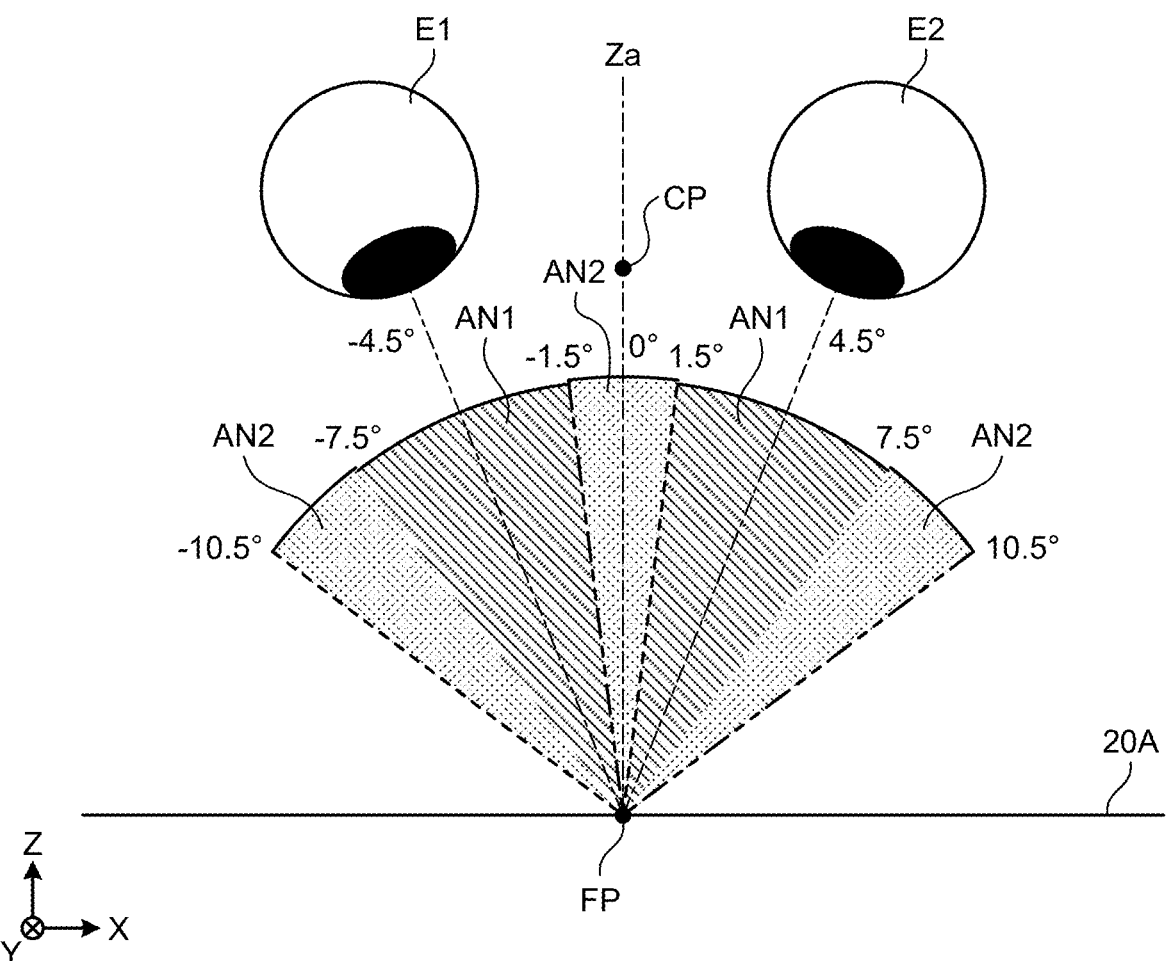
FIG. 27 is a schematic view illustrating another example of the relation between the display panel and two viewpoints and the angle of view at each of the viewpoints E1 and E2.

FIG. 26 is a schematic view illustrating an example of the relation between the angle of view and the path of light in a case where the X-directional width SS of the light emission point LP is the width SSx2. The width SSx2 is an X-directional design width of the light emission point LP, which is determined in advance based on an assumption that light from one light emission point LP passes through the display panel 20A with an X-directional width equivalent to two pixels Pix (width equivalent to six sub pixels) and with a center at the pass-through point UP and reaches a viewpoint (the viewpoints E1 and E2). FIG. 26 illustrates a case where the focus targets FP1 and FP2 are the second sub pixels G. The focus target FP1 is the focus target FP for the viewpoint E1. The focus target FP2 is the focus target FP for the viewpoint E2. In the embodiment, the user does not perceive the focus targets of the viewpoints E1 and E2 as mutually different focus targets FP1 and FP2, and thus a focus target from a macroscopic perspective by the user is the focus target FP as described above with reference to FIG. 25. However, in the display output aspect of a display device with which the user visually recognizes parallax images, the individual focus targets FP1 and FP2 exist at the viewpoints E1 and E2, respectively, in reality. Thus, precisely for the angle of view described above with reference to FIG. 25, the focus target FP1 in FIG. 26 is regarded as the focus target FP in FIG. 25 for the viewpoint E1, and the focus target FP2 in FIG. 26 is regarded as the focus target FP in FIG. 25 for the viewpoint E2.

In the embodiment, the first sub pixel R, the second sub pixel G, and the third sub pixel B are arranged in the X direction as illustrated in FIG. 26 and other diagrams. In the example illustrated in FIG. 26, the first sub pixel R, the second sub pixel G, and the third sub pixel B are arranged in the stated order from the one side in the X direction. The sub pixels of the regions not hatched as the first sub pixel R, the second sub pixel G, and the third sub pixel B do not emit color (black display). With consideration on a light region in which color unevenness does not occur, the light emission point LP is required to have a region (first region) where light can be allocated to sub pixels relatively positioned on one side of the pass-through point UP and a region (second region) where light can be allocated to sub pixels relatively positioned on the other side of the reference.

In other words, to avoid occurrence of color unevenness, light from the first region and the second region is not allocated to a sub pixel where the pass-through point UP is positioned. FIG. 26, in which the second sub pixel G is regarded as the reference, illustrates a first region RA and a second region BA from which light is not allocated to the second sub pixel G. Thus, the range AN1 illustrated in FIG. 25 is a range in which light from the light emission point LP with the width SSx2 can pass through the second sub pixel G and in which the light is emitted from a region except for the first region RA and the second region BA in the light emission point LP.

As described above, the width SSx2 corresponds to a width equivalent to two pixels Pix. Thus, in the case of a form in which each pixel Pix includes three sub pixels as in the embodiment, with the configuration illustrated in FIG. 26, it is possible to ensure a region corresponding to four sub pixels as a light irradiation area in which color unevenness does not occur even when the first region RA and the second region BA are excluded. Thus, with the configuration illustrated in FIG. 26, it is possible to ensure, for the viewpoint E1, a margin of a width EM1 on one side and a margin of a width EP1 on the other side with respect to a center at a position idpa that is the X-directional middle point of an image visible region in which color unevenness does not occur. It is possible to ensure, for the viewpoint E2, a margin of a width EM2 on one side and a margin of a width EP2 on the other side with respect to a center at a position idpb that is the X-directional middle point of an image visible region in which color unevenness does not occur.

However, it is possible to output images for viewpoints even in a case where light from the first region RA passes through the second sub pixel G or the third sub pixel B, and in a case where light from the second region BA passes through the first sub pixel R or the second sub pixel G, although color unevenness occurs. The range AN2 illustrated in FIG. 25 is a range corresponding to these cases.

FIG. 27 is a schematic view illustrating another example of the relation between the display panel 20A and the two viewpoints E1 and E2 and the angle of view at each of the viewpoints E1 and E2. In the example illustrated in FIG. 27, a range AN1 of ±3 degrees (°) with respect to a line of sight as a center is indicated as a range in which no color unevenness due to positional displacement occurs. A range AN2 of ±3 degrees (°) with respect to the range AN1 is indicated as a range in which color unevenness occurs but images for viewpoints can be visually recognized. Such ranges AN1 and AN2 correspond to, for example, a case where the X-directional width SS of the light emission point LP is a width SSx3 (refer to FIG. 26).

Figure 28:
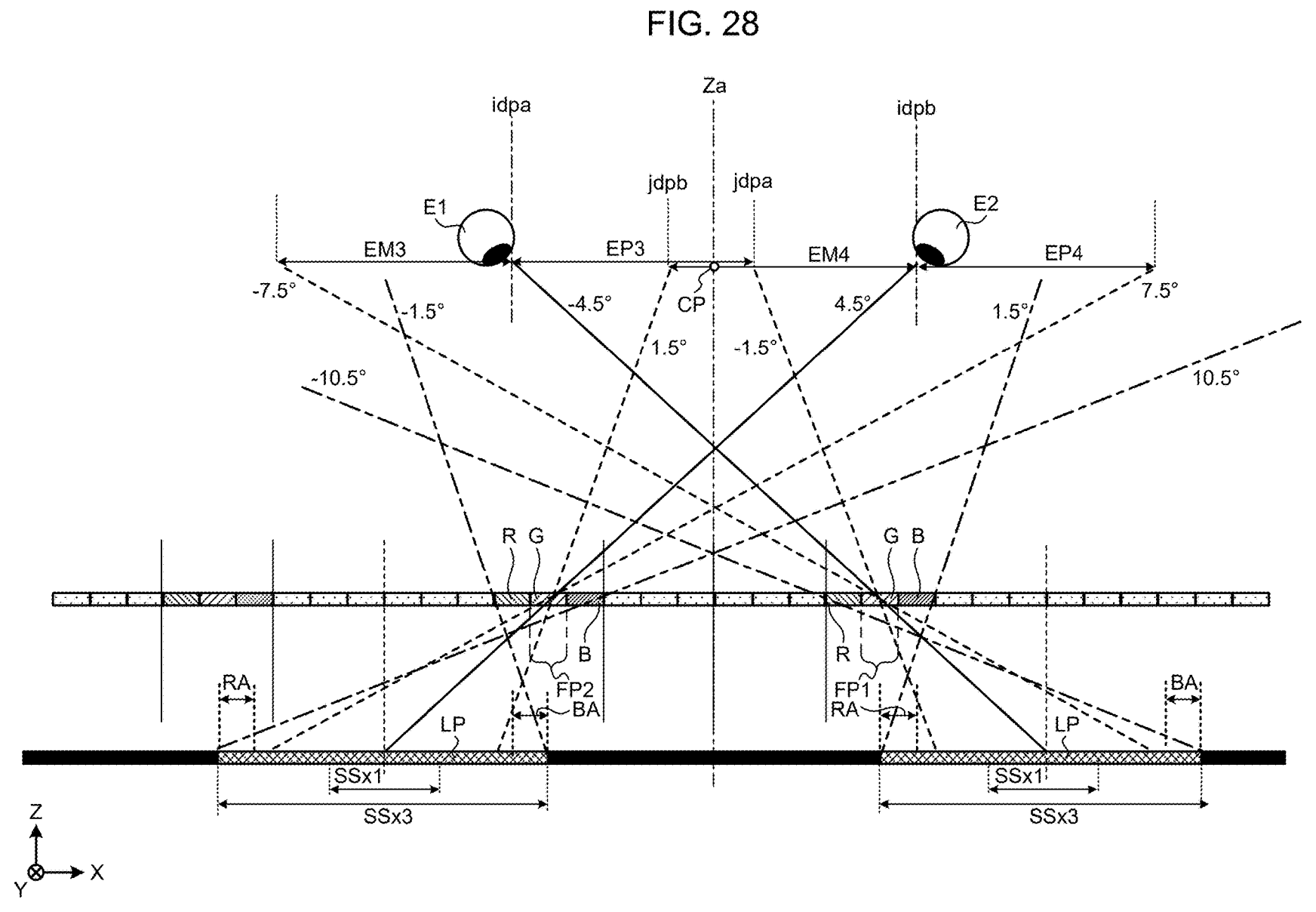

FIG. 28 is a schematic view illustrating an example of the relation between the angle of view and the path of light in a case where the X-directional width SS of the light emission point LP is the width SSx3. The width SSx3 is an X-directional design width of the light emission point LP, which is determined in advance based on an assumption that light from one light emission point LP passes through the display panel 20A with an X-directional width equivalent to three pixels Pix and with a center at the pass-through point UP and reaches a viewpoint (the viewpoints E1 and E2).

In the example illustrated in FIG. 28 as well, light from the first region and the second region is not allocated to a sub pixel where the pass-through point UP is positioned. This is to avoid occurrence of color unevenness as described above with reference to FIG. 26. Thus, the range AN1 illustrated in FIG. 27 is a range in which light from the light emission point LP with the width SSx3 can pass through the second sub pixel G and in which the light is emitted from a region except for the first region RA and the second region BA in the light emission point LP.

As described above, the width SSx3 corresponds to a width equivalent to three pixels Pix. Thus, in the case of a form in which each pixel Pix includes three sub pixels as in the embodiment, with the configuration illustrated in FIG. 26, it is possible to ensure a region corresponding to seven sub pixels as a light irradiation area in which color unevenness does not occur even when the first region RA and the second region BA are excluded. Thus, with the configuration illustrated in FIG. 28, it is possible to ensure, for the viewpoint E1, a margin of a width EM3 on one side and a margin of a width EP3 on the other side with respect to a center at a position idpa that is the X-directional middle point of an image visible region in which color unevenness does not occur. It is possible to ensure, for the viewpoint E2, a margin of a width EM4 on one side and a margin of a width EP4 on the other side with respect to a center at a position idpb that is the X-directional middle point of an image visible region in which color unevenness does not occur.

As illustrated in FIG. 28, in a case where the X-directional width SS of the light emission point LP is the width SSx3, part of the width EP3 and part of the width EM4 overlap at and/or near the middle point CP. Thus, in a case where any one of the right and left eyes is positioned in this overlapping region when the user views the screen in an oblique direction, images for the viewpoint (right eye) E1 can be visually recognized at the viewpoint (left eye) E2 or images for the viewpoint (left eye) E2 can be visually recognized at the viewpoint (right eye) E1. However, such image visual recognition at an unintended viewpoint does not occur unless the user intentionally views the screen in an oblique direction, for example, unless the screen is not positioned in front of the user.

The above description with reference to FIGS. 21 to 28 is made on influence of positional displacement in the X direction under a condition that the sub-pixel control pattern described above with reference to FIG. 16 and other diagrams is applied, and handling methods thereof. The following describes, with reference to FIGS. 29 to 32, matters related to the Y direction under the condition that the sub-pixel control pattern described above with reference to FIG. 16 and other diagrams is applied.

Figure 29:
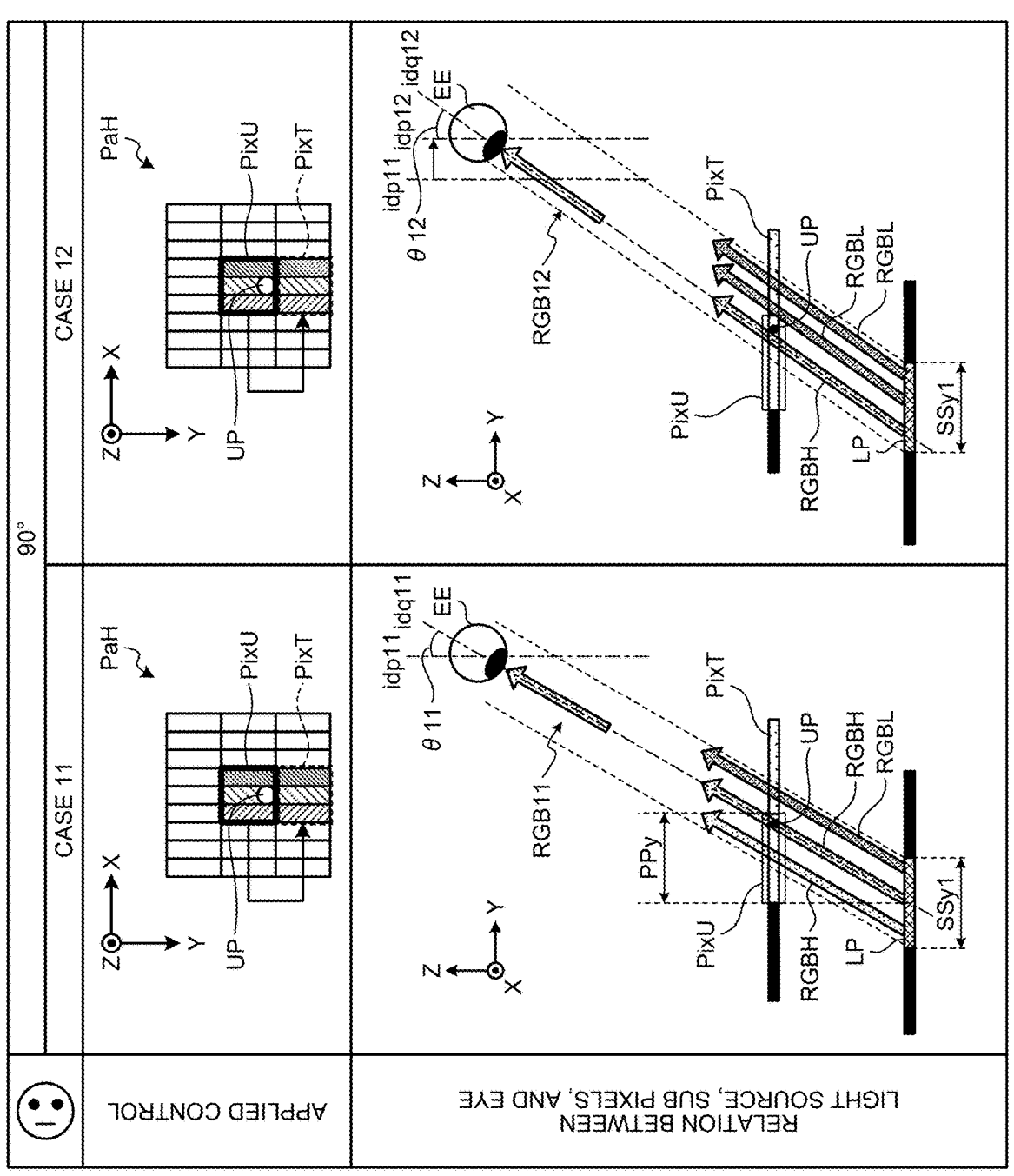
FIG. 29 is a schematic view illustrating the positional relation between a light emission point, a pixel, and a viewpoint in a Y direction under a condition that the sub-pixel control pattern described above with reference to FIG. 16 and other diagrams is applied.

FIG. 29 is a schematic view illustrating the positional relation between a light emission point LP, a pixel PixU, and the viewpoint EE in the Y direction under the condition that the sub-pixel control pattern described above with reference to FIG. 16 and other diagrams is applied. As illustrated in FIGS. 16 and 17, in the control pattern PaH, the pass-through point UP is on the one end side in the Y direction in the second sub pixel G. In the lower row of "Case 11" illustrated in FIG. 29, the position of the viewpoint EE in the Y direction is indicated as a position idp11. "Case 11" exemplarily indicates a case where light from the light emission point LP can pass through the pixel PixU and a pixel PixT adjacent to the pixel PixU at a position closer to the pass-through point UP and reach the viewpoint EE.

However, in "Case 12" illustrated in FIG. 29, the position of the viewpoint EE is changed from the position idp11 to a position idp12 as compared to "Case 11". In "Case 12", as compared to "Case 11", an angle $\theta 12$ of a ray line idq12 connecting the viewpoint EE and the light emission point LP with respect to the Z direction is different from an angle $\theta 11$ of a ray line idq11 in "Case 11" with respect to the Z direction. Thus, in "Case 12", the ratio between the proportion of light passing through the pixel PixU and the proportion of light passing through the pixel PixT in light from the light emission point LP is different from that in "Case 11". In the case of the example illustrated in FIG. 29, the ratio between light RGBH passing through the pixel PixU and light RGBL passing through the pixel PixT is approximately 2:1 in "Case 11". However, in "Case 11", the ratio between light RGBH passing through the pixel PixU and light RGBL passing through the pixel PixT is approximately 1:2. Combination of such a ratio difference and a degree difference indicating the "difference between the degree of light transmission of the pixel PixU and the degree of light transmission of the pixel PixT" causes difference in display output brightness between "Case 11" and "Case 12".

It is assumed that the sub-pixel control described above with reference to FIG. 17 is not applied and a pixel signal allocated to the pixel PixU is a pixel signal corresponding to white at highest luminance. As a specific example, such a pixel signal can be expressed in 8-bit format for R, C, and B as (R, G, B)=(255, 255, 255). When the sub-pixel control described above with reference to FIG. 17 is applied to the pixel PixU provided with the 8-bit pixel signal, 66% of a white color component with the luminance of 100% corresponding to the pixel signal is allocated to the pixel PixU and 33% thereof is allocated to the pixel PixT. This is because luminance allocation to the pixel PixT is at most half of the pixel PixU as described above. When "Case 11" is compared with "Case 12" under a condition that the sub-pixel control described above with reference to FIG. 17 is applied to the pixel PixU provided with the pixel signal, light RGB12 visually recognized at the viewpoint EE in "Case 12" is darker than light RGB11 visually recognized at the viewpoint EE in "Case 11". This is because the ratio between light RGBH passing through the pixel PixU at a relatively high light transmission rate and light RGBL passing through the pixel PixT at a relatively low light transmission rate is approximately 2:1 in "Case 11", but the ratio is approximately 1:2 in "Case 12". In other words, although light RGB11 and light RGB12 both include light RGBH and light RGBL, the proportion of light RGBL is higher and the proportion of light RGBH is lower in light RGB12 than in light RGB11.

Figure 30:
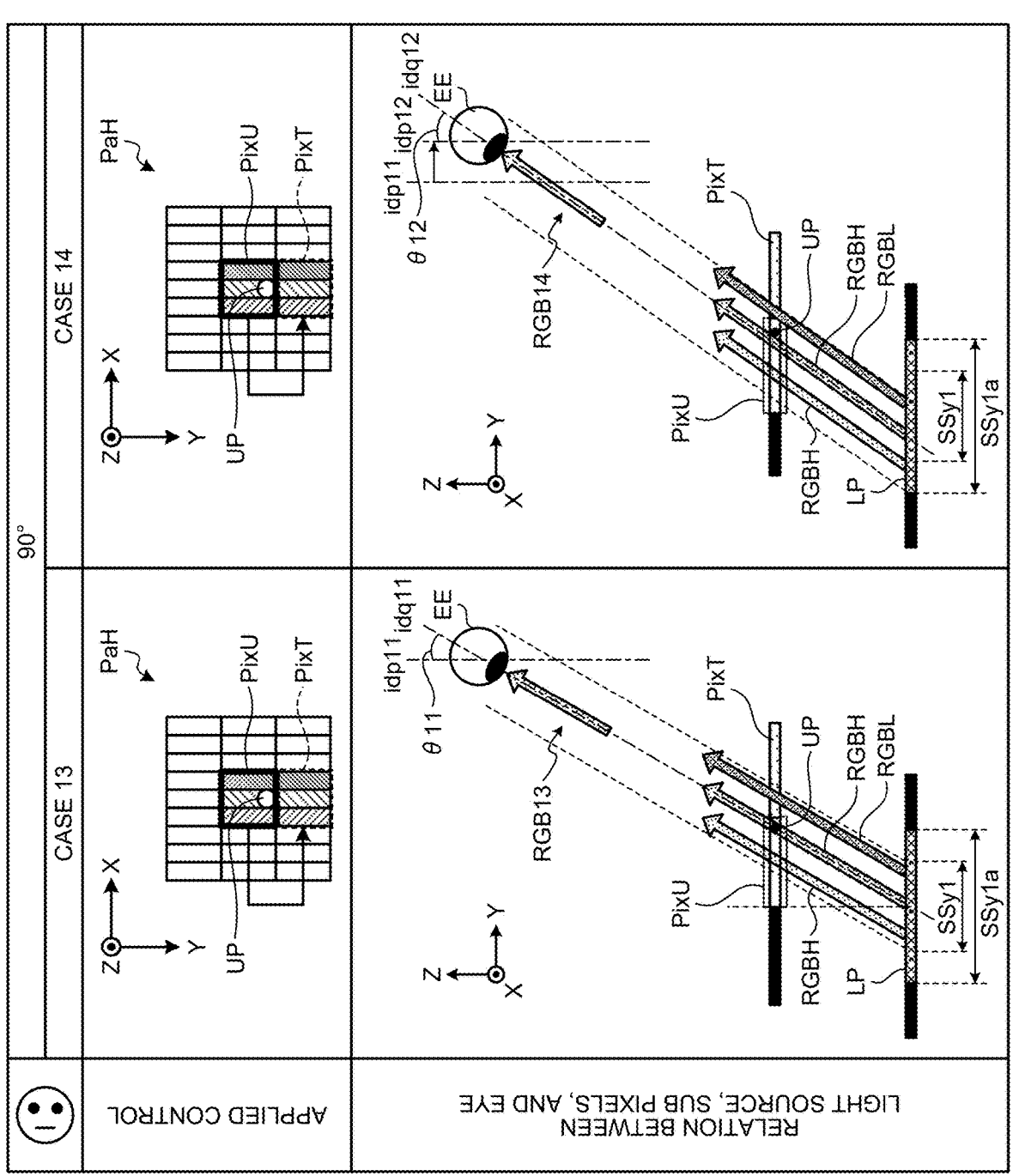

FIG. 29 and FIG. 30 to be described later exemplarily illustrate a case where the Y-directional width of one light emission point LP is a width SSy1. The width SSy1 is the Y-directional width of a light emission point LP corresponding to the Y-directional width of one pixel Pix. Specifically, the width SSy1 is a Y-directional design width of the light emission point LP, which is determined in advance based on an assumption that light from one light emission point LP passes through the display panel 20A with an X-directional width equivalent to one pixel Pix and with a center at the pass-through point UP and reaches the viewpoint EE. The design width is, for example, based on consideration of the distance Ph to be described later, but not limited thereto and may be changed as appropriate.

As described above with comparison between "Case 11" and "Case 12" in FIG. 29, brightness may decrease unintentionally as in "Case 12" even though control patterns are the same as the kind of a sub-pixel control pattern described above with reference to FIG. 17. Such brightness decrease can be reduced by setting the Y-directional width of one light emission point LP to a width larger than the width SSy1.

FIG. 30 is a schematic view illustrating the positional relation between a light emission point LP, a pixel PixU, and the viewpoint EE in a case where the Y-directional width of one light emission point LP is a width SSy1a. "Case 13" illustrated in FIG. 30 corresponds to a case where the Y-directional width of the light emission point LP in "Case 11" described above with reference to FIG. 29 is changed to the width SSy1a. "Case 14" corresponds to a case where the Y-directional width of the light emission point LP in "Case 12" described above with reference to FIG. 29 is changed to the width SSy1a.

The width SSy1a is a Y-directional design width of the light emission point LP, which is determined in advance based on an assumption that light from one light emission point LP passes through the display panel 20A with a Y-directional width exceeding the width of one pixel Pix and with a center at the pass-through point UP and reaches the viewpoint EE. The Y-directional width exceeding the width of one pixel Pix is, for example, 5/3 times the Y-directional width of the pixel Pix.

Even in a case where the Y-directional width of one light emission point LP is the width SSy1a, light RGB13 illustrated in "Case 13" in FIG. 30 can ensure a brightness higher than that of light RGB11 in "Case 11" described above with reference to FIG. 29. Unlike light RGB12 in "Case 12" described above with reference to FIG. 29, light RGB14 illustrated in "Case 14" in FIG. 30 can ensure a brightness equivalent to or more excellent than that of light RGB11 in "Case 11" since the Y-directional width of one light emission point LP is the width SSy1a. In other words, light RGB11 and light RGB14 both include light RGBH and light RGBL. Light RGBH included in light RGB14 is equal to or more than light RGBH included in light RGB11, and light RGBL included in light RGB14 is equal to or more than light RGBL included in light RGB11.

As described above with reference to FIG. 30, it is possible to reduce brightness decrease by changing the Y-directional width of the light emission point LP to a Y-directional width exceeding the width of one pixel Pix. The following describes an example of the relation between the Y-directional width of the light emission point LP and the angle of view with reference to FIGS. 31 and 32.

Figure 31:
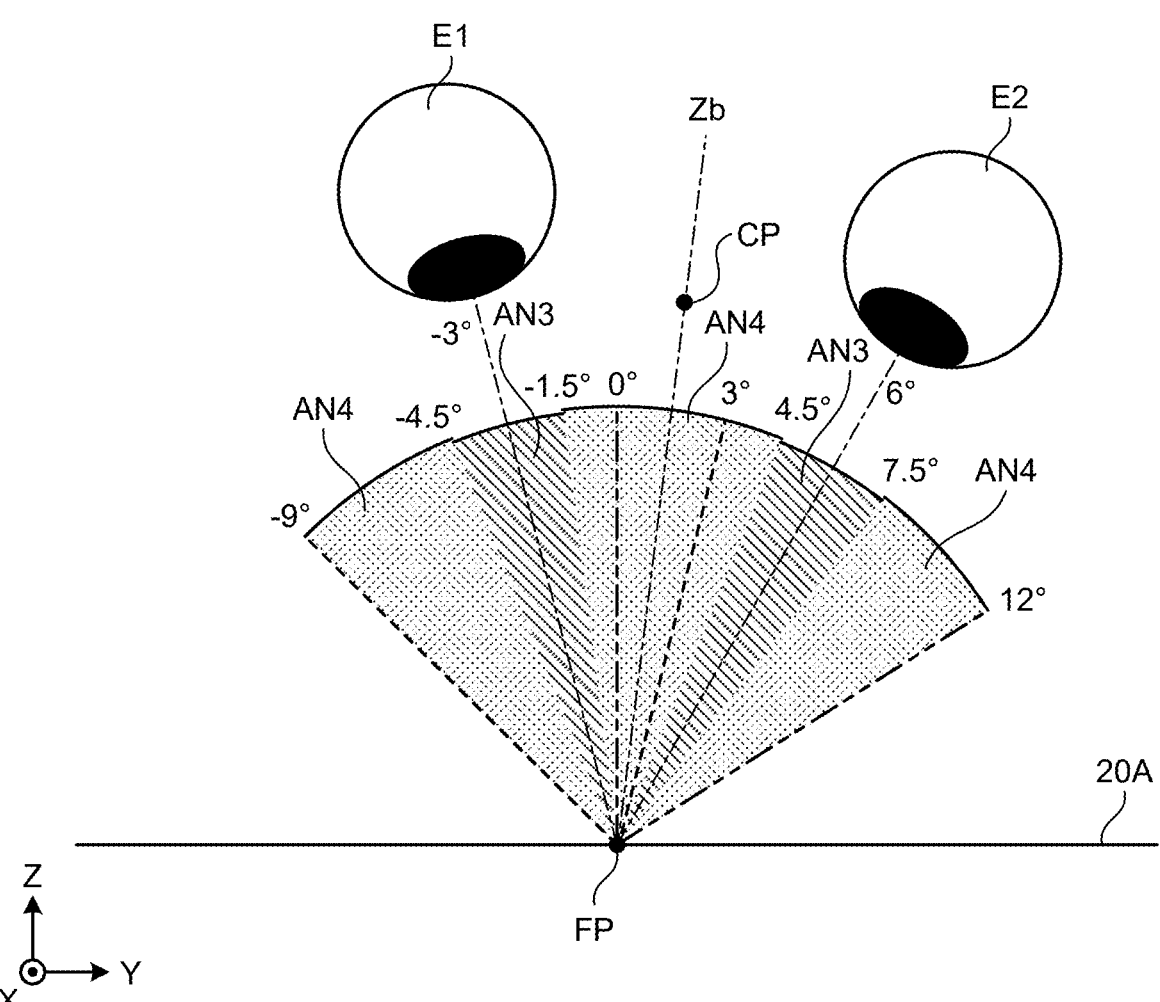
FIG. 31 is a schematic view illustrating an example of the relation between the display panel and two viewpoints and the angle of view at each of the viewpoints E1 and E2.

FIG. 31 is a schematic view illustrating an example of the relation between the display panel 20A and the two viewpoints E1 and E2 and the angle of view at each of the viewpoints E1 and E2. In the example illustrated in FIG. 31, the viewpoints E1 and E2 are symmetrically positioned in the Y direction with respect to an axis line Zb passing through the middle point CP and the focus target FP. The axis line Zb is tilted by 1.5° on the viewpoint E2 side with respect to the Z direction. The viewpoint E1 side of the axis line Zb is referred to as one side (negative (−) side) in the Y direction. The viewpoint E2 side of the axis line Zb is referred to as the other side (positive (+) side) in the Y direction. In the example illustrated in FIG. 31, the line of sight from the viewpoint E1 to the focus target FP is tilted by −4.5 degrees (°) relative to the axis line Zb. The line of sight from the viewpoint E2 to the focus target FP is tilted by 4.5 degrees (°) relative to the axis line Zb.

In the example illustrated in FIG. 31, a range AN3 of ±1.5 degrees (°) with respect to a line of sight as a center is indicated as a range in which brightness decrease does not occur. A range AN4 of ±4.5 degrees (°) with respect to the range AN3 is indicated as a range in which brightness decrease occurs but images for viewpoints can be visually recognized. Such ranges AN3 and AN4 correspond to, for example, a case where the X-directional width SS of the light emission point LP is a width SSy2 (refer to FIG. 32).

Figure 32:
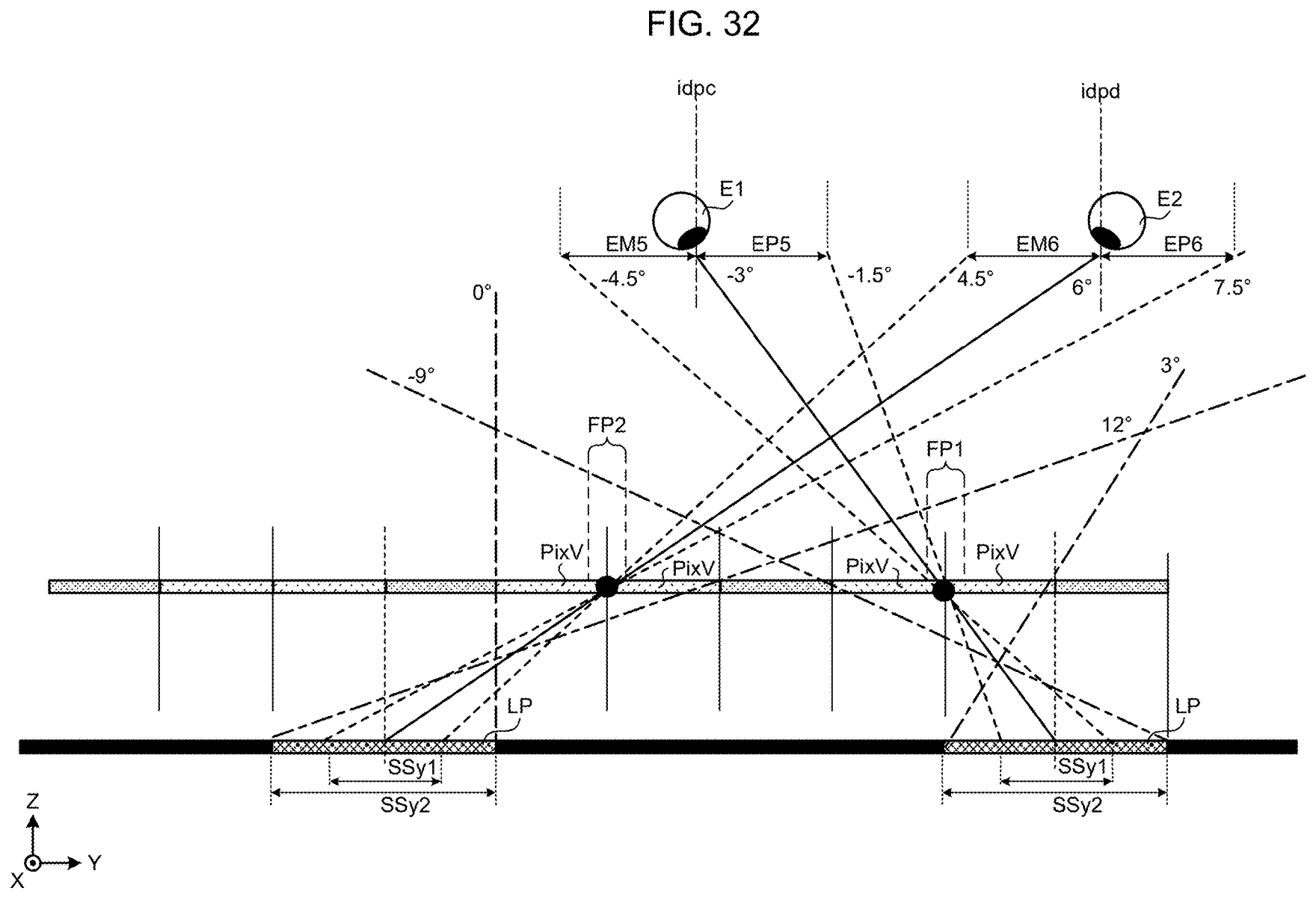

FIG. 32 is a schematic view illustrating an example of the relation between the angle of view and the path of light in a case where the Y-directional width of the light emission point LP is the width SSy2. The width SSy2 is a Y-directional design width of the light emission point LP, which is determined in advance based on an assumption that light from one light emission point LP passes through the display panel 20A with a Y-directional width equivalent to two pixels Pix and with a center at the pass-through point UP and reaches a viewpoint (the viewpoints E1 and E2). Pixels PixV illustrated in FIG. 32 are pixels PixU or PixT. One of two adjacent pixels PixV is a pixel PixU, and the other is a pixel PixT.

In the embodiment in which three sub pixels included in a pixel Pix are arranged in the X direction but not in the Y direction, light from the light emission point LP does not need consideration of the relation with sub pixels in the Y direction. Thus, with the configuration illustrated in FIG. 32, it is possible to ensure a region corresponding to two pixels Pix as an irradiation area of light from the light emission point LP for two adjacent pixels PixV. Thus, with the configuration illustrated in FIG. 32, it is possible to ensure, for the viewpoint E1, a margin of a width EM5 on one side and a margin of a width EP5 on the other side with respect to a center at a position idpc that is the Y-directional middle point of an image visible region in which brightness can be ensured. It is possible to ensure, for the viewpoint E2, a margin of a width EM6 on one side and a margin of a width EP6 on the other side with respect to a center at a position idpd that is the Y-directional middle point of an image visible region in which brightness can be ensured. The range AN3 illustrated in FIG. 31 is a range corresponding to these cases.

The images for viewpoints can be output even in a region in which light from the vicinity of an end part of the light emission point LP on the one side passes through the other side pixel of two adjacent pixels PixV, and a region in which light from the vicinity of an end part of the light emission point LP on the other side passes through the one side pixel of the two adjacent pixels PixV, although brightness decrease occurs. The range AN4 illustrated in FIG. 31 is a range corresponding to these cases.

The above description with reference to FIGS. 21 to 32 is made on the relation between the width of the light emission point LP and display output in a case where the sub-pixel control described above with reference to FIG. 17 is applied. The following describes, with reference to FIGS. 33 to 40, the relation between the width of the light emission point LP and display output in a case where the sub-pixel control described above with reference to FIG. 17 is not applied.

Figure 33:
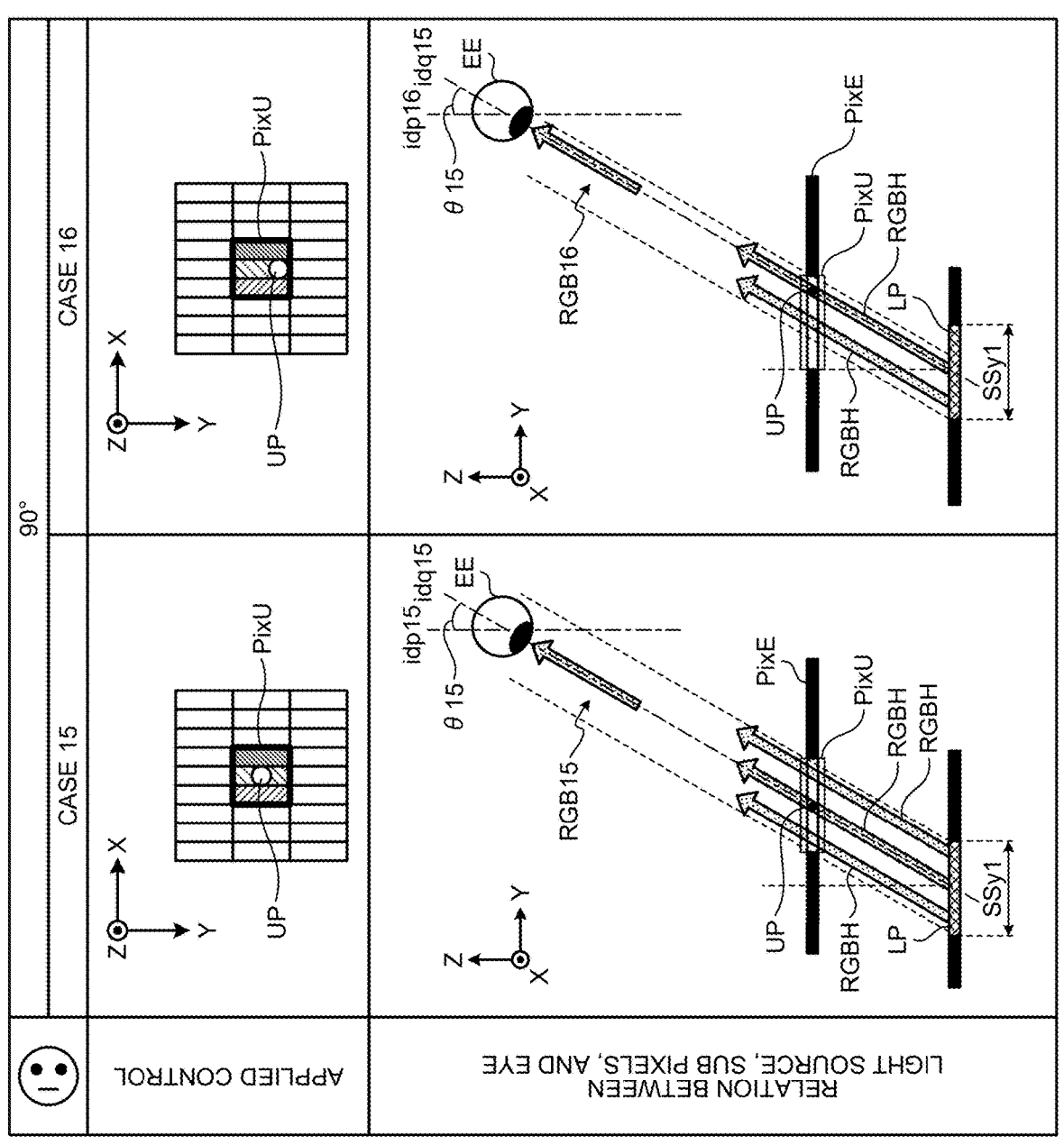
FIG. 33 is a schematic view illustrating the positional relation between a light emission point, a pixel, and a viewpoint in the Y direction under a condition that the sub-pixel control pattern described above with reference to FIG. 16 and other diagrams is not applied.

FIG. 33 is a schematic view illustrating the positional relation between a light emission point LP, a pixel PixU, and the viewpoint EE in the Y direction under a condition that the sub-pixel control pattern described above with reference to FIG. 16 and other diagrams is not applied. The upper row of "Case 15" in FIG. 33 illustrates a case in which the position of the pass-through point UP in the pixel PixU is at the center in the Y direction. Thus, as illustrated in the lower row, light from substantially the entire region of the light emission point LP in the Y direction can pass through the pixel PixU and reach the viewpoint EE positioned at a position idp15.

However, in "Case 16" illustrated in FIG. 33, as illustrated in the upper row, the position of the pass-through point UP in the pixel PixU is on the one end side in the Y direction. Thus, as illustrated in the lower row, light from the vicinity of the one end side of the light emission point LP to the viewpoint EE positioned at a position idp16 cannot pass through the pixel PixU. Thus, in "Case 16", light from the light emission point LP is insufficient near the other end side of the pixel PixU, and display output is darker than in "Case 15". In other words, light RGB16 in "Case 16" is darker than light RGB15 in "Case 15".

In both "Case 15" and "Case 16", the angle of a ray line idg15 of light passing through the viewpoint EE and the pass-through point UP with respect to the Z direction is an angle $\theta$15. FIG. 33 exemplarily illustrates a case where the Y-directional width of one light emission point LP is the width SSy1. Thus, in a case where the Y-directional width of one light emission point LP is the width SSy1 under a condition that the sub-pixel control pattern described above with reference to FIG. 16 and other diagrams is not applied, brightness may differ depending on the Y-directional position of the pass-through point UP in the pixel PixU.

Thus, the Y-directional width of one light emission point LP is set to a width larger than the width SSy1 so that it becomes easier to make brightness more uniform irrespective of the Y-directional position of the pass-through point UP in the pixel PixU.

Figure 34:
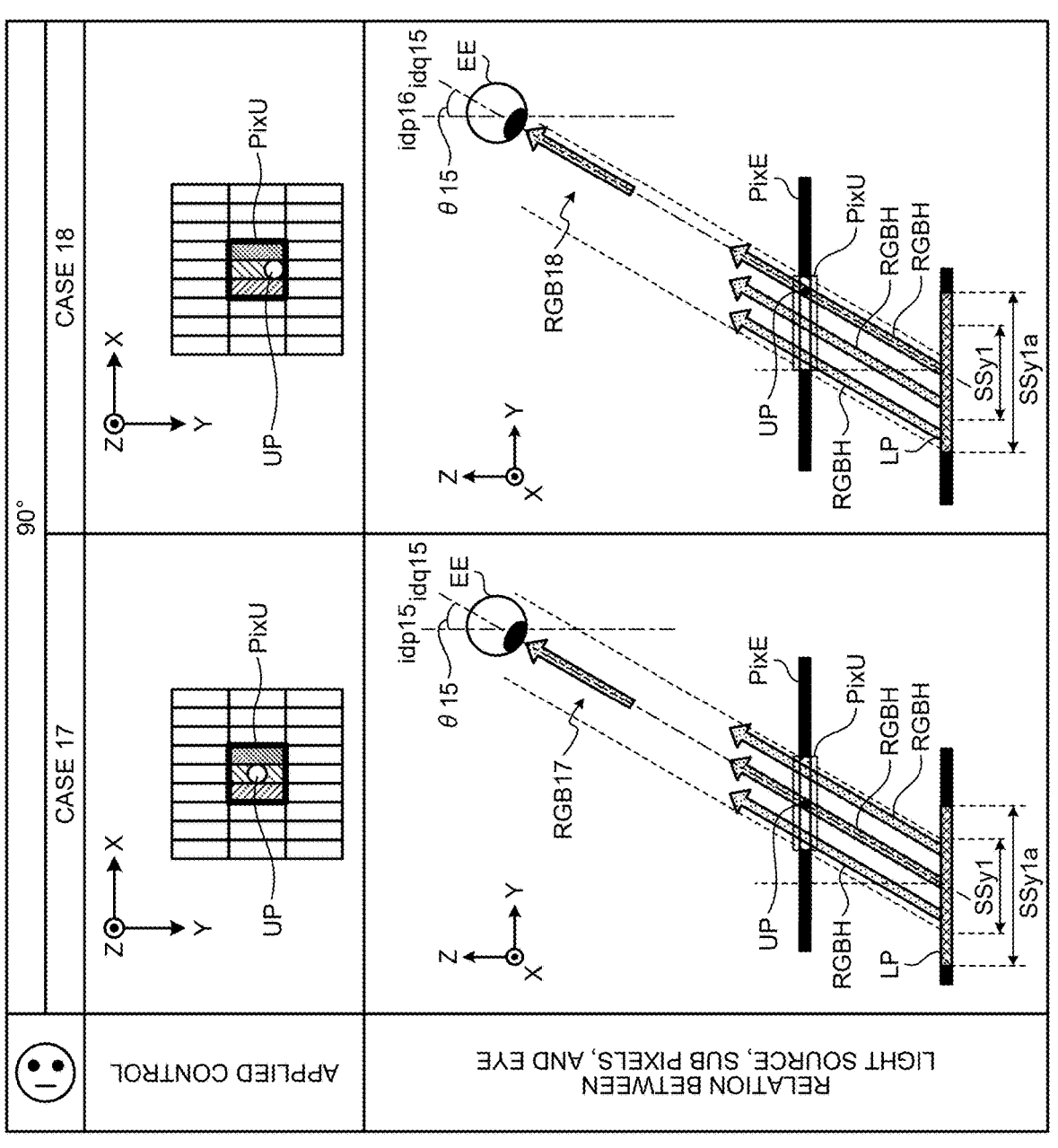

FIG. 34 is a schematic view illustrating the positional relation between a light emission point LP, a pixel PixU, and the viewpoint EE in a case where the Y-directional width of one light emission point LP is the width SSy1a. "Case 17" illustrated in FIG. 34 corresponds to a case where the Y-directional width of the light emission point LP in "Case 15" described above with reference to FIG. 33 is changed to the width SSy1a. "Case 18" corresponds to a case where the Y-directional width of the light emission point LP in "Case 16" described above with reference to FIG. 33 is changed to the width SSy1a.

As illustrated in FIG. 34, since the Y-directional width of the light emission point LP is the width SSy1a, light from the light emission point LP can pass through the entire region of the pixel PixU and reach the viewpoint EE irrespective of the Y-directional position of the pass-through point UP. In other words, light RGB17 in "Case 17" has substantially the same brightness as light RGB18 in "Case 18".

Figure 35:
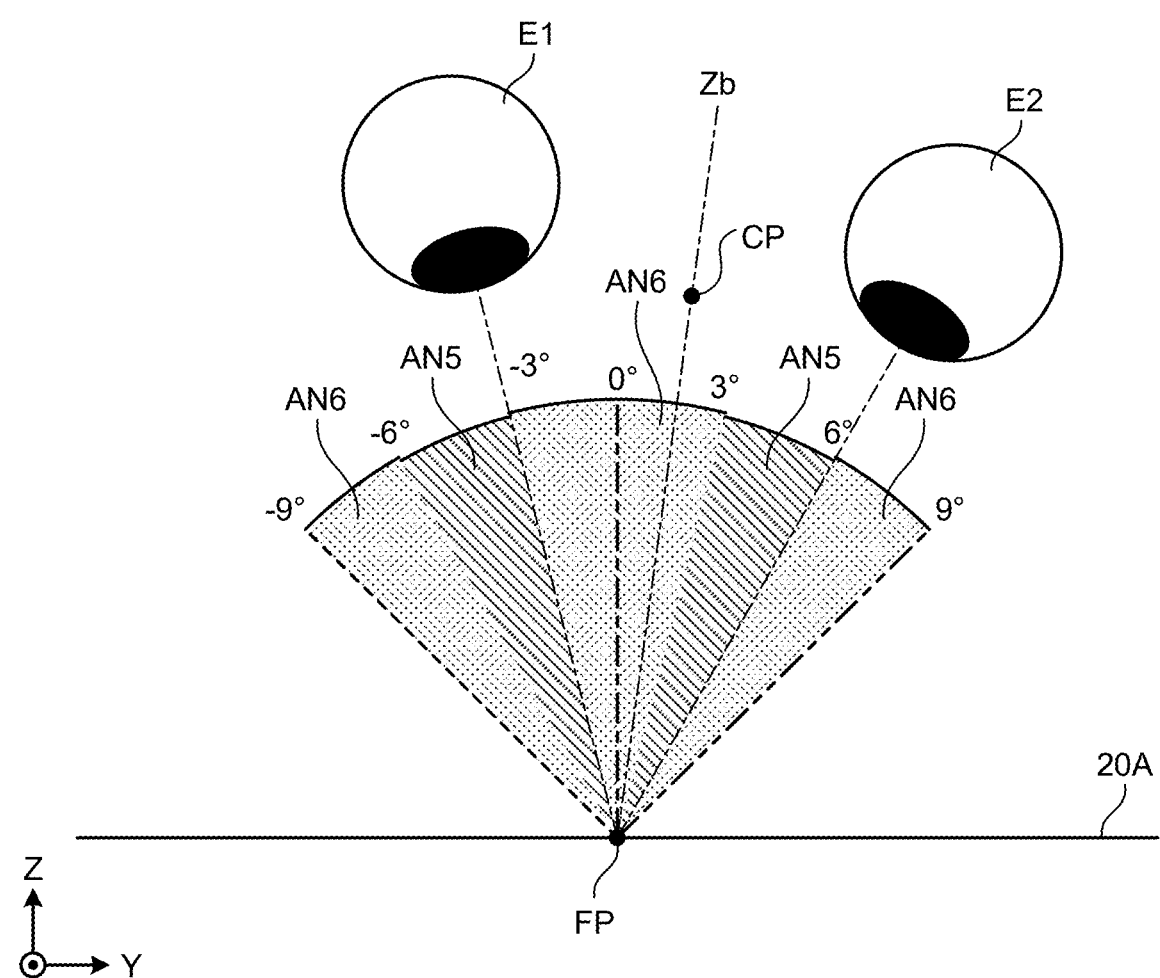
FIG. 35 is a schematic view illustrating an example of the relation between the display panel and two viewpoints and the angle of view at each of the viewpoints E1 and E2.

FIG. 35 is a schematic view illustrating an example of the relation between the display panel 20A and the two viewpoints E1 and E2 and the angle of view at each of the viewpoints E1 and E2. In the example illustrated in FIG. 35, the viewpoints E1 and E2 are symmetrically positioned in the Y direction with respect to the axis line Zb passing through the middle point CP and the focus target FP. In the example illustrated in FIG. 35, the line of sight from the viewpoint E1 to the focus target FP is tilted by −1.5 degrees (°) relative to the axis line Zb. The line of sight from the viewpoint E2 to the focus target FP is tilted by 4.5 degrees (°) relative to the axis line Zb.

In the example illustrated in FIG. 35, a range AN5 of −3 degrees (°) with respect to a line of sight as a center is indicated as a range in which brightness decrease does not occur. A range AN6 of ±3 degrees (°) with respect to the range AN5 is indicated as a range in which brightness decrease occurs but images for viewpoints can be visually recognized. Such ranges AN5 and AN6 correspond to, for example, a case where the Y-directional width of the light emission point LP is the width SSy2 (refer to FIG. 36).

Figure 36:
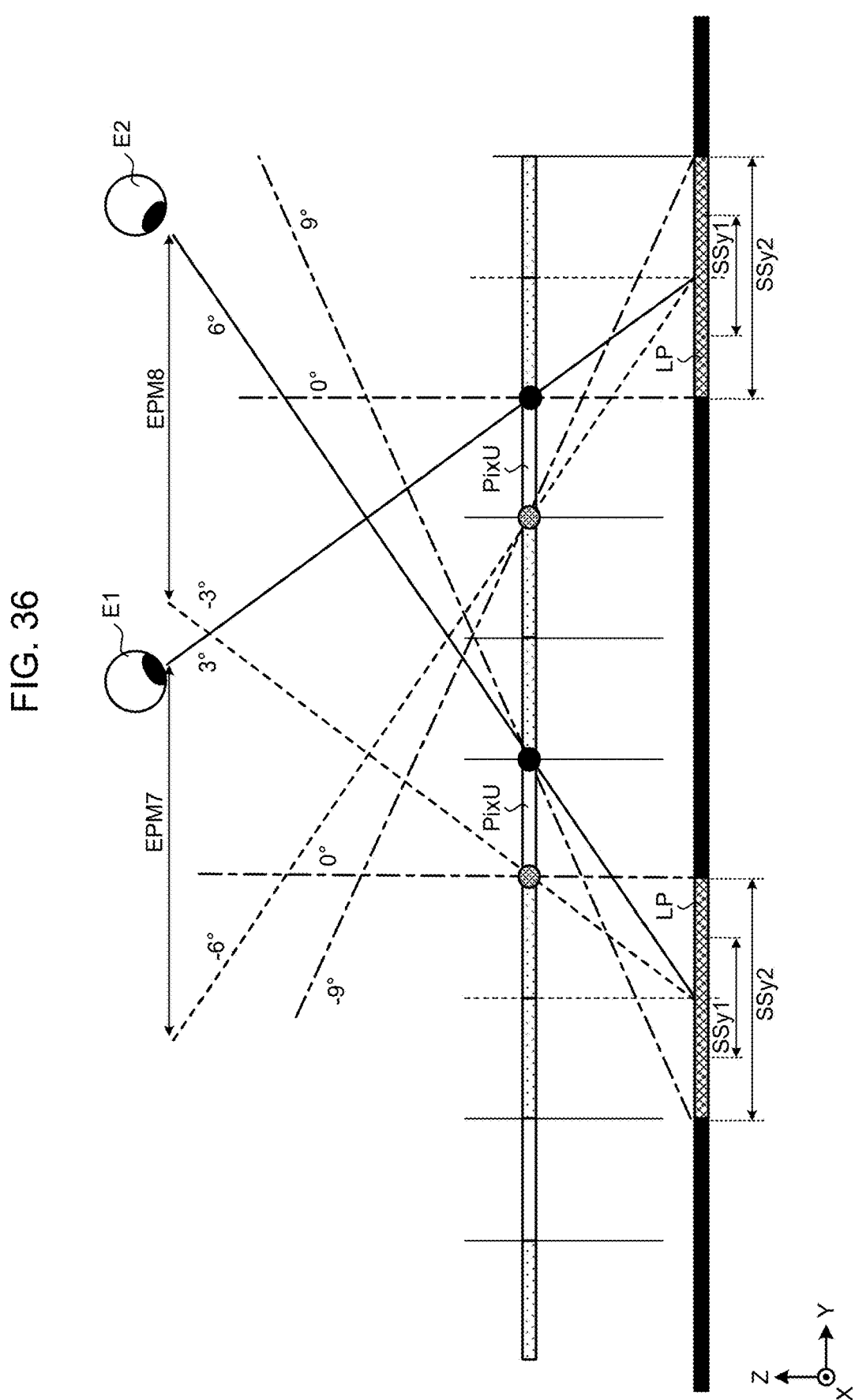
FIG. 36 is a schematic view illustrating an example of the relation between the angle of view and the path of light in a case where the width of one light emission point in the Y direction is the width SSy2.

FIG. 36 is a schematic view illustrating an example of the relation between the angle of view and the path of light in a case where the Y-directional width of the light emission point LP is the width SSy2. With the configuration illustrated in FIG. 36, it is possible to ensure a region corresponding to two pixels Pix as an irradiation area of light from the light emission point LP for one PixU pixel. Thus, with the configuration illustrated in FIG. 36, it is possible to ensure a margin of a width EPM7 on one side as an image visible region in which brightness can be ensured for the viewpoint E1. It is possible to ensure a margin of a width EPM8 on one side as an image visible region in which brightness can be ensured for the viewpoint E2. The range AN5 illustrated in FIG. 35 is a range corresponding to these cases.

The images for viewpoints can be output even in a region in which light from the vicinity of an end part of the light emission point LP on the one side passes through the other side pixel of two adjacent pixels PixV, and a region in which light from the vicinity of an end part of the light emission point LP on the other side passes through the one side pixel of the two adjacent pixels PixV, although brightness decrease occurs. The range AN6 illustrated in FIG. 35 is a range corresponding to these cases.

The above description with reference to FIGS. 32 to 36 is made on matters related to the Y direction in the relation between the width of the light emission point LP and display output in a case where the sub-pixel control described above with reference to FIG. 17 is not applied. The following describes, with reference to FIGS. 37 to 40, matters related to the X direction in the relation between the width of the light emission point LP and display output in a case where the sub-pixel control described above with reference to FIG. 17 is not applied.

Figure 37:
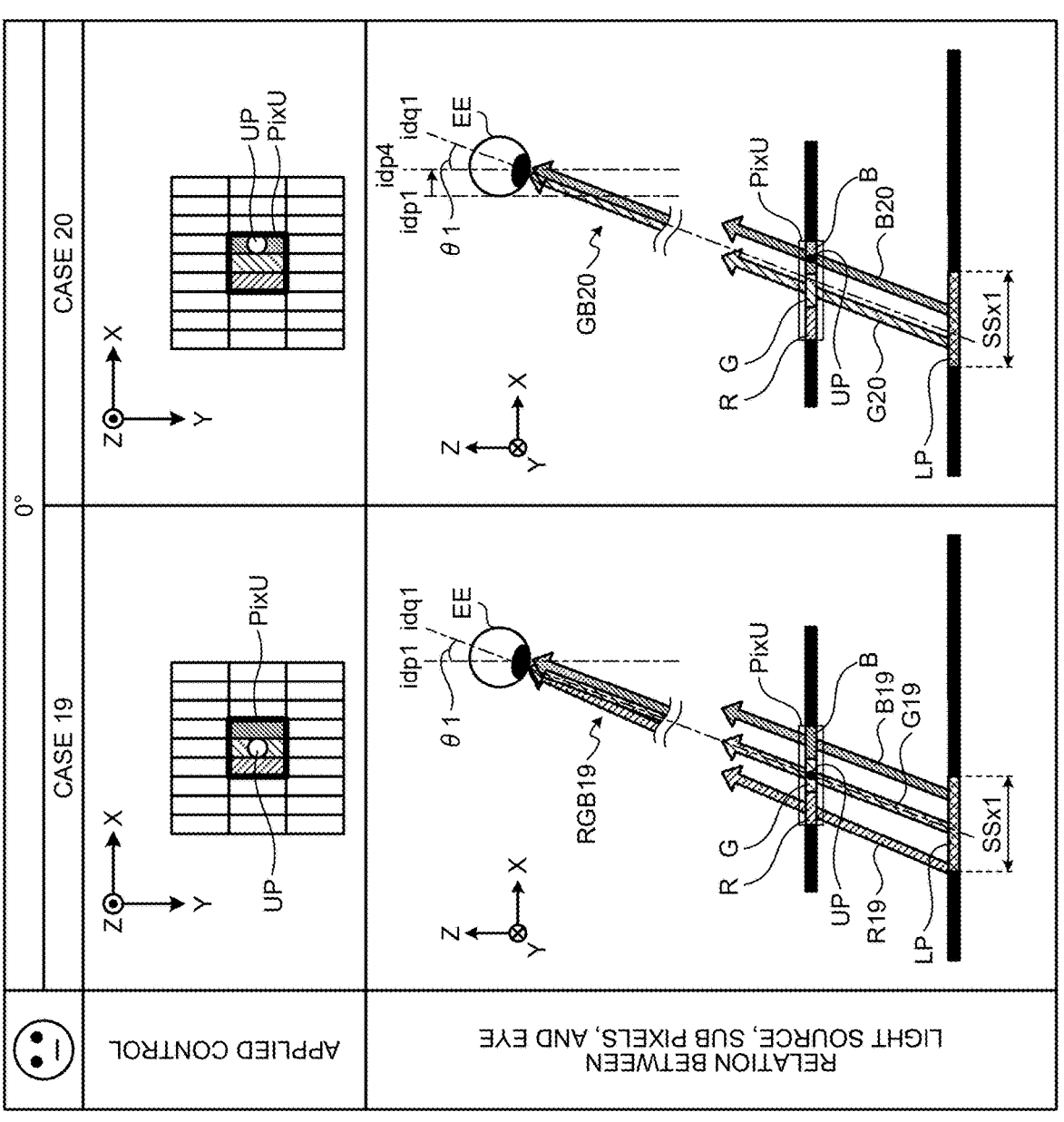
FIG. 37 is a schematic view illustrating the positional relation between a light emission point, a pixel, and a viewpoint in the X direction under a condition that the sub-pixel control pattern described above with reference to FIG. 16 and other diagrams is not applied.

FIG. 37 is a schematic view illustrating the positional relation between a light emission point LP, a pixel PixU, and the viewpoint EE in the X-direction under a condition that the sub-pixel control pattern described above with reference to FIG. 16 and other diagrams is not applied. The upper row of "Case 19" in FIG. 37 illustrates a case in which the position of the pass-through point UP in the pixel PixU is at the center in the X direction. Thus, as illustrated in the lower row, light from substantially the entire region of the light emission point LP in the X direction can pass through the pixel PixU and reach the viewpoint EE positioned at the position idp1.

However, in "Case 20" illustrated in FIG. 37, as illustrated in the upper row, the position of the pass-through point UP in the pixel PixU is on the one end side in the X direction. Thus, as illustrated in the lower row, light from the vicinity of the one end side of the light emission point LP to the viewpoint EE positioned at the position idp4 cannot pass through the pixel PixU. Thus, in "Case 20", light from the light emission point LP is insufficient near the other end side of the pixel PixU, and display output is darker than in "Case 19". In other words, light GB20 in "Case 20" is darker than light RGB19 in "Case 19".

In the embodiment, the first sub pixel R, the second sub pixel G, and the third sub pixel B are arranged in the X direction. Thus, from the perspective of reducing color unevenness, it is important whether the irradiation area of light from the light emission point LP can cover the first sub pixel R, the second sub pixel G, and the third sub pixel B. In "Case 20", since light from the light emission point LP is insufficient near the other end side of the pixel PixU, light passing through the first sub pixel R is not generated. Thus, light GB20 in "Case 20" includes light G20 and light B20 but does not include light passing through the first sub pixel R. Thus, in "Case 20", color unevenness occurs.

In both "Case 19" and "Case 20", the angle of the ray line idq1 of light passing through the viewpoint EE and the pass-through point UP with respect to the Z direction is the angle θ1. FIG. 37 exemplarily illustrates a case where the X-directional width SS of one light emission point LP is the width SSx1. Thus, in a case where the X-directional width of one light emission point LP is the width SSx1 under a condition that the sub-pixel control pattern described above with reference to FIG. 16 and other diagrams is not applied, display quality may differ depending on the X-directional position of the pass-through point UP in the pixel PixU. The display quality is brightness and existence of color unevenness.

Thus, the X-directional width SS of one light emission point LP is set to a width larger than the width SSx1 so that it becomes easier to make display quality more uniform irrespective of the X-directional position of the pass-through point UP in the pixel PixU.

Figure 38:
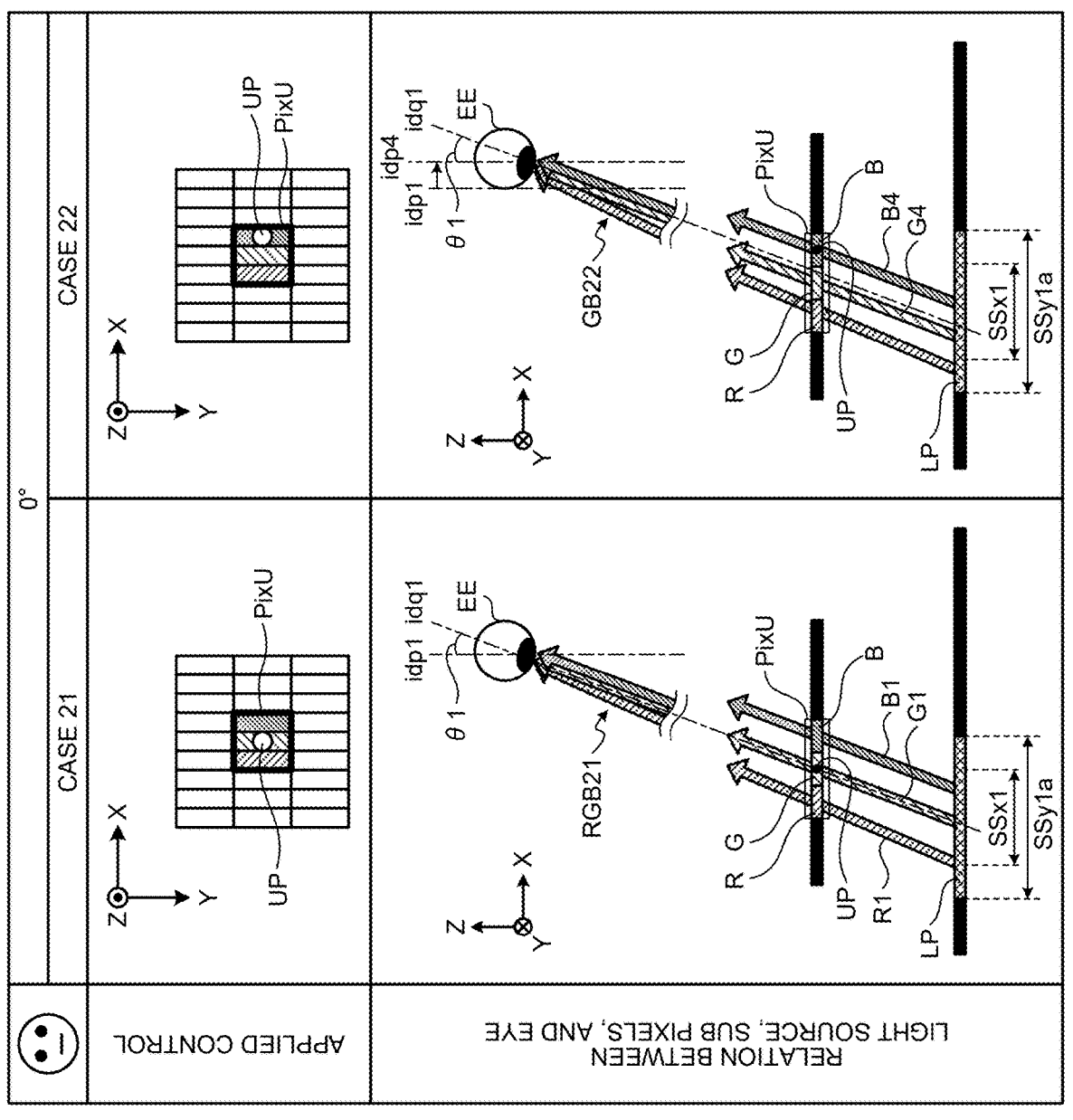

FIG. 38 is a schematic view illustrating the positional relation between a light emission point LP, a pixel PixU, and the viewpoint EE in a case where the X-directional width of one light emission point LP is the width SSx1*a*. "Case 21" illustrated in FIG. 38 corresponds to a case where the X-directional width of the light emission point LP in "Case 19" described above with reference to FIG. 37 is changed to the width SSx1*a*. "Case 22" corresponds to a case where the X-directional width of the light emission point LP in "Case 20" described above with reference to FIG. 37 is changed to the width SSx1*a*.

As illustrated in FIG. 38, since the Y-directional width of the light emission point LP is the width SSy1*a*, light from the light emission point LP can pass through the entire region of the pixel PixU and reach the viewpoint EE irrespective of the Y-directional position of the pass-through point UP. In other words, light RGB22 in "Case 22" and light RGB19 in "Case 19" have substantially the same brightness. Light RGB22 includes light R22, light G22, and light B22.

Figure 39:
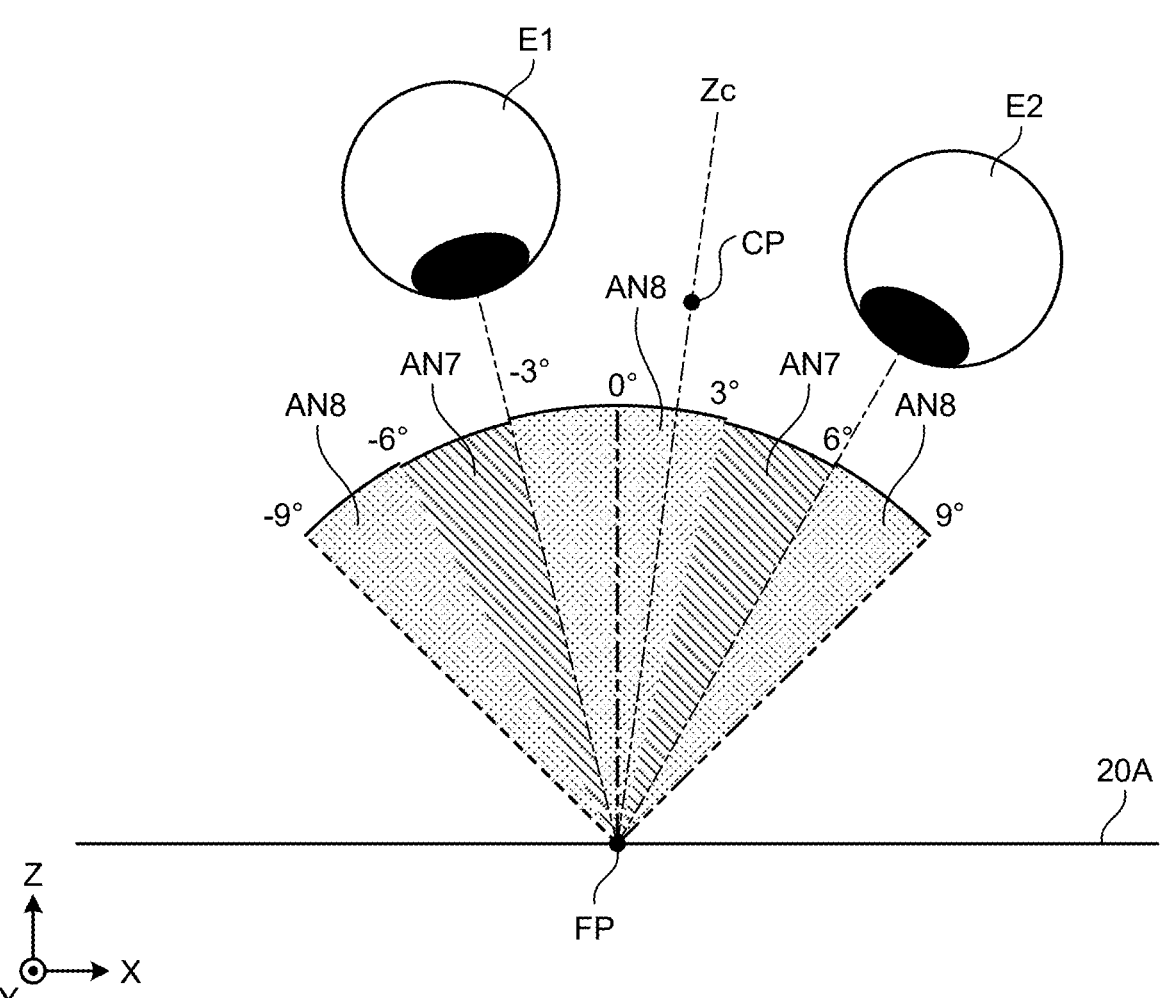
FIG. 39 is a schematic view illustrating an example of the relation between the display panel and two viewpoints and the angle of view at each of the viewpoints E1 and E2.

FIG. 39 is a schematic view illustrating an example of the relation between the display panel 20A and the two viewpoints E1 and E2 and the angle of view at each of the viewpoints E1 and E2. In the example illustrated in FIG. 39, the viewpoints E1 and E2 are symmetrically positioned in the X direction with respect to an axis line Zc passing through the middle point CP and the focus target FP. The axis line Zc is tilted by 1.5° on the viewpoint E2 side with respect to the Z direction. The viewpoint E1 side of the axis line Zc is referred to as one side (negative (−) side) in the X direction. The viewpoint E2 side of the axis line Zc is referred to as the other side (positive (+) side) in the X direction. In the example illustrated in FIG. 39, the line of sight from the viewpoint E1 to the focus target FP is tilted by −1.5 degrees (°) relative to the axis line Zb. The line of sight from the viewpoint E2 to the focus target FP is tilted by 4.5 degrees (°) relative to the axis line Zb.

In the example illustrated in FIG. 39, a range AN7 of −3 degrees (°) with respect to a line of sight as a center is indicated as a range in which brightness decrease does not occur. A range AN8 of ±3 degrees (°) on each side of the range AN7 is indicated as a range in which color unevenness occurs but images for viewpoints can be visually recognized. Such ranges AN7 and AN8 correspond to, for example, a case where the X-directional width SS of the light emission point LP is the width SSx2 (refer to FIG. 40).

Figure 40:
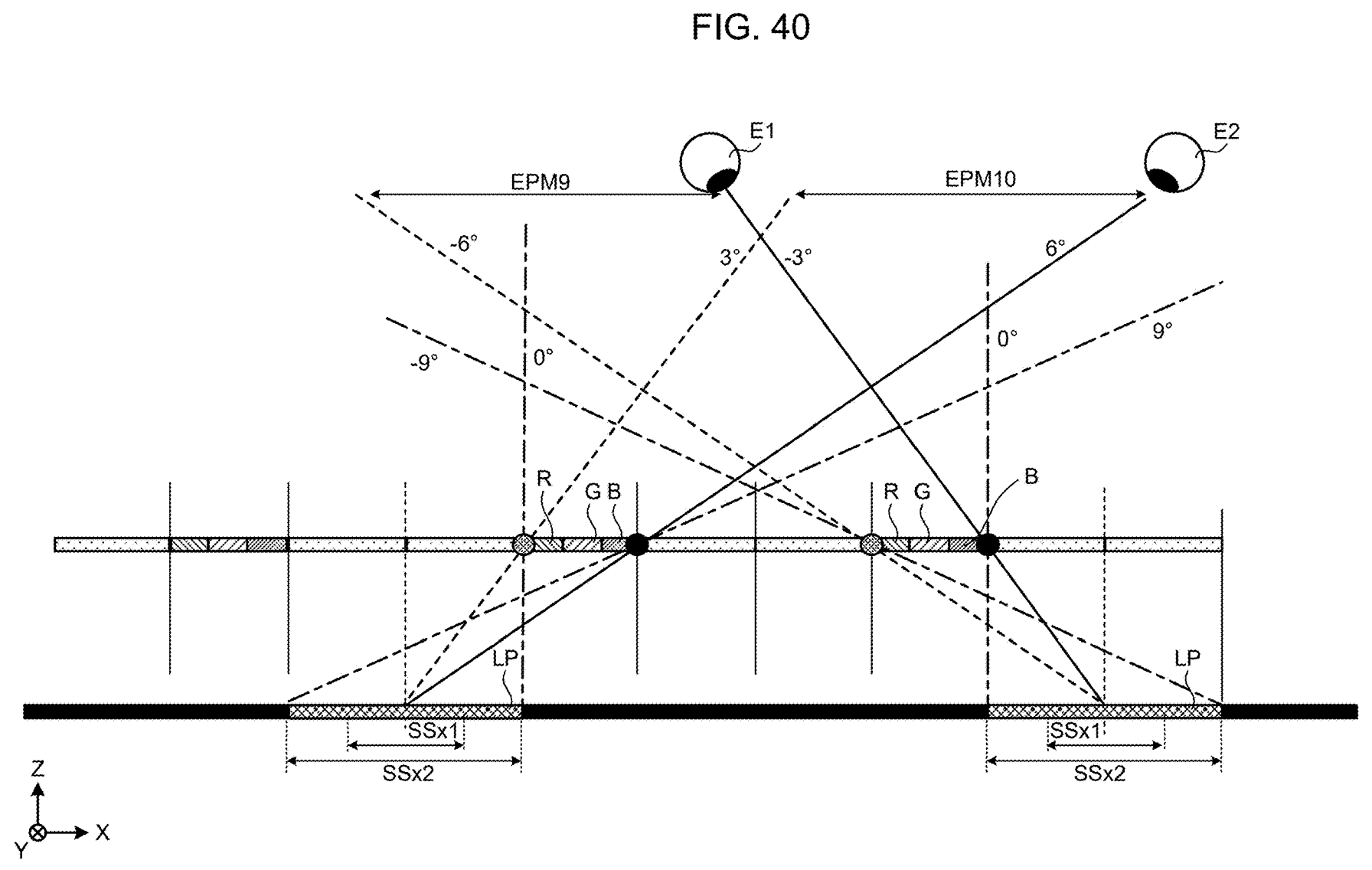

FIG. 40 is a schematic view illustrating an example of the relation between the angle of view and the path of light in a case where the X-directional width SS of the light emission point LP is the width SSx2. With the configuration illustrated in FIG. 40, it is possible to ensure a region corresponding to two pixels Pix as an irradiation area of light from the light emission point LP for one pixel PixU. Thus, with the configuration illustrated in FIG. 40, it is possible to ensure a margin of a width EPM9 on one side as an image visible region in which brightness can be ensured for the viewpoint E1. It is possible to ensure a margin of a width EPM10 on one side as an image visible region in which brightness can be ensured for the viewpoint E2. The range AN7 illustrated in FIG. 39 is a range corresponding to these cases.

The images for viewpoints can be output even in a region in which light from the vicinity of an end part of the light emission point LP on the one side passes through the other side pixel of two adjacent pixels PixV, and a region in which light from the vicinity of an end part of the light emission point LP on the other side passes through the one side pixel of the two adjacent pixels PixV, although color unevenness occurs. The range AN8 illustrated in FIG. 39 is a range corresponding to these cases.

The X-directional width SS of the light emission point LP corresponds to a pixel width PPx (refer to FIG. 21). The Y-directional width of the light emission point LP corresponds to a pixel width PPy (refer to FIG. 29). The following describes the correspondence relation between the pixel width PPx and the pixel width PPy with reference to FIGS. 41 and 42.

Figure 41:
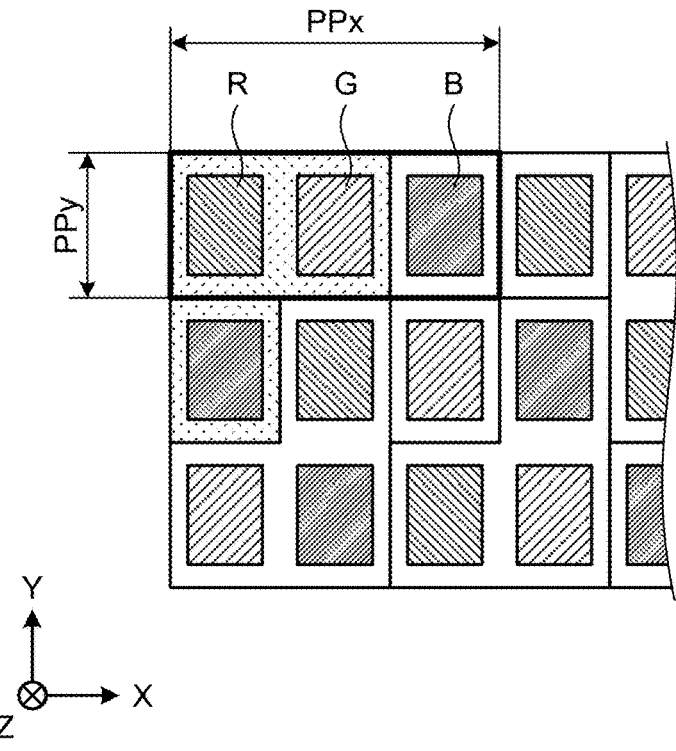
FIG. 41 is a schematic view illustrating an example of comparison of a pixel width PPx and a pixel width PPy and an arrangement of sub pixels.
Figure 42:
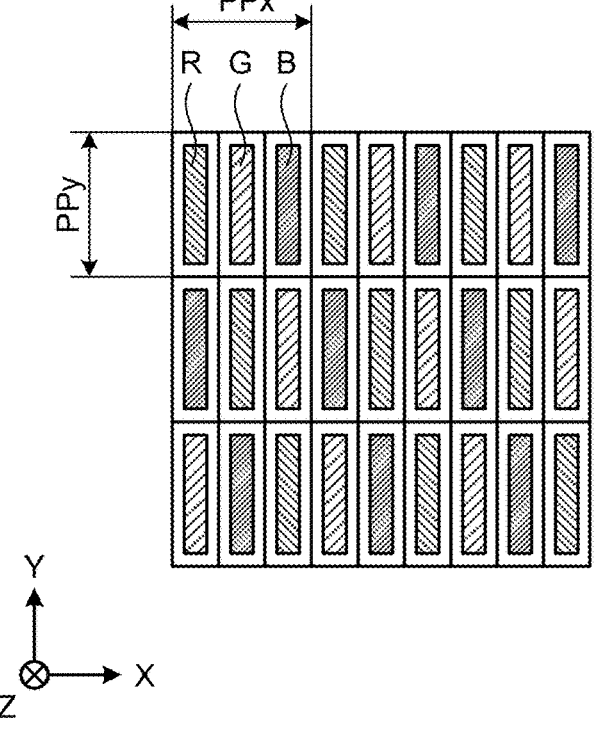
FIG. 42 is a schematic view illustrating an example of comparison of the pixel width PPx and the pixel width PPy and an arrangement of the sub pixels.

FIGS. 41 and 42 are schematic views each illustrating an example of comparison between the pixel width PPx and the pixel width PPy and an arrangement of sub pixels. The pixel width PPx is desirably equal to or larger than the pixel width PPy. For example, the pixel width PPx may exceed the pixel width PPy as illustrated in FIG. 41, or the pixel width PPx and the pixel width PPy may be equivalent to each other as illustrated in FIG. 42.

As illustrated in FIGS. 41 and 42, sub pixels of different colors may be adjacent to each other in the Y direction. In a case where sub pixels of different colors are adjacent to each other in the Y direction, one of the first sub pixel R, the second sub pixel G, and the third sub pixel B is interposed between the other two facing each other in the Y direction. As described above with reference to FIG. 16, sub pixels of the same color may be arranged in the Y direction.

In the above description with reference to FIGS. 21 to 40, matters related to the X direction and matters related to the Y direction are individually described, but in the embodiment, both technological characteristics related to the X direction and technological characteristics related to the Y direction may be included. The following describes, with reference to FIG. 43, an exemplary form of the light emission point LP in a case where both technological characteristics related to the X direction and technological characteristics related to the Y direction are included.

FIG. 43 is a schematic view illustrating an example of an arrangement and a size of the light emission points LP at the plan view point. The arrangement and the size of light emission points LP11 illustrated in FIG. 43 are the same as those of the light emission points LP described above with reference to FIGS. 18 and 19. Specifically, the light emission point LP11 is a light source formed in a quadrilateral shape with sides in the X and Y directions having lengths equivalent to one pixel Pix. Specifically, the width SS of the light emission point LP11 in the X direction is the width SSx1, and the width thereof in the Y direction is the width SSy1.

A light emission point LP22 illustrated in FIG. 43 is larger than the light emission point LP11. Specifically, the light emission point LP22 is a light source in a quadrilateral shape with sides in the X and Y directions having lengths equivalent to two pixels Pix. Specifically, the width SS of the light emission point LP22 in the X direction is the width SSx2, and the width thereof in the Y direction is the width SSy2. In terms of the center point of a light source in the X and Y directions, the arrangement of the light emission points LP22 is the same as that of the light emission points LP11.

FIG. 43 exemplarily illustrates an example (light emission point LP11) in which the width SS in the X direction is the width SSx1 and the width in the Y direction is the width SSy1, and an example (light emission point LP22) in which the width SS in the X direction is the width SSx2 and the width in the Y direction is the width SSy2, but combination of the width SS in the X direction and the width in the Y direction is freely set. For example, the width SS in the X direction may be the width SSx3 and the width in the Y direction may be the width SSy2, at least one of other combinations of the width SS in the X direction and the width in the Y direction exemplarily illustrated with reference to FIGS. 21 to 42 may be employed, or at least one of combinations of the width SS in the X direction and the width in the Y direction not exemplarily illustrated in FIGS. 21 to 42 may be employed.

However, the lengths of sides of a light emission point LP in the X and Y directions at the plan view point are both desirably equivalent to one pixel Pix or more. The length of sides of a light emission point LP in the X direction at the plan view point is desirably equivalent to three pixels Pix or less. The length of sides of a light emission point LP in the Y direction at the plan view point is desirably equivalent to two pixels Pix or less.

Figure 44:
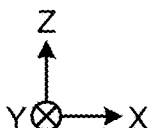
FIG. 44 is a schematic diagram illustrating a distance Th determined such that the ratio of the value of a distance D1 to the summed value of a distance Ph and the distance Th is equal to the ratio of the value of the distance Th to the value of a distance D.

The following describes a concept for determining the distance Th at designing of the display device with reference to FIG. 44.

FIG. 44 is a schematic diagram illustrating the distance Th determined such that the ratio of the value of the distance D1 to the summed value of the distance Ph and the distance Th is equal to the ratio of the value of the distance Th to the value of a distance D. The distance D in FIG. 44 is the distance between the intersection position of the center line of a pixel Pix in the Z direction and a ray line LQ and the middle point CP in the X direction. The ray line LQ is the ray line of light reaching a viewpoint (for example, second the viewpoint E2) at the distance D1 in the X direction relative to the middle point CP at a position separated by the distance Ph in the Z direction from the pixel Pix, and is the ray line of light emitted from a light emission point LP (for example, light emission point 32) at a position facing the middle point CP in the Z direction. A straight line connecting the center of the light emission point at the starting point of the ray line LQ and the middle point CP is parallel to the Z direction (orthogonal to XY plane). In such FIG. 44, Expression (25) representing a ratio below is satisfied. In Expression (25), D is the value of the distance D.

$$(Th + Ph)\!:\! D1 = Th\!:\! D \tag{25}$$

Expression (26) below is satisfied based on Expression (25) described above.

$$D \times (Th + Ph) = D1 \times Th \tag{26}$$

Expression (27) below is satisfied based on Expression (26) described above.

$$(D1 - D) \times Th = D \times Ph \tag{27}$$

Expression (28) below is satisfied based on Expression (27) described above. As in Expression (28), the value of the distance Th can be derived based on the value (pos_h) of the distance Ph, the value of the distance D1, and the value of the distance D.

$$Th = \mathrm{ph} \times D/(D1 - D) \tag{28}$$

The value of the distance Ph may be the value of a distance typically assumed as the distance between the display device 1 and the user viewing images on the display device 1. For example, in a case where the display device 1 is provided on a portable terminal device such as a smartphone, the distance Ph is assumed to be, for example, 30 cm (300 mm). The value of the distance D1 may be ½ of the average value of the distance (distance D2) between the eyes of a human. As a specific example, D2=62.5 mm, in other words, D1=31.25 mm is assumed. However, the value of the distance Ph and the value of the distance D1 are merely exemplary and not limited thereto, and may be changed as appropriate.

An assumed value can be derived for the value of the distance D in accordance with the relation between the pitch (for example, light emission point pitch SpP or light emission point pitch SpP2) between light emission points LP and the pixel pitch PP. For example, in a case where the relation between the pitch between light emission points LP and the pitch between pixels Pix is 6n:1, the distance D is assumed to be approximately 1.5n times the pixel pitch PP {D=(1.5n)PP} as illustrated in FIG. 44. In a case where the relation between the pitch between light emission points LP and the pitch between pixels Pix is 4n:1, the distance D is assumed to be equivalent to the pixel pitch PP (D=nPP). Thus, the distance Th can be derived based on the value of the distance Ph and the value of the distance D1 assumed as described above, the relation between the pitch between light emission points LP and the pitch between pixels Pix, and the pixel pitch PP. By adjusting the Z-directional thicknesses of components included in the spacer 40 in accordance with the distance Th derived in this manner, it is possible to obtain the display panel 20 in accordance with the distance Th corresponding to assumed conditions. In the case of the display panel 20A as well, the distance D and the distance Th can be derived with a similar approach. Depending on actual use situations and individual difference among users, the distance Ph and the distance D1 may be somewhat different from their above-described values defined in designing, but a display device manufactured based on the above-described designs has redundancy to accommodate such differences during use.

Derivation of the value of the distance Th based on Expression (28) does not consider light refraction that occurs at the interface between the display panel 20 and air interposed between the display panel 20 and the user. Thus, the distance Th can be determined based on further consideration of influence of the refraction on the ray line of light, thereby reducing crosstalk with higher accuracy.

According to the embodiment, the display device 1 includes: a liquid crystal display panel (for example, display panel 20 or display panel 20A) provided with a plurality of pixels (for example, pixels Pix); and a light source (for example, light source 30) provided with a plurality of light emission points (light emission points LP; light emission points 32 as a specific example) and configured to emit light to the pixels of the liquid crystal display panel. The ratio of the pitch between the pixels arranged in a first direction (for example, X direction) to the pitch between the light emission points arranged in the first direction is 1:4n or 1:6n (for example, 1:6), n is a natural number, and the width of each light emission point in the first direction is larger than the width of each pixel in the first direction. Thus, as compared to a case where the width of each light emission point in the first direction is equal to or smaller than the width of each pixel in the first direction, it is more likely that images with sufficient brightness are visually recognized by the user even when positional displacement has occurred in the first direction. Thus, according to the embodiment, it is more likely to reduce display quality degradation.

The pixels (for example, pixels Pix) are arranged in a matrix having a row-column configuration in the first direction (for example, X direction) and a second direction (for example, Y direction) orthogonal to the first direction, the ratio of the pitch between the pixels arranged in the second direction to the pitch between the light emission points (light emission points LP; light emission points 32 as a specific example) arranged in the second direction is 1:4n or 1:6n (for example, 1:6), and the width of each light emission point in the second direction is larger than the width of each pixel in the second direction, and accordingly, it is likely that images with sufficient brightness are visually recognized by the user even when positional displacement has occurred in the second direction. Thus, according to the embodiment, it is more likely to reduce display quality degradation.

Each pixel (for example, pixel Pix) includes a plurality of sub pixels (for example, first sub pixel R, second sub pixel G, and third sub pixel B) arranged in the first direction (for example, X direction). In this pixel configuration, the width of each light emission point in the first direction is larger than the width of each pixel in the first direction, and accordingly, color unevenness is less likely to occur even when positional displacement has occurred in the first direction. Thus, according to the embodiment, it is more likely to reduce display quality degradation.

Furthermore, the display device 1 includes: a liquid crystal display panel (for example, display panel 20 or display panel 20A) provided with a plurality of pixels (for example, pixels Pix); a light source (for example, light source 30) provided with a plurality of light emission points (light emission points LP; light emission points 32 as a specific example) and configured to emit light to the pixels of the liquid crystal display panel; an acquirer (for example, the image capturer 2, the distance measurer 3, the gyro sensor 4, and the sight line following circuit 11) configured to acquire viewpoint information of a user viewing the liquid crystal display panel; and a controller (for example, image output circuit 12) configured to control image display through operation of the pixels based on the viewpoint information. The viewpoint information includes information (for example, pos_x, pos_y, pos_h) related to the positions of a plurality of viewpoints (for example, first viewpoint E1 and second viewpoint E2, or first viewpoint EC and second viewpoint ED) and information (relative angle rot) indicating the arrangement direction of the viewpoints. The controller drives display of at least some or all of pixels (pixels Pix enclosing the pass-through point UP) positioned on straight lines connecting the light emission points and the viewpoints based on the angle (relative angle rot) between a predetermined direction (for example, X direction) of the liquid crystal display panel and the arrangement direction and the positional relation between each viewpoint and each light emission point, thereby transmitting light. The ratio of the pitch between the pixels arranged in the predetermined direction to the pitch between the light emission points arranged in the predetermined direction is 1:4n or 1:6n (for example, 1:6), and n is a natural number.

This configuration makes display of the pixels conform to the angle between the predetermined direction of the liquid crystal display panel and the arrangement direction and the positional relation between each viewpoint and each light emission point. Even when the angle is not zero, in other words, the arrangement direction of the viewpoints of the user (two viewpoints of the right and left eyes) does not correspond to the lateral direction (for example, X direction) of the liquid crystal display panel expected in advance, it is possible to achieve display output of individual images to the viewpoints. Thus, according to the embodiment, it is possible to make the display output more flexibly conform to the relation between the arrangement direction of a plurality of viewpoints and the display device 1.

Each pixel (for example, pixel Pix) includes a plurality of sub pixels, and the controller (for example, image output circuit 12) drives display of some or all of sub pixels positioned on the straight lines connecting the light emission points and the viewpoints and some or all of other sub pixels adjacent to the sub pixel on the straight lines. Thus, display output corresponding to the position can be achieved on a sub pixel basis. Thus, it is possible to more finely perform display output corresponding to viewpoint positions than in the case where it is performed on a pixel basis.

The controller (for example, the image output circuit 12) causes, among sub pixels included in a pixel adjacent to a pixel including a sub pixel at a position (position of the passing point UP) intersecting with an optical axis between the viewpoint and the light emission point, a sub pixel disposed closer to an intersection point with the optical axis between the viewpoint and the light emission point to transmit light therethrough. Thus, it is possible to perform display output more highly accurately corresponding to the position.

The acquirer includes an image capturer (for example, image capturer 2) configured to capture an image of the user, and a processor (for example, sight line following circuit 11) configured to identify the arrangement direction of the right and left eyes, the relative rotation angle between the liquid crystal display panel and the arrangement direction, and the positional relation for the right and left eyes of the user based on the captured image of the user. Thus, the viewpoint information of the user can be acquired from the captured image of the user.

The acquirer includes a distance measurer (for example, distance measurer 3) configured to measure the distance between the liquid crystal display panel (for example, display panel 20 or display panel 20A) and the user. Thus, the distance between the liquid crystal panel and the user can be included in the viewpoint information of the user. Thus, it is possible to perform display output more highly accurately corresponding to the viewpoint position.

The controller (for example, image output circuit 12) changes pixels (for example, pixels Pix) to be subjected to drive display in accordance with the liquid crystal display panel (for example, display panel 20 or display panel 20A) and the arrangement direction of the right and left eyes of the user, which is obtained by the processor (for example, sight line following circuit 11). As a result of the "change", for example, different display aspects are obtained between a case where the relative angle rot is 45 degrees (°) and a case where the relative angle rot is an angle (for example, 90 degrees (°)) different from 45°.

The above-described configuration of the display device 1 is merely an example of the embodiment and the present disclosure is not limited thereto. For example, point light source may be provided at the position of each light emission point LP. In other words, a specific configuration of each light emission point LP may be a point light source. The point light source is, for example, a minute LED called mini LED or micro LED but not limited thereto, and may be a point light source achieved by another light-emitting element (for example, an organic light emitting diode (OLED)) or the like. In a case where the point light source is provided at the position of each light emission point LP, the light source 30 has, for example, a configuration including a plurality of point light sources and a substrate on which the point light sources are mounted.

Drawings referred in the above description illustrate examples the relative angle rot is 0 degrees (°), 45 degrees (°), and 90 degrees (°), but the relative angle rot is not limited to these angles and may be any angle in the range of −180 degrees (°) to 180 degrees (°) in accordance with the relation between the display panel 20A and the face HF.

Description with reference to FIGS. 8 to 44 is made on an example in which the correspondence relation between the pitch between pixels Pix and the pitch between light emission points LP is 1:6, but various kinds of control described above with reference to FIGS. 8 to 44 are also applicable to a case where the correspondence relation is 1:4 as illustrated in FIGS. 3 and 44. The correspondence relation may be 1:6α or 1:4α. The coefficient α is a natural number. The center position of each light emission point LP is not limited to a position between two pixels Pix adjacent to each other at the plan view point. For example, the center position of a light emission point LP and the center position of a pixel Pix may overlap each other or have any other positional relation.

The form and number of sub pixels provided in each pixel Pix are not limited to those described above with reference to FIG. 16 and other diagrams. The number of sub pixels provided in one pixel Pix may be two or less or may be four or more. The arrangement of the sub pixels provided in one pixel Pix is not limited to an arrangement in the X direction but may be an arrangement in the Y direction or may be in a matrix having a row-column configuration. The shape of each sub pixel at the plan view point is limited to a quadrilateral shape but may be an arbitrary shape.

It should be understood that the present disclosure provides any other effects achieved by aspects described above in the present embodiment, such as effects that are clear from the description of the present specification or effects that could be thought of by the skilled person in the art as appropriate.

What is claimed is:

1. A display device comprising:
a liquid crystal display panel provided with a plurality of pixels;
a light source provided with a plurality of light emission points and configured to emit light to the pixels of the liquid crystal display panel;
an acquirer configured to acquire viewpoint information of a user viewing the liquid crystal display panel; and
a controller configured to control image display through operation of the pixels based on the viewpoint information, wherein
a ratio of a pitch between the pixels arranged in a first direction to a pitch between the light emission points arranged in the first direction is 1:4n or 1:6n,
n is a natural number, and
a width of each light emission point in the first direction is larger than a width of each pixel in the first direction,
each pixel includes a plurality of sub pixels arranged in the first direction,
the viewpoint information includes information related to positions of a plurality of viewpoints and information indicating an arrangement direction of the viewpoints, and
the controller drives display of some or all of sub pixels included in at least the pixels positioned on straight lines connecting the light emission points and the viewpoints based on a relative rotation angle between the liquid crystal display panel and the arrangement direction and a relative positional relation between each viewpoint and each light emission point.

2. The display device according to claim 1, wherein
the pixels are arranged in a matrix having a row-column configuration in the first direction and a second direction orthogonal to the first direction,
a ratio of a pitch between the pixels arranged in the second direction to a pitch between the light emission points arranged in the second direction is 1:4n or 1:6n, and
a width of each light emission point in the second direction is larger than a width of each pixel in the second direction.

3. The display device according to claim 1, wherein the controller causes, among the sub pixels included in a pixel adjacent to a pixel including a sub pixel at a position intersecting an optical axis between the viewpoint and the light emission point, a sub pixel disposed closer to an intersection point with the optical axis between the viewpoint and the light emission point to transmit light therethrough.

4. The display device according to claim 1, wherein the acquirer includes an image capturer configured to capture an image of the user, and a processor configured to identify the arrangement direction, the relative rotation angle, and the relative positional relation for right and left eyes of the user based on the captured image of the user.

\* \* \* \* \*